(12) United States Patent
Bando et al.

(10) Patent No.: US 12,355,377 B2
(45) Date of Patent: Jul. 8, 2025

(54) ADJUSTABLE SPEED GENERATOR MOTOR SYSTEM WITH FULL POWER CONVERTER

(71) Applicants: HITACHI MITSUBISHI HYDRO CORPORATION, Tokyo (JP); Hitachi, Ltd., Tokyo (JP); HITACHI INDUSTRIAL PRODUCTS, LTD., Tokyo (JP)

(72) Inventors: Akira Bando, Tokyo (JP); Takahiko Kikui, Tokyo (JP); Kenta Watanabe, Tokyo (JP); Yasuhiro Kiyofuji, Tokyo (JP); Masakazu Ishikawa, Tokyo (JP); Tomomichi Ito, Tokyo (JP); Masaya Ichinose, Tokyo (JP); Jun Narushima, Tokyo (JP); Hikaru Meguro, Tokyo (JP)

(73) Assignees: HITACHI MITSUBISHI HYDRO CORPORATION, Tokyo (JP); Hitachi, Ltd., Tokyo (JP); HITACHI INDUSTRIAL PRODUCTS, LTD., Tokyo (JP)

( * ) Notice: Subject to any disclaimer, the term of this patent is extended or adjusted under 35 U.S.C. 154(b) by 0 days.

(21) Appl. No.: 18/685,065

(22) PCT Filed: Aug. 23, 2021

(86) PCT No.: PCT/JP2021/030855
§ 371 (c)(1),
(2) Date: Feb. 20, 2024

(87) PCT Pub. No.: WO2023/026335
PCT Pub. Date: Mar. 2, 2023

(65) Prior Publication Data
US 2025/0167703 A1    May 22, 2025

(51) Int. Cl.
H02P 21/00   (2016.01)
H02P 21/22   (2016.01)

(52) U.S. Cl.
CPC .................................. *H02P 21/22* (2016.02)

(58) Field of Classification Search
CPC ....................................................... H02P 21/22
See application file for complete search history.

(56) References Cited

U.S. PATENT DOCUMENTS

| 11,223,310 | B2 * | 1/2022 | Bando ...................... H02M 1/12 |
| 2013/0241463 | A1 * | 9/2013 | Bando ..................... H02P 9/102 |
| | | | 318/810 |

(Continued)

FOREIGN PATENT DOCUMENTS

| DE | 102019105196 A1 | 9/2020 |
| JP | 2012-235600 A | 11/2012 |

(Continued)

OTHER PUBLICATIONS

International Search Report issued in the corresponding International Application No. PCT/JP2021/030855 dated Oct. 19, 2021.

(Continued)

*Primary Examiner* — Julio C. Gonzalez
(74) *Attorney, Agent, or Firm* — Rimon P.C.

(57) ABSTRACT

There is provided an adjustable speed generator motor system with full power converter (FPC system) in which two 3-level converters are connected back-to-back on the DC side, and by providing a mode in which a fly-wheeling diode is forced to conduct a current independently for three phases according to the current polarity and a mode in which the fly-wheeling diode is forced to conduct a current independently for three phases according to magnitude relation of (Continued)

the absolute value of a 3-phase AC current and the current polarity of each phase the FPC system is capable of continuing stable operation.

10 Claims, 39 Drawing Sheets

(56) References Cited

U.S. PATENT DOCUMENTS

| | | |
|---|---|---|
| 2014/0111066 A1 | 4/2014 | Ito et al. |
| 2021/0384818 A1 | 12/2021 | Stickelmann et al. |
| 2022/0231615 A1 | 7/2022 | Bando et al. |

FOREIGN PATENT DOCUMENTS

| | | |
|---|---|---|
| JP | 5401213 B2 | 1/2014 |
| JP | 2014-87141 A | 5/2014 |
| JP | 5952087 A | 7/2016 |
| JP | 2020-195226 A | 12/2020 |
| WO | 2014/207858 A1 | 12/2014 |
| WO | 2019/235595 A1 | 12/2019 |
| WO | 2020/230343 A1 | 11/2020 |

OTHER PUBLICATIONS

Extended European Search Report issued in the corresponding European Patent Application No. 21954952.4 on May 16, 2025.
Bueno, Emilio & Cobreces, Santiago & Rodriguez, Francisco & Hernández, Álvaro & Espinosa, Felipe & Mateos, Raimundo & Garcia Garcia, Juan Carlos & Lopez, F.. (2005). Optimized design of a back-to-back NPC converter to be used as interface for renewable energies. 6 pp. 10.1109/IECON.2005.1569306.

* cited by examiner

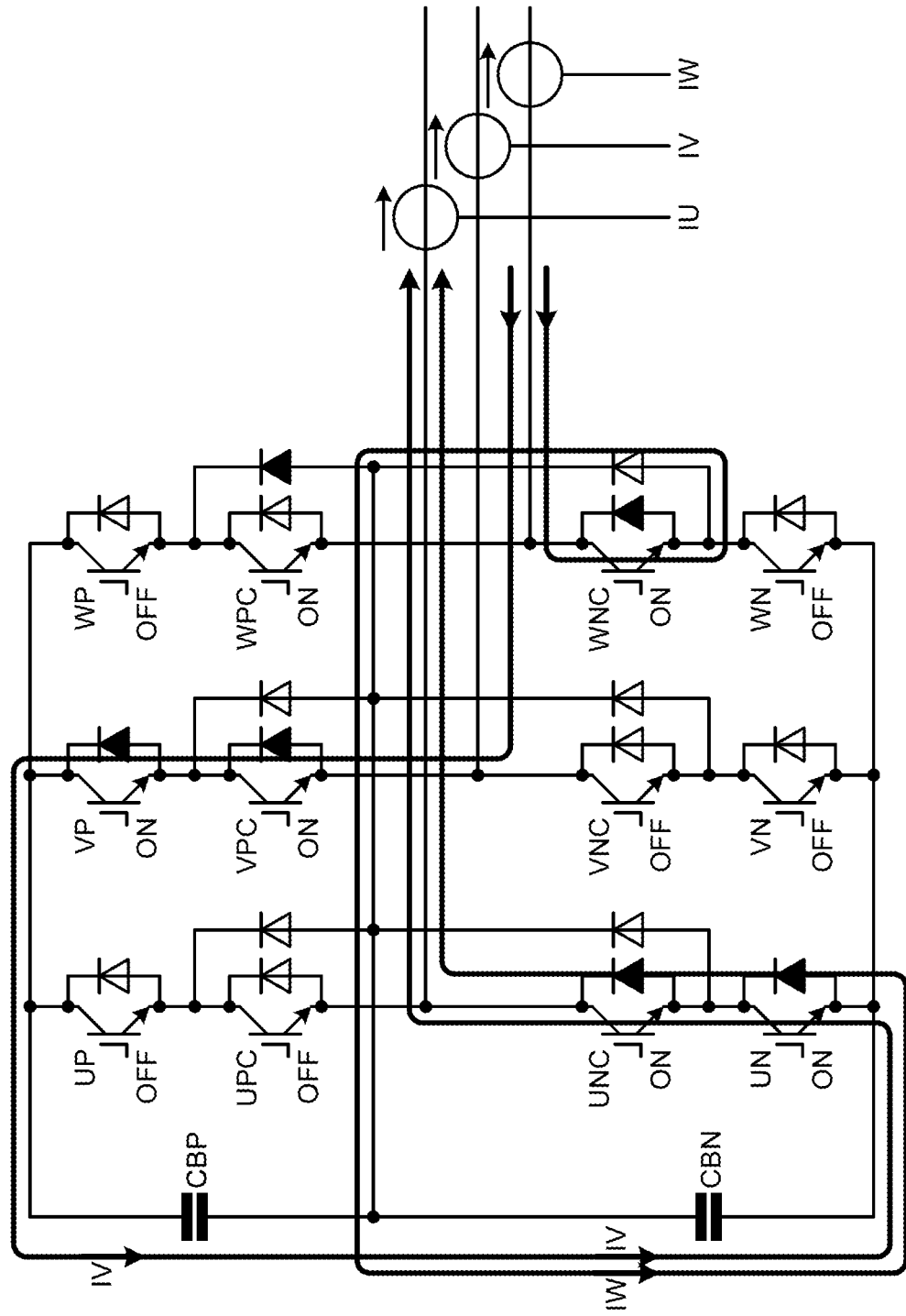

FIG.40

| SIGNAL | | MODE NUMBER | 1 | 2 | 3 | 4 | 5 | 6 | 7 | 8 | 9 | 10 | 11 | 12 |
|---|---|---|---|---|---|---|---|---|---|---|---|---|---|---|
| IU | | RANKING OF MAGNITUDE | SECOND | FIRST | FIRST | SECOND | THIRD | THIRD | SECOND | FIRST | FIRST | SECOND | THIRD | THIRD |
| | | SIGN | >0 | >0 | >0 | >0 | >0 | <0 | <0 | <0 | <0 | <0 | <0 | >0 |
| IV | | RANKING OF MAGNITUDE | FIRST | SECOND | THIRD | THIRD | SECOND | FIRST | FIRST | SECOND | THIRD | THIRD | SECOND | FIRST |
| | | SIGN | <0 | <0 | <0 | >0 | >0 | >0 | >0 | >0 | >0 | <0 | <0 | <0 |
| IW | | RANKING OF MAGNITUDE | THIRD | THIRD | SECOND | FIRST | FIRST | SECOND | THIRD | THIRD | SECOND | FIRST | FIRST | SECOND |
| | | SIGN | >0 | <0 | <0 | <0 | <0 | <0 | >0 | >0 | >0 | >0 | >0 | >0 |
| VDCP-VDCN | | VOLTAGE IMBALANCE | RISE | FALL | FALL | RISE | RISE | FALL | FALL | RISE | RISE | FALL | FALL | RISE |

ADJUSTABLE SPEED GENERATOR MOTOR SYSTEM WITH FULL POWER CONVERTER

CROSS-REFERENCE TO RELATED APPLICATIONS

This application is the U.S. National Phase under 35 U.S.C. § 371 of International Application No. PCT/JP2021/030855, filed on Aug. 23, 2021, and the entire contents of each of which are hereby incorporated by reference.

FIELD

The present invention relates to a neutral point clamped 3-level semiconductor power converter (hereinafter, referred to as a "3-level converter" in the present invention). The present invention particularly relates to an adjustable speed generator motor system with full power converter (hereinafter, referred to as an FPC system) in which the direct current (DC) sides of two 3-level converters are connected back-to-back to constitute a frequency converter, the alternating current (AC) side of one 3-level converter is connected to a power system, and the AC side of the other 3-level converter is connected to an AC rotating machine (hereinafter, referred to as an electrical rotating machine).

BACKGROUND 3-level converters are applied to variable speed drives of electric motors, power converters for solar power generation facilities, and frequency converters used for variable speed of hydraulic, pumped storage, and wind power generation facilities.

There are two types for variable speed for hydraulic, pumped storage, and wind power generation facilities. The first type is a doubly-fed induction machine in which a frequency converter is connected between a low-voltage side terminal of a unit transformer whose high-voltage side terminal is connected to an AC system and an excitation winding terminal of a wound rotor induction machine.

The second type is an FPC system in which a frequency converter is connected between a low-voltage side terminal of a unit transformer and an armature winding terminal of a generator motor. 3-level converters are applied in both types.

Since recent technological advances in self arc-extinguishing semiconductor devices (hereinafter, referred to as "electronic switches" in the present invention) and diodes have led to higher withstand voltage and lower power dissipation, the application range of 3-level converters continues to expand.

In particular, improvements in the price performance ratio of frequency converters have expanded the applications of FPC systems. Meanwhile, the overcurrent capacity of a self-commutated power converter employing an electronic switch, such as a 3-level converter, has a disadvantage of being limited by the instantaneous current value at turn-off switching.

For this reason, a method including an arc-extinguishing current capacity that withstands overcurrent generated at a power line failure and a method applying bypass switch circuit are generally used.

The former method has a disadvantage of causing an increase in size of the system, and the latter method has a disadvantage of significantly shaking the AC system.

Regarding a doubly-fed induction system, a method of commutating current to a fly-wheeling diode (hereinafter, referred to as an FWD) an arc-extinguishing current capacity of an electronic switch is exceeded is disclosed when a 2-level power converter is employed in Patent Literature 1 and when a 3-level converter is employed in Patent Literature 2.

CITATION LIST

Patent Literature

Patent Literature 1: JP 5401213 B
Patent Literature 2: WO 2020/230343 A
Patent Literature 3: WO 2019/235595 A
Patent Literature 4: JP 2020-195226 A
Patent Literature 5: JP 5952087 B

SUMMARY

Technical Problem

A conventional generator motor system is connected to armature winding terminals of a generator motor via an AC system and a unit transformer, and a rotor phase is constrained by power line voltage phase via synchronizing power coefficient. Thus, rotating speed is fixed at synchronous speed. Compared with a conventional generator motor, an FPC system has many advantages.

When FPC systems are applied to hydraulic, wind, and other power generation facilities, the purpose is often to improve system efficiency, including turbine efficiency, through variable speed operation.

Therefore, in order to achieve the purpose of employing FPC systems, the main premise is to reduce the dimensions and price of a frequency converter, which is an additional facility associated with variable speed.

From the above perspective, the basic design of a 2-level power converter or a 3-level converter, which has been used as a commercially-available variable-speed electric device for production facilities in factories, is often diverted as a frequency converter of an FPC system.

FIG. 31 shows an example of a conventional FPC system. A generator motor 3102 is connected to one of two AC terminals of a frequency converter 3101 via a disconnector switch 3103 for maintenance.

The other AC terminal of the frequency converter 3101 is connected to an AC system 3107 via a power line 3104, a unit transformer 3105, and a circuit breaker with synchronous input device 3106.

Since the conventional frequency converter 3101 is based on a design for applications connected to a factory power supply, the system side winding of the unit transformer 3105 is assumed to be a delta winding, and the power line 3104 is often a non-grounded system.

When the power line 3104 is a grounded system or a high-resistance grounded system, the frequency converter 3101 is not affected by transient phenomena during single line-to-ground faults that account for the majority of ground faults occurring in the power line 3104. For this reason, non-grounded power lines are used intendedly.

In practice, the system-side terminal voltage of the unit transformer 3105 drops to almost zero, including when symmetrical faults occur on the power line 3104. In such cases, the Grid Code enacted to ratify the expansion of applications of wind and solar power generation facilities that cannot actually continue operation has been used as a remedy, and the existing facilities have been exempted from continuing operation.

FIG. 32 shows another example of a conventional FPC system. When the capacity of an FPC system increases, the FPC system often needs to be connected to a bulk power system via a unit transformer.

A generator motor 3202 is connected to one of two AC terminals of a frequency converter 3201. A first AC system (AC system 1) 3203 is connected to a high-voltage side terminal of a unit transformer 3207 via a first power line (power line 1) 3204, and a second AC system (AC system 2) 3205 is connected to the high-voltage side terminal of the unit transformer 3207 via a second power line (power line 2) 3206 to constitute a loop transmission system.

The other AC terminal of the frequency converter 3201 is connected to a low-voltage side terminal of the unit transformer 3207.

Here, the first power line 3204 and the second power line 3206 are a direct grounded system or a high-resistance grounded system. Therefore, if a single line-to-ground fault occurs in any of the power lines, the terminal voltage of the unit transformer 3207 decreases, and a transient overcurrent occurs in the frequency converter 3201.

In order to continue operation in the event of spreading a fault on the system side, the arc extinction capacity of the electronic switch constituting the frequency converter 3201 has been increased, and the DC capacitor capacity of the frequency converter has been increased.

When the first AC system 3203 and the second AC system 3205 are common, the first power line 3204 and the second power line 3206 constitute a double-circuit power line and are connected to a longitudinal transmission system.

In any case, the probability of occurrence of an in-phase single line-to-ground fault, in which a ground fault occurs simultaneously in the same specific phase of the first power line 3204 and the second power line 3206, has been regarded as extremely low.

FPC systems have been exempted from continuing operation in the event of an in-phase single line-to-ground fault. Alternatively, even in the case of a double-circuit power line, if one circuit cannot be used for maintenance inspection or the like, an open-phase operation period occurs due to high-speed reclosing in the event of a single line-to-ground fault, and the system in this case had to be exempted from continuing operation.

As described above, the "operation continuation exemption based on the Grid Code" and the "operation continuation exemption in the event of an open-phase operation period" are caused by "weaknesses of frequency converters using electronic switches" and have been regarded as indispensable.

Meanwhile, in generator motor systems that do not use frequency converters, it is compulsorily required to continue operation in the event of a close-end ground fault in which a system end voltage of a unit transformer drops to zero or in the event of an in-phase single line-to-ground fault.

A purpose of the present invention is to implement an FPC system applicable to the configuration shown in FIG. 33.

Another purpose of the present invention is to solve various problems to implement the FPC system with an electronic switch capacitance and DC capacitor capacitance smaller than those of a conventional frequency converter constituted by a conventional 3-level converter.

Hereinafter, FIG. 33 is described.

A first 3-level converter 3301 and a second 3-level converter 3302 are connected back-to-back, and a positive capacitor 3303 and a negative capacitor 3304 are connected to the DC ends.

A generator motor 3305 is connected to the AC end of the second 3-level converter 3302, and an AC system 3306 is connected to the AC end of the first 3-level converter 3301 via a single-circuit power line 3307 and a unit transformer 3308. The system side winding of the unit transformer 3308 is directly grounded or high resistance grounded.

In the configuration in FIG. 33, the AC ends of the two 3-level converters 3301 and 3302 are short-circuited, and a bypass circuit 3309 is provided between the unit transformer 3308 and the generator motor 3305.

A circuit breaker 3310 is for protection in a variable speed operation mode via the 3-level converters, and a circuit breaker 3311 is for protection in a bypass operation mode via the bypass circuit 3309.

Patent Literatures 3 and 4 disclose a method of reversibly switching between the variable speed operation mode and the bypass operation mode while maintaining continuity of the current of the generator motor 3305.

When the bypass operation is switched to the variable speed operation, the amplitude and the phase of the AC voltage of a second 3-level converter 3302 are matched to the terminal voltage of the generator motor 3305, and a current command is rapidly increased to the generator current at the same time as the start of the operation of the frequency converter. This causes the current of the bypass circuit to rapidly approach zero, and it is possible to switch to the variable speed operation by opening a load breaker 3312 instead of the circuit breaker 3311.

In order to switch from the variable speed operation to the bypass operation, by adjusting the rotation speed to the synchronous speed by the active power regulation, adjusting the voltage amplitude and phase of both ends of the load breaker 3312 by the voltage phase regulation to close the load breaker 3312, rapidly narrowing the current of the frequency converter to zero, and stopping the operation, it is possible to switch to the bypass operation.

In the case of the configuration in FIG. 33, it is practically impossible to distinguish the operation mode from the outside. There is no rational reason, either from the perspective of the owner of an FPC system or from the perspective of the operator of a power system, to distinguish between the variable speed operation mode and the bypass operation mode for operation when a ground fault occurs on the system side.

Therefore, in the event of a single line-to-ground fault, which accounts for the majority of system-side ground faults, the variable-speed operation mode is required to have the same or better operational continuity performance as the bypass operation mode.

A typical time chart when a single line-to-ground fault occurs in the single-circuit power line 3307 is shown.

Hereinafter, an example in which an A-phase single line-to-ground fault occurs at time t1 in the configuration in FIG. 33 is described. At time t2, a leading end circuit breaker (52F_A) and a trailing end circuit breaker (52B_A) for the A-phase are opened.

The leading end circuit breaker (52F_A) is closed at time t3, and then the trailing end circuit breaker (52B_A) is closed at time t4.

As a result, the period from time t2 to time t4 is called an open-phase period, and the single-circuit power line 3307 is for two-phase transmission for a B-phase and a C-phase while the A-phase is in an open-phase state. This open-phase period usually lasts nearly one second.

Frequency converters have many advantages, but also have many disadvantages. Vulnerability in an open-phase period is the most serious disadvantage in applications in which frequency converters are connected to bulk power systems, including FPC systems.

As disclosed above, a method of suppressing overcurrent in the electronic switch of a 3-level converter is disclosed in Patent Literature 2, which is applied to a doubly-fed induction machine.

The application of this method to an FPC system is shown in FIG. 34.

A first 3-level converter 1 is provided with a positive terminal (P terminal) 2, a negative terminal (N terminal) 3, and an intermediate terminal (C terminal) 4 on the DC side, and provided with a U-phase terminal 5, a V-phase terminal 6, and a W-phase terminal 7 on the AC side. A second 3-level converter 8 is provided with a positive terminal (P terminal) 9, a negative terminal (N terminal) 10, and an intermediate terminal (C terminal) 11 on the DC side, and provided with a U-phase terminal 12, a V-phase terminal 13, and a W-phase terminal 14 on the AC side.

A positive capacitor (CBP) 15 and a negative capacitor (CBN) 16 are provided at the back connection part on the DC side, and a positive discharge resistance (RP) 3401, a negative discharge resistance (RN) 3402, and a positive chopper (CHP) 3403 and a negative chopper (CHN) 3404 for preventing overcharge are provided.

The AC side terminal of the first 3-level converter 1 is connected to an AC system 17 via a unit transformer 18, a circuit breaker with synchronous input device 19, and a harmonic filter 20 that also functions as a reactor.

The AC terminal of the second 3-level converter 8 is connected to an electrical rotating machine 21 via a harmonic filter 22 that also functions as a reactor.

At both ends of the circuit breaker with synchronous input device 19, an instrument transformer 23 is connected to the unit transformer 18 side, and an instrument transformer 24 is connected to the first 3-level converter 1 side. A signal of the instrument transformer 24 is input to a transformer-side phase detector 25, and a reference voltage phase signal (Ge) 26 is output. The reference voltage phase signal (Ge) 26 is input to a current regulator 3427.

An instrument current transformer 28 that measures the AC current of the first 3-level converter 1 is provided between the circuit breaker with synchronous input device 19 and the harmonic filter 20. A signal of the instrument current transformer 28 is input to a power detector 29, and the power detector 29 outputs a reactive power signal (Q_FB) 30, which is matched with an external reactive power command (Q_REF) 31 and input to a reactive power regulator 32. A direct-axis current command (ITD_REF) 33 is output from the reactive power regulator 32 and input to the current regulator 3427.

The voltage of the positive capacitor (CBP) 15 is measured by a DC voltage transformer 34, and the voltage of the negative capacitor (CBN) 16 is measured by a DC voltage transformer 35. A positive-side output signal (VDCP) 36 and a negative-side output signal (VDCN) 37 are energized to output a DC voltage signal (VC_FB) 38. The DC voltage signal (VC_FB) 38 is matched with an external DC voltage command (VC_REF) 39 and input to a DC voltage regulator 40, and the DC voltage regulator 40 outputs a transvers-axis current command (ITQ_REF) 41 and inputs it to the current regulator 3427.

A U-phase current (ITU) 42, a V-phase current (ITV) 43, and a W-phase current (ITW) 44 from the instrument current transformer 28 are input to the current regulator 3427.

The current regulator 3427 outputs a U-phase first mode command (M_TU1) 3445, a V-phase first mode command (M_TV1) 3446, and a W-phase first mode command (M_TW1) 3447.

An output signal of a pulse generator 48 directly connected to the rotation shaft of the electrical rotating machine 21 is input to a rotation phase detector 49, and the rotation phase detector 49 outputs a rotation phase signal (θr) 50 to a current regulator 3451.

A voltage signal from an instrument transformer 52 provided between the electrical rotating machine 21 and the harmonic filter 22 and a current signal from an instrument current transformer 53 are input to a power detector 54. A reactive power signal (QM_FB) 55 from the power detector 54 and an external reactive power command (QM_REF) 56 are matched and input to a reactive power regulator 57, and a direct-axis current command (IMD_REF) 58 from the reactive power regulator 57 is input to the current regulator 3451.

Since the electrical rotating machine 21 maximizes efficiency at a power factor of 1, the reactive power command (QM_REF) 56 is generally set to zero.

An active power signal (P_FB) 65 from the power detector 29 and an external active power command (P_REF) 63 are matched and input to an active power regulator 3466, and a transvers-axis current command (IMQ_REF) 3467 is output and input to the current regulator 3451. A U-phase current (IMU) 76, a V-phase current (IMV) 77, and a W-phase current (IMW) 78 from the instrument current transformer 53 are input to the current regulator 3451.

The current regulator 3451 outputs a U-phase mode command (M_MU) 3479, a V-phase mode command (M_MV) 3480, and a W-phase mode command (M_MW) 3481.

The 3-phase first mode commands 3445, 3446, and 3447 are input to a mode command switcher 3482. Current signals 42, 43, and 44 from the instrument current transformer 28 are input to the mode command switcher 3482 to calculate a second mode command, and a first mode command and a second mode command are selected to output a mode command (M_TU) 3483, a mode command (M_TV) 3484, and a mode command (M_TW) 3485 to the first 3-level converter 1. The 3-phase mode commands 3483, 3484, and 3485 are input to gate pulse generators 3486, 3487, and 3488, and 4-output gate pulses 3492, 3493, and 3494 are output, respectively.

Mode commands 3479, 3480, and 3481 to the second 3-level converter 8 are input to gate pulse generators 3489, 3490, and 3491, and 4-output gate pulses 3495, 3496, and 3497 are output, respectively.

FIG. 35 shows a current regulator and shows a configuration of the current regulator 3427 of the first 3-level converter 1 and the current regulator 3451 of the second 3-level converter 8.

A 3-phase/2-phase calculator 205 receives a phase reference signal (θ) 201, a U-phase current (IU) 202, a V-phase current (IV) 203, and a W-phase current (IW) 204. A direct-axis current (ID) 206 from the 3-phase/2-phase calculator 205 and a direct-axis current command (ID_REF) 208 are matched and input to a direct-axis current controller 209, and a direct-axis voltage command (VD_REF) 210 is output.

In addition, a transvers-axis current (IQ) 207 from the 3-phase/2-phase calculator 205 and a transvers-axis current command (IQ_REF) 211 are matched and input to a transvers-axis current controller 212, and a transvers-axis voltage command (VQ_REF) 213 is output.

Here, the direct-axis current controller 209 and the transvers-axis current controller 212 each include at least proportional control elements and integral control elements, both of which are used in an activated state.

A 2-phase/3-phase calculator 214 receives the phase reference signal (θ) 201, the direct-axis voltage command (VD_REF) 210, and the transvers-axis voltage command (VQ_REF) 213, and outputs a U-phase voltage command first stage (VU1_REF) 215, a V-phase voltage command first stage (VV1_REF) 216, and a W-phase voltage command first stage (VW1_REF) 217. The 3-phase voltage command first stages 215, 216, and 217 are input to output limiters 3518, 3519, and 3520, and a U-phase voltage command third stage (VU3_REF) 3521, a V-phase voltage command third stage (VV3_REF) 3522, and a W-phase voltage command third stage (VW3_REF) 3523 are output, respectively.

An overmodulation suppression circuit 224 inputs the voltage command third stages 3521, 3522, and 3523 to a maximum-value selection circuit 225 and a minimum-value selection circuit 226, energizes outputs of the maximum-value selection circuit 225 and the minimum-value selection circuit 226, and outputs a voltage correction command 228 through a gain 227.

A U-phase modulated-wave command (α_U) 3529 is a signal obtained by subtracting the voltage correction command 228 from the U-phase voltage command third stage (VU3_REF) 3521. The U-phase modulated-wave command (α_U) 3529 is input to a U-phase 3-level PWM modulator 3530, and a U-phase mode command (M_U) 3531 is output.

Modulated-wave commands 3532 and 3535, 3-level PWM modulators 3533 and 3536, and mode commands 3534 and 3537 for the V-phase and W-phase are also similar to those for the U-phase, and the descriptions thereof are omitted to avoid duplication.

FIG. 36 shows a configuration of a gate pulse generator. FIG. 36 shows the configuration of the gate pulse generators 3486, 3487, 3488 of the first 3-level converter 1 and the gate pulse generators 3489, 3490, 3491 of the second 3-level converter 8.

A mode command M to the gate pulse generators has 3-levels of +1, 0, and −1. The electronic switches in four series constituting the 3-level converter are referred to as a P element, a PC element, an NC element, and an N element in order from the DC positive terminal P to the negative terminal N, and the gate outputs to the respective elements are denoted as G_P, G_PC, G_NC, and G_N.

When the mode command M is level+1, G_P and G_PC are ON output, and G_N and G_NC are OFF output.

When the mode command M is level 0, G_PC and G_NC are ON output, and G_P and G_N are OFF output.

When the mode command M is level −1, G_N and G_NC are ON output, and G_P and G_PC are OFF output.

FIG. 37 shows a configuration of a mode command switcher of a doubly-fed induction 3-level converter disclosed in Patent Literature 2, which is the mode command switcher 3482.

A U-phase current (ITU) 3701, a V-phase current (ITV) 3702, a W-phase current (ITW) 3703 of the first 3-level converter are input.

Absolute-value calculation circuits 3704, 3705, and 3706 output and match the absolute values of the respective phase currents, and sign detectors 3707, 3708, and 3709 output two levels of magnitude relations. A comparison result (SW_TU) 3710 is level 1 when the absolute value of the U-phase current (ITU) 3701 is minimum, a comparison result (SW_TV) 3711 is level 1 when the absolute value of the V-phase current (ITV) 3702 is minimum, and a comparison result (SW_TW) 3712 is level 1 when the absolute value of the W-phase current (ITW) 3703 is minimum.

Reference signs 3713, 3714, and 3715 are sign detectors. The sign detector 3713 outputs level +1 as a U-phase second mode command (M_TU2) 3731 when the U-phase current (ITU) 3701 is negative and the absolute value is not minimum, and outputs level −1 as the second mode command (M_TU2) 3731 when the U-phase current (ITU) 3701 is positive and the absolute value is not minimum. In addition, the sign detector 3713 outputs level 0 as the second mode command (M_TU2) 3731 when the absolute value of the U-phase current (ITU) 3701 is minimum.

A V-phase second mode command (M_TV2) 3732 and a W-phase second mode command (M_TW2) 3733 are output with the same configuration and operation as those for the U-phase, and the descriptions thereof are omitted to avoid duplication.

A maximum-value selection circuit 3716 inputs a maximum value (CIMAX) 3717 of the 3-phase current absolute values to a comparator with hysteresis 3718. The comparator with hysteresis 3718 changes a switch output (SW_TM) 3719 from level 0 to level 1 when the maximum value (CIMAX) 3717 of the 3-phase current absolute values exceeds a first threshold (I1), and from level 1 to level 0 when the maximum value (CIMAX) 3717 falls below a second threshold (I2).

A U-phase first mode command (M_TU1) 3720 and a second mode command (M_TU2) 3731 are switched by a U-phase mode selector switch 3723. The U-phase mode selector switch 3723 selectively outputs the U-phase first mode command (M_TU1) 3720 as a mode command (M_TU) 3726 when the switch output (SW_TM) 3719 is level 0, and selectively outputs the U-phase second mode command (M_TU2) 3731 as the mode command (M_TU) 3726 when the switch output (SW_TM) 3719 is level 1.

A selector switch 3724, which switches a V-phase first mode command (M_TV1) 3721 and a V-phase second mode command (M_TV2) 3732 and outputs a mode command (M_TV) 3727, and a selector switch 3725, which switches a W-phase first mode command (M_TW1) 3722 and a W-phase second mode command (M_TW2) 3733 and outputs a mode command (M_TW) 3728 are also similar to that for the U-phase, and the descriptions thereof are omitted to avoid duplication.

In the configuration in FIG. 37, the 3-phase mode commands are simultaneously switched by the switch output (SW_TM) 3719.

In the case of the FPC system in FIGS. 34, 35, 36, and 37, the effect of the mode command switcher 3482 is similar to the case in which the mode command switcher 3482 is applied to a doubly-fed induction machine, and it has been found that the overcurrent flowing through the electronic switches in the event of a system fault can be suppressed to be equal to or less than the first threshold (I1). However, even after the system fault is ended, the switch output (SW_TM) 3719 intermittently becomes level 1 and cannot return to the steady state. Therefore, when the switch output (SW_TM) 3719 is forcibly fixed to level 0 with a time limit, the overcurrent flowing through the electronic switches immediately after the switch output (SW_TM) is fixed to level 0 exceeds the first threshold (I1), and a current exceeding the first threshold (I1) must be extinguished.

In general, an electronic switch that extinguishes a current exceeding an element specific threshold even once is considered to be broken or damaged. For this reason, it has been found that the configuration in FIG. 37 is effective for a doubly-fed induction system but is not applicable to an FPC system in which a frequency converter is connected to the primary armature side of a generator motor.

In order to solve the above problem and implement a 3-level converter that stably continues operation after a system fault while suppressing overcurrent of an FPC system, a method of switching mode commands independently for three phases is conceivable.

However, new problems arise in switching mode commands independently for three phases. A first problem is that overcurrent cannot be suppressed in the event of an asymmetrical fault on the system side. A second problem is that voltage imbalance occurs between capacitors on the positive side and the negative side of a 3-level converter.

Purposes of the present invention are to solve the above problems to employ a 3-level converter and to provide an FPC system that is compact and lightweight by removing a discharge resistance or minimizing the discharge resistance capacity and secures operational continuity in the event of a system fault.

Solution to Problem

In order to achieve the above purposes, the current control of a 3-level converter is performed while switching mode commands independently for three phases to suppress overcurrent in all the three phases. The suppression of current imbalance between the three phases is achieved by providing a second current controller independently for three phases and energizes it to a first current controller. The second current controller consists only of proportional gain and excludes integral gain elements.

Since the sum of the proportional gain elements of the first current controller and the proportional gain elements of the second current controller is limited by the time constant of a control target of a current control system and the calculation cycle of the control system, allocation is important. In the case of suppressing overcurrent independently for three phases, it has been found that by setting the proportional gain elements of the second current controller to four times or more the proportional gain elements of the first current controller, the stability of the current control can be secured even if the capacitor capacitance is reduced to ½ or less in the event of a symmetrical fault on the power line side and to ¼ or less in the event of an asymmetrical fault with an open-phase period, compared with the case of only the first current controller.

In the case of suppressing overcurrent while switching mode commands independently for three phases, the voltage output waveform of the 3-level converter becomes the output voltage waveform of a 2-level power converter with two elements in series. Then, the turn-off time of the electronic switch becomes longer, and it is necessary to set the dead time longer, which is a problem that the current control characteristic during the normal operation is deteriorated.

In order to solve the problem, a dead time compensation circuit is provided at a subsequent stage of mode command switching, and the dead time is set longer only at the time of the overcurrent suppression operation.

In addition, switching mode commands for the current control of the 3-level converter independently for three phases arises a new problem of rapidly expanding voltage imbalance between the positive capacitor and the negative capacitor.

Patent Literature 5 and the like disclose a method for suppressing voltage imbalance between the positive capacitor and the negative capacitor.

However, in order to stably operate in the event of an asymmetrical fault on the system side, a simple method that does not require complicated calculation is required.

The solution of this problem is achieved by switching to a second mode command according to the signs (direction) of the 3-phase currents and the magnitude relation to suppress the voltage imbalance between the positive capacitor and the negative capacitor while switching the mode commands of the 3-level converter for current control independently for three phases.

In addition, the solution is achieved by switching the mode command of the 3-level converter connected to the generator motor side in which the influence of the system side fault spreading is relatively small.

Hereinafter, a second mode command switching method is described.

In general, the charging currents of the positive capacitor and the negative capacitor of the 3-level converter are inverted in magnitude relation even during normal operation, and the capacitor voltage is pulsating.

In a conduction mode of the 3-level converter shown in FIG. 38, the U phase and the W phase have positive currents, and the V phase has a negative current of a total value of the U phase and the W phase. In this case, the charging current of the positive capacitor is a total current value of the V phase and the W phase. The charging current of the negative capacitor is the V-phase current value. In the conduction mode, the difference between the positive capacitor voltage and the negative capacitor voltage (VDCP-VDCN) changes to the positive side.

In a conduction mode of the 3-level converter shown in FIG. 39, the V phase and the W phase have negative currents, and the U phase has a positive current of a total value of the V phase and the W phase. In this case, the charging current of the negative capacitor is a total current value of the V phase and the W phase. The charging current of the positive capacitor is the V-phase current value. In the conduction mode, the difference between the positive capacitor voltage and the positive capacitor voltage (VDCP-VDCN) changes to the negative side.

FIG. 40 shows a change in the difference between the positive capacitor voltage and the negative capacitor voltage (VDCP-VDCN) of the 3-level converter. Assuming that one cycle is 360 degrees, one cycle is divided into 12 modes every 30 degrees. FIG. 38 corresponds to mode number 1, and FIG. 39 corresponds to mode number 2.

According to the determination criteria shown in FIG. 40, when the absolute value of the difference between the positive capacitor voltage and the negative capacitor voltage (VDCP-VDCN) exceeds a threshold, the current conduction mode is determined by the 3-phase current value or the 3-phase current command value, and the mode is switched to the required mode command when the mode becomes for reducing the voltage imbalance.

The positive capacitor voltage and the negative capacitor voltage are common to the first 3-level converter and the second 3-level converter connected back-to back on the DC side. Therefore, it can be achieved by switching the mode command of either 3-level converter.

In the case of the FPC system, since the mode switching is prioritized for the overcurrent suppression on the first 3-level converter side which is directly affected by the system side, suppression of the voltage imbalance between the positive and negative capacitors is achieved by switching the mode command on the second 3-level converter side connected to the generator motor side.

The mode command switching due to the suppression of the voltage imbalance between the positive and negative capacitors does not simultaneously operate in two or more phases.

However, the stability can be enhanced by providing the second current controller independently for three phases on the second 3-level converter side and energizing it to the first current controller.

It has been found that when the positive and negative capacitor voltage imbalance is suppressed by the mode command switching, the voltage waveform of the second power converter becomes the output voltage waveform of the 2-level power converter with two elements in series as in the case of the overcurrent suppression.

The second power converter is connected to the electrical rotating machine. The purpose of employing the 3-level converter instead of the 2-level power converter is to protect the insulation of the electrical rotating machine coil by suppressing the step change width of the voltage waveform and the time change rate of the voltage. Therefore, it is desirable to avoid the output voltage waveform of the 2-level power converter.

This problem can be solved by providing a period of the voltage level 0 before and after the period of the mode command switching in order to suppress the capacitor voltage imbalance.

The desired purposes can be achieved by the above system configuration and control method.

Advantageous Effects of Invention

According to an FPC system of the present invention, while reducing the current capacity of semiconductor elements constituting a 3-level converter and suppressing the positive and negative capacitor capacitances, it is possible to secures better performance than a conventional fixed-speed generator motor system in terms of operational continuity performance during power system faults and to achieve both economic benefits for a system owner and stable operational benefits for a power system operator.

BRIEF DESCRIPTION OF DRAWINGS

FIG. 39 is a diagram showing a charging period biased to a negative capacitor in the 3-level converter.

FIG. 40 is a mode diagram for distinguishing positive/negative capacitor voltage imbalance in a 3-level converter.

DESCRIPTION OF EMBODIMENTS

Hereinafter, embodiments of a 3-level converter and an adjustable speed generator motor system with full power converter (FPC system) according to the present invention will be described in detail with reference to the drawings. Note that the present invention is not limited by the embodiments.

EMBODIMENTS

Figure 34:
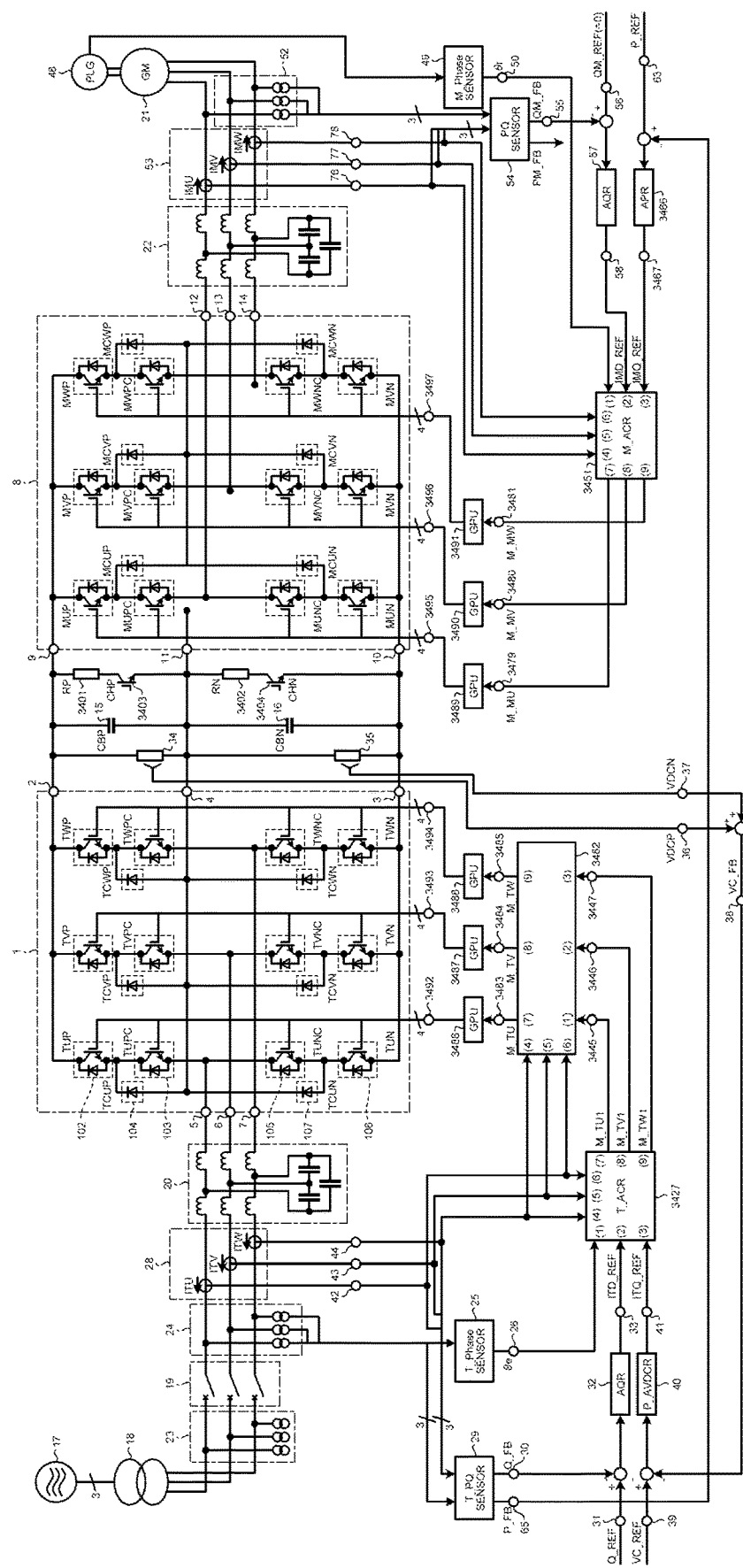
FIG. 34 is a diagram showing a configuration of a conventional FPC system.

A system configuration of a first embodiment according to Claim 1 of the present invention is described with reference to FIG. 1. The descriptions of the same numbers as those described in FIG. 34 are the same and are omitted to avoid duplication.

The reference voltage phase signal (Ge) 26 from the transformer-side phase detector 25 is input to a current regulator 27 that controls the first 3-level converter 1.

The reactive power signal (Q_FB) 30 from the power detector 29 and the external reactive power command (Q_REF) 31 are matched and input to the reactive power regulator 32. The direct-axis current command (ITD_REF) 33 is output from the reactive power regulator 32 and input to the current regulator 27.

A signal (VC_DIF) 59 obtained by matching the DC voltage signal (VC_FB) 38 with the external DC voltage command (VC_REF) 39 is input to the DC voltage regulator 40, and the DC voltage regulator 40 outputs the transvers-axis current command (ITQ_REF) 41 and inputs it to the current regulator 27. The U-phase current (ITU) 42, the V-phase current (ITV) 43, and the W-phase current (ITW) 44 from the instrument current transformer 28 are input to the current regulator 27.

The current regulator 27 outputs a U-phase first mode command (M_TU1) 45, a V-phase first mode command (M_TV1) 46, and a W-phase first mode command (M_TW1) 47.

The rotation phase signal (Or) 50 from the rotation phase detector 49 is input to a current regulator 51 that controls the second 3-level converter 8.

The reactive power signal (QM_FB) 55 from the power detector 54 and the external reactive power command (QM_REF) 56 are matched and input to the reactive power regulator 57, and the direct-axis current command (IMD_REF) 58 from the reactive power regulator 57 is input to the current regulator 51.

The match signal (VC_DIF) 59 of the DC voltage signal (VC_FB) 38 and the DC voltage command (VC_REF) 39 is input to a dead band gain 60, and the input to an auxiliary DC voltage regulator 61 is a value other than zero when the absolute value of deviation exceeds a threshold. The auxiliary DC voltage regulator 61 outputs an active power command correction (AP_REF) 62, matches a correction active power command 64 energized to the external active power command (P_REF) 63 with the active power signal (P_FB) 65 from the power detector 29, and inputs it to an active power regulator 66.

Note that, the active power command correction (AP_REF) 62 energizes the correction active power command 64 to the electrical rotating machine 21 in the power generation direction when the match signal (VC_DIF) 59 is positive and the DC voltage signal (VC_FB) 38 is lower than the DC voltage command (VC_REF) 39, and energizes the correction active power command 64 in the electric direction when the match signal (VC_DIF) 59 is negative.

The output signal of the pulse generator 48 directly connected to the rotation shaft of the electrical rotating machine 21 is branched and input to a speed detector 70, and a rotation speed signal (N_FB) 71 is output.

The auxiliary DC voltage regulator 61 branches and outputs the active power command correction (AP_REF) 62, energizes it to an external speed command (N_REF) 72, matches it with a correction speed command 73 and the rotation speed signal (N_FB) 71 from the speed detector 70, and inputs it to a speed regulator 74.

Note that, the active power command correction (AP_REF) 62 energizes the correction speed command 73 to the electrical rotating machine 21 in the deceleration direction when the match signal (VC_DIF) 59 is positive and the DC voltage signal (VC_FB) 38 is lower than the DC voltage command (VC_REF) 39, and energizes the correction speed command 73 in the acceleration direction when the match signal (VC_DIF) 59 is negative.

An output signal 67 of the active power regulator 66 and an output signal 75 of the speed regulator 74 are selectively output by a mode selector switch 68, and a transvers-axis current command (IMQ_REF) 69 is output and input to the current regulator 51.

The U-phase current (IMU) 76, the V-phase current (IMV) 77, and the W-phase current (IMW) 78 from the instrument current transformer 53 are input to the current regulator 51.

The current regulator 51 outputs a mode command (M_MU) 79, a mode command (M_MV) 80, and a mode command (M_MW) 81.

The first mode commands 45, 46, and 47 are input to a mode command switcher 82. The 3-phase current signals 42, 43, and 44 from the instrument current transformer 28 are input to the mode command switcher 82 to calculate a second mode command, and a first mode command and a second mode command are selected to output a U-phase mode command (M_TU) 83, a V-phase mode command (M_TV) 84, and a W-phase mode command (M_TW) 85 to the first 3-level converter 1. The 3-phase mode commands 83, 84, and 85 are input to gate pulse generators 86, 87, and 88, and 4-output gate pulses 92, 93, and 94 are output, respectively. The mode commands 79, 80, and 81 from the current regulator 51 to the second 3-level converter 8 are input to gate pulse generators 89, 90, and 91, and 4-output gate pulses 95, 96, and 97 are output, respectively. The gate pulse generators 86, 87, 88, 89, 90, and 91 each include a dead time compensation circuit that delays the rise of the gate pulse for the purpose of preventing circuit shorts.

Figure 35:
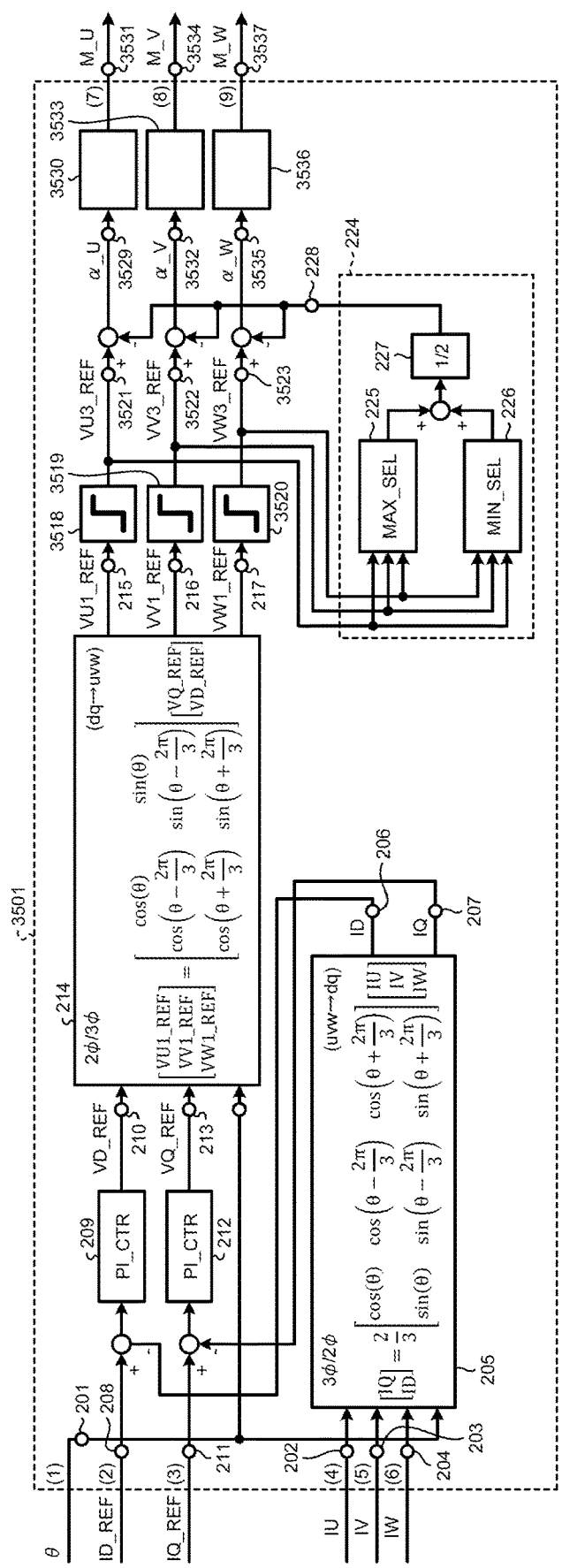
FIG. 35 is a diagram showing a current regulator of the conventional FPC system.
Figure 36:
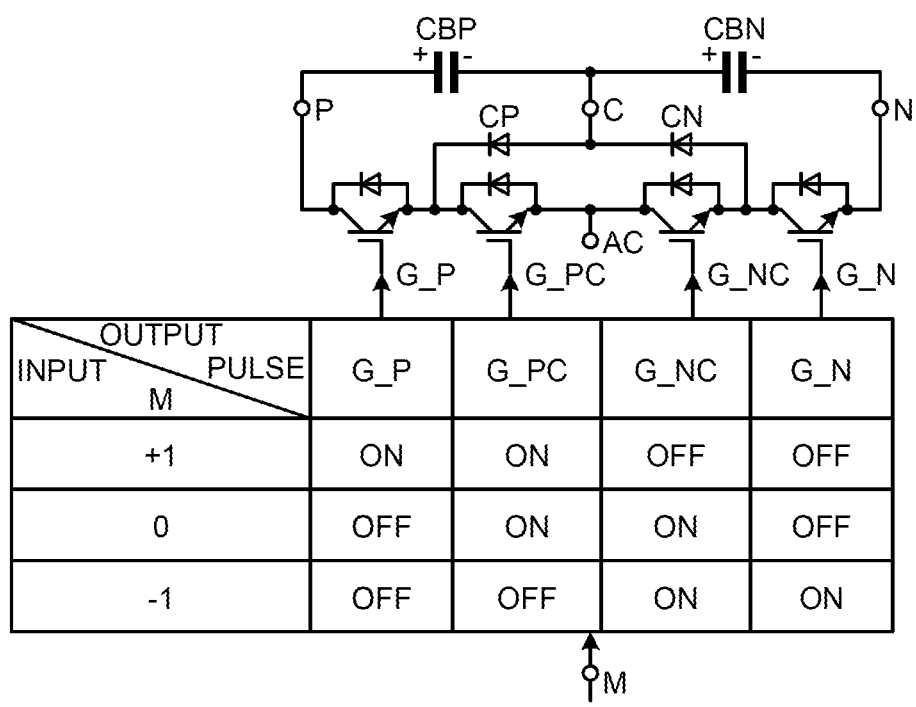
FIG. 36 is a diagram showing a gate pulse generator of a conventional 3-level converter.
Figure 37:
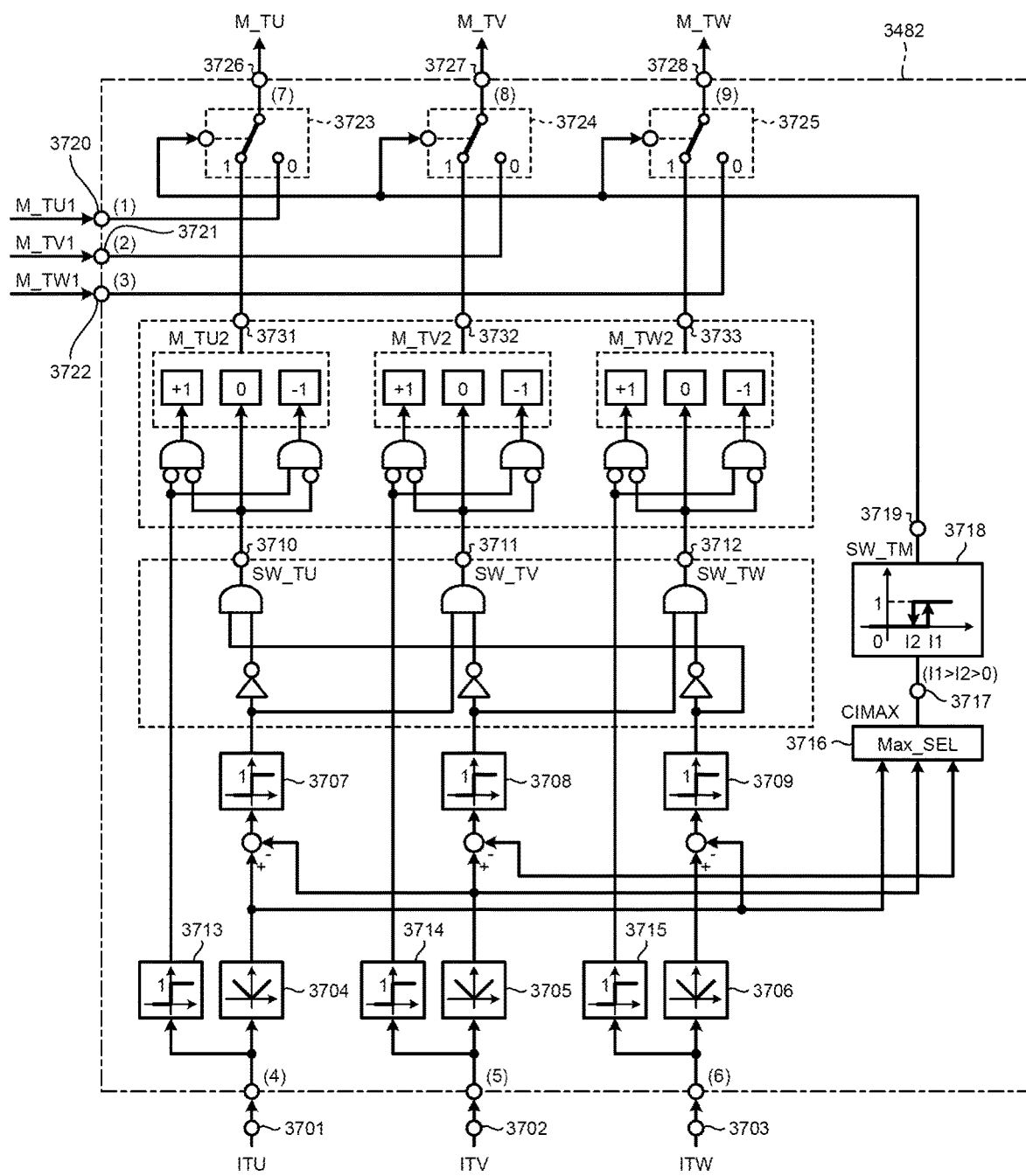
FIG. 37 is a diagram showing a mode switcher of a conventional 3-level converter.
Figure 38:
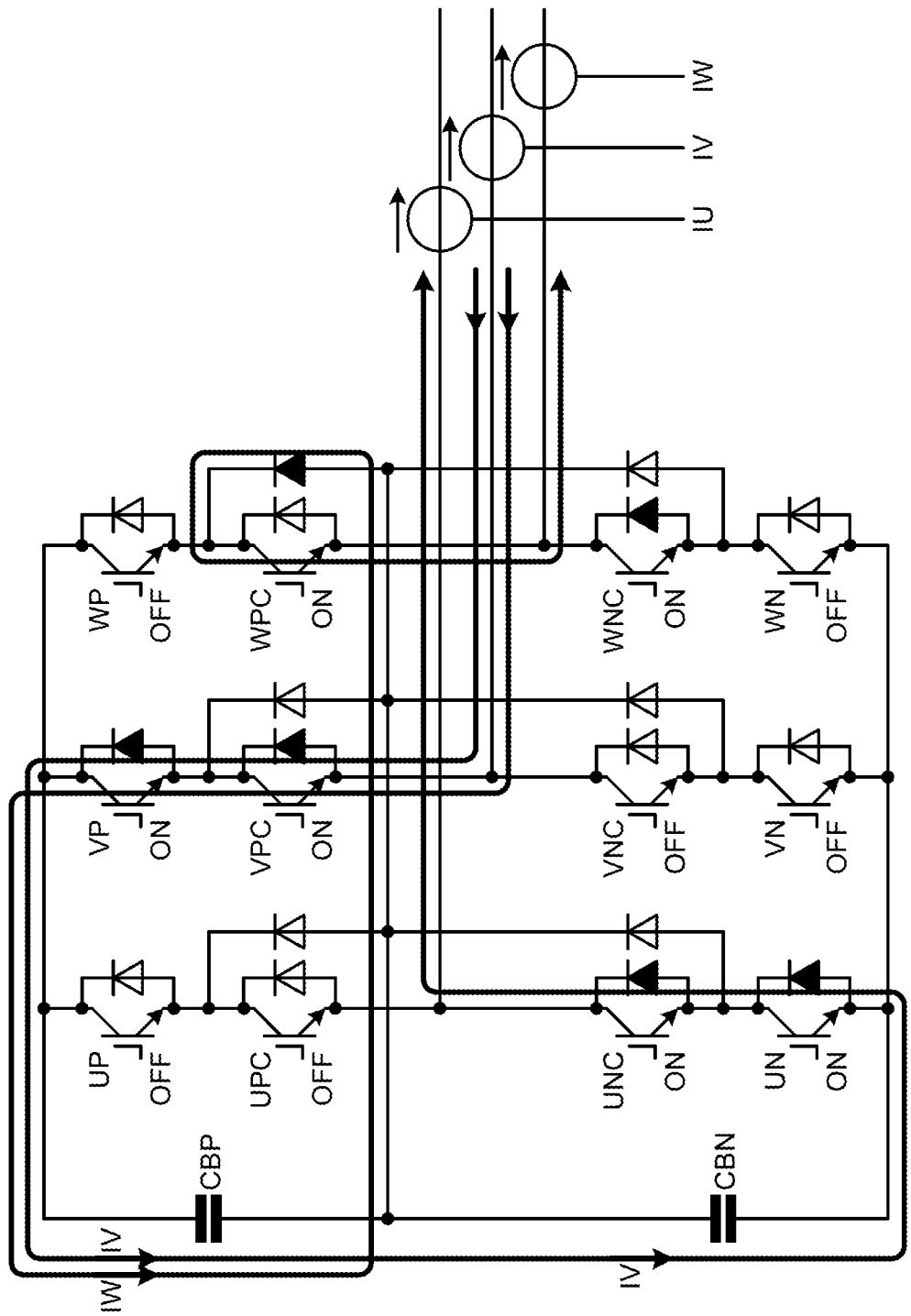
FIG. 38 is a diagram showing a charging period biased to a positive capacitor in a 3-level converter.

An embodiment of the current regulator 27 of the first 3-level converter 1 is described with reference to FIG. 2. The current regulator 51 of the second 3-level converter 8 has the same configuration as that of the current regulator 27. Alternatively, it may have the same configuration as that of the current regulator 3451 shown in FIG. 34. The descriptions of the same numbers as those described in FIG. 35 are the same and are omitted to avoid duplication.

A 2-phase/3-phase calculator 235 receives the phase reference signal (θ) 201, the direct-axis current command (ID_REF) 208, and the transvers-axis current command (IQ_REF) 211, and outputs a U-phase current command (IU_REF) 236, a V-phase current command (IV_REF) 237, and a W-phase current command (IW_REF) 238.

A U-phase AC current regulator 239 matches and receives the U-phase current command (IU_REF) 236 and the U-phase current (IU) 202, and outputs a U-phase voltage command second stage (VU2_REF) 240. The configurations for the V phase and the W phase are the same as that for the U phase, and the descriptions of AC current regulators 241 and 243 and voltage command second stages 242 and 244 are omitted to avoid duplication.

Here, the AC current regulators 239, 241, and 243 activate only proportional elements. When integral elements are included, they are used in an inactivated state.

An output limiter 218 limits upper and lower limits of the signal obtained by energizing the U-phase voltage command first stage (VU1_REF) 215 and the U-phase voltage command second stage (VU2_REF) 240, and outputs a U-phase voltage command third stage (VU3_REF) 221. The configurations for the V phase and the W phase are the same as that for the U phase, and the descriptions of output limiters 219 and 220 and voltage command third stages 222 and 223 are omitted to avoid duplication.

An overmodulation suppression circuit 224 inputs the voltage command third stages 221, 222, and 223 to the maximum-value selection circuit 225 and the minimum-value selection circuit 226, energizes outputs of the maximum-value selection circuit 225 and the minimum-value selection circuit 226, and outputs the voltage correction command 228 through the gain 227.

A U-phase modulated-wave command ($\alpha\_U$) 229 is a signal obtained by subtracting the voltage correction command 228 from the U-phase voltage command third stage (VU3_REF) 221. The U-phase modulated-wave command ($\alpha\_U$) 229 is input to a U-phase 3-level PWM modulator 230, and a U-phase mode command (M_U1) 231 is output. Modulated-wave commands 232 and 245, 3-level PWM modulators 233 and 246, and mode commands 234 and 247 for the V-phase and W-phase are also similar to those for the U-phase, and the descriptions thereof are omitted to avoid duplication.

Figure 3:
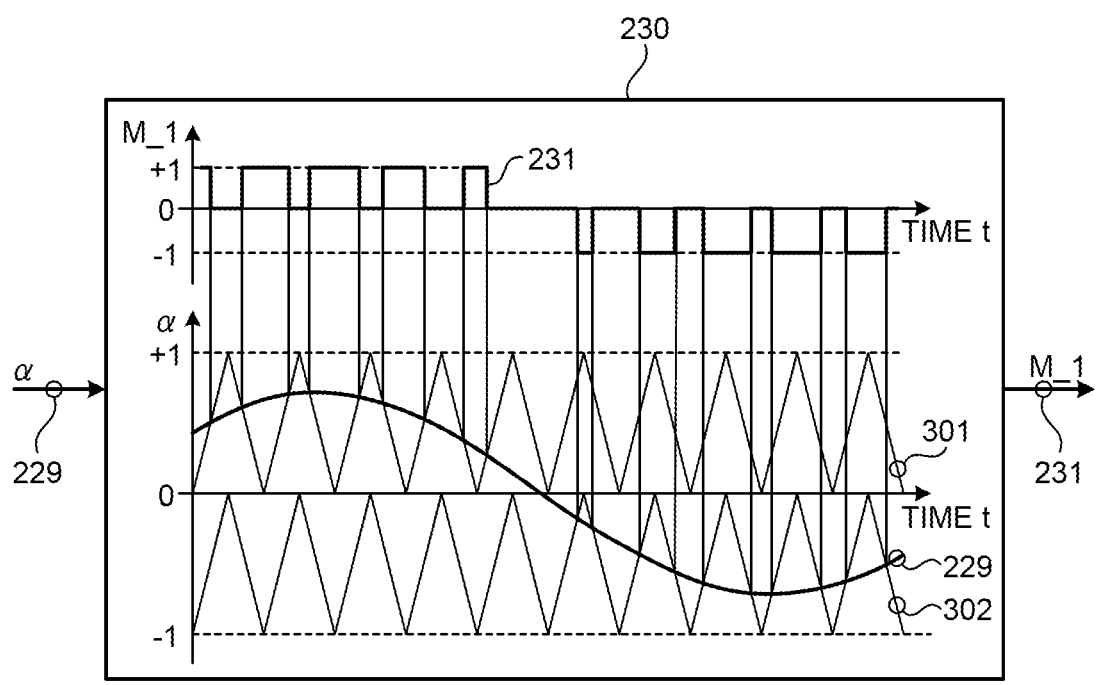
FIG. 3 is a diagram showing one of PWM modulations (unipolar modulation) of a 3-level converter.

FIG. 3 is a diagram showing operation of the 3-level PWM modulator 230. The operation of a PWM modulator, which is generally called unipolar modulation, is shown. Hereinafter, the case for the U phase is described as an example.

When the value of the U-phase modulated-wave command ($\alpha\_U$) 229 is greater than a P-side carrier wave 301, the U-phase mode command (M_U) 231 is output as level +1. When the value is smaller than an N-side carrier wave 302, the U-phase mode command (M_U) 231 is output as level −1. In other cases, the U-phase mode command (M_U) 231 is output as level 0.

Figure 4:
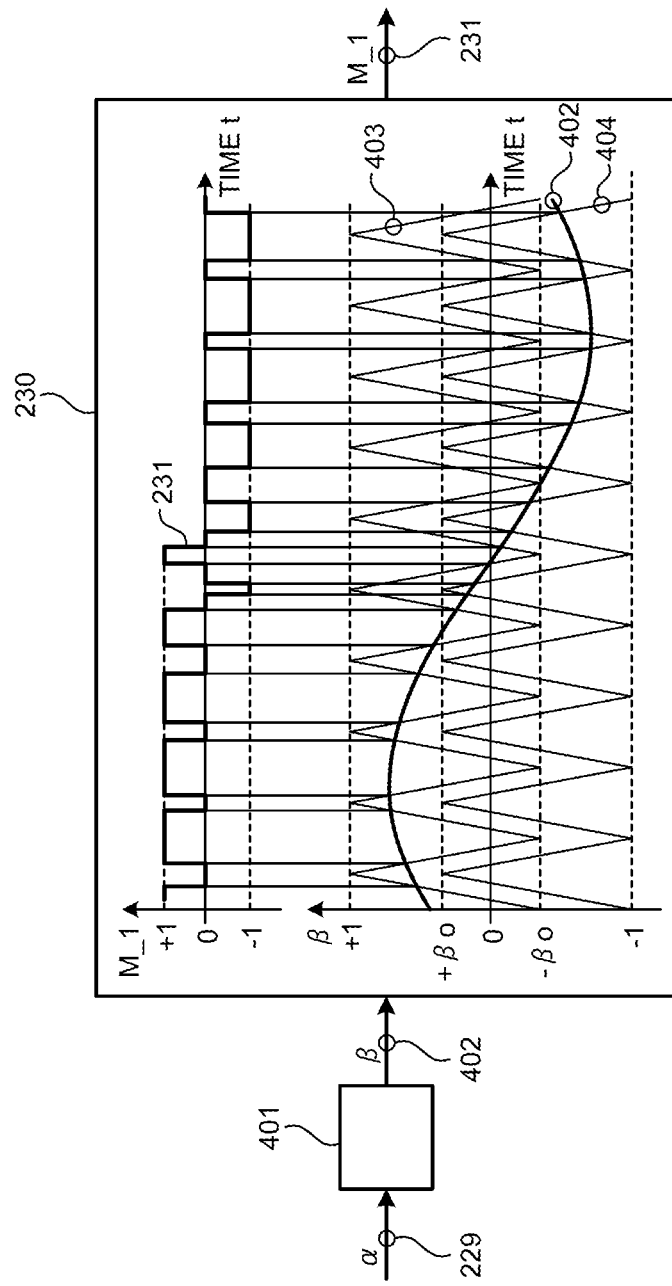
FIG. 4 is a diagram showing one of PWM modulations (dipolar modulation) of a 3-level converter.

FIG. 4 is a diagram showing operation of another 3-level PWM modulator 230. The operation of a PWM modulator, which is generally called dipolar modulation, is shown. Hereinafter, the case for the U phase is described as an example.

The U-phase modulated-wave command ($\alpha\_U$) 229 is input to an output regulator 401, and a modulated-wave correction command ($\beta\_U$) 402 is output. When the value of the modulated-wave correction command 402 is greater than a P-side carrier wave 403, the U-phase mode command (M_U) 231 is output as level +1. When the value of the modulated-wave correction command 402 is smaller than an N-side carrier wave 404, the U-phase mode command (M_U) 231 is output as level −1. In other cases, the U-phase mode command (M_U) 231 is output as level 0.

Figure 1:
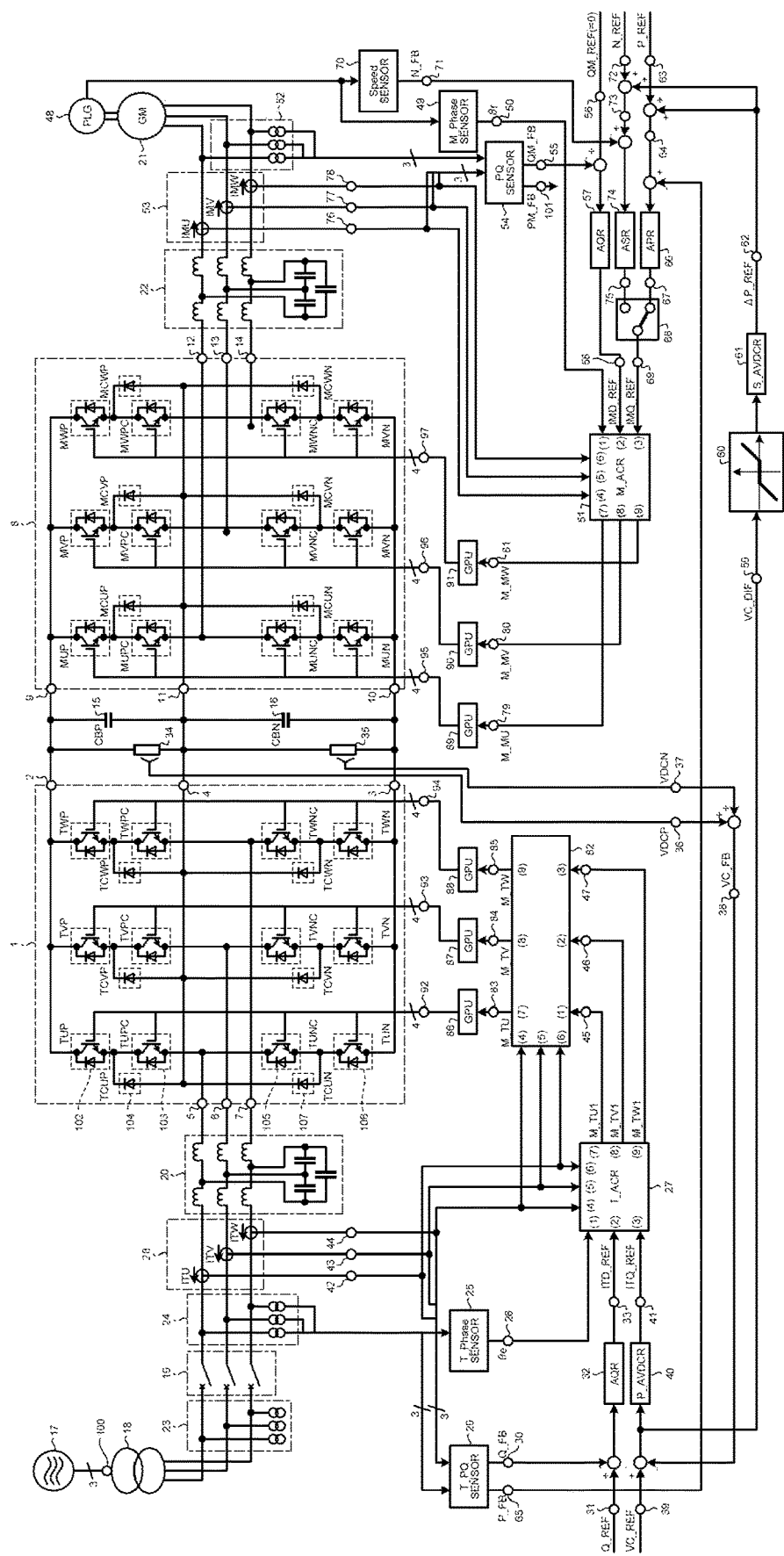
FIG. 1 is a diagram showing a configuration of a first embodiment according to claim 1 of the present invention.
Figure 5:
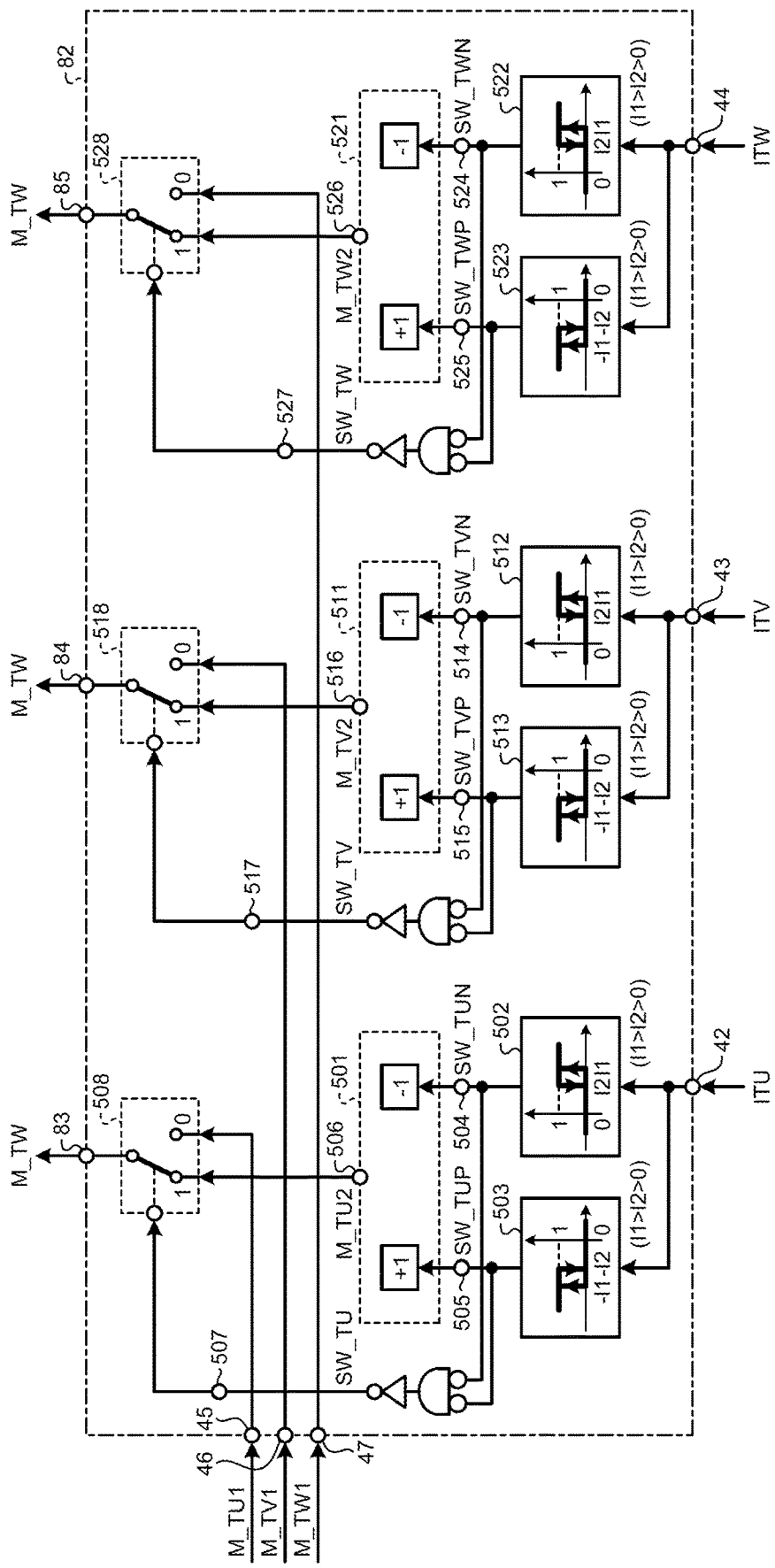
FIG. 5 is a diagram showing a mode switcher according to claim 1 of the present invention.

FIG. 5 is a diagram showing an embodiment of the mode command switcher 82 shown in FIG. 1.

The current signal (ITU) 42 from the instrument current transformer 28 is input to a comparator with hysteresis 502. When the current signal (ITU) 42 exceeds a positive threshold I1 to the positive side, a signal (SW_TUN) 504 is switched from level 0 to level 1. When the current signal (ITU) 42 falls below a positive threshold 12, which has a smaller absolute value than I1, the signal (SW_TUN) 504 is switched from level 1 to level 0. At the same time, the current signal (ITU) 42 from the instrument current transformer 28 is input to a comparator with hysteresis 503. When the current signal (ITU) 42 exceeds a threshold −I1 to the negative side, a signal (SW_TUP) 505 is switched from level 0 to level 1. When the current signal (ITU) 42 exceeds a negative threshold −12, which has a greater absolute value than −I1, the signal (SW_TUP) 505 is switched from level 1 to level 0.

A signal outputter 501 outputs a second mode command (M_TU2) 506 at level 1 when the signal (SW_TUP) 505 is level 1, and outputs the second mode command (M_TU2) 506 at level −1 when the signal (SW_TUN) 504 is level 1.

A signal (SW_TU) 507 is an OR output of (SW_TUN) 504 and (SW_TUP) 505, and the U-phase mode command (M_TW) 83 is selectively output by a selector switch 508. The selector switch 508 selectively outputs the U-phase first mode command (M_TU1) 45 when the signal (SW_TU) 507 is level 0, and selectively outputs the U-phase second mode command (M_TU2) 506 when the signal (SW_TU) 507 is level 1.

As shown in FIG. 5, the mode command switcher 82 has a 3-phase independent configuration, the V phase and the W phase are the same as the U phase, and the descriptions thereof are omitted to avoid duplication.

Figure 6:
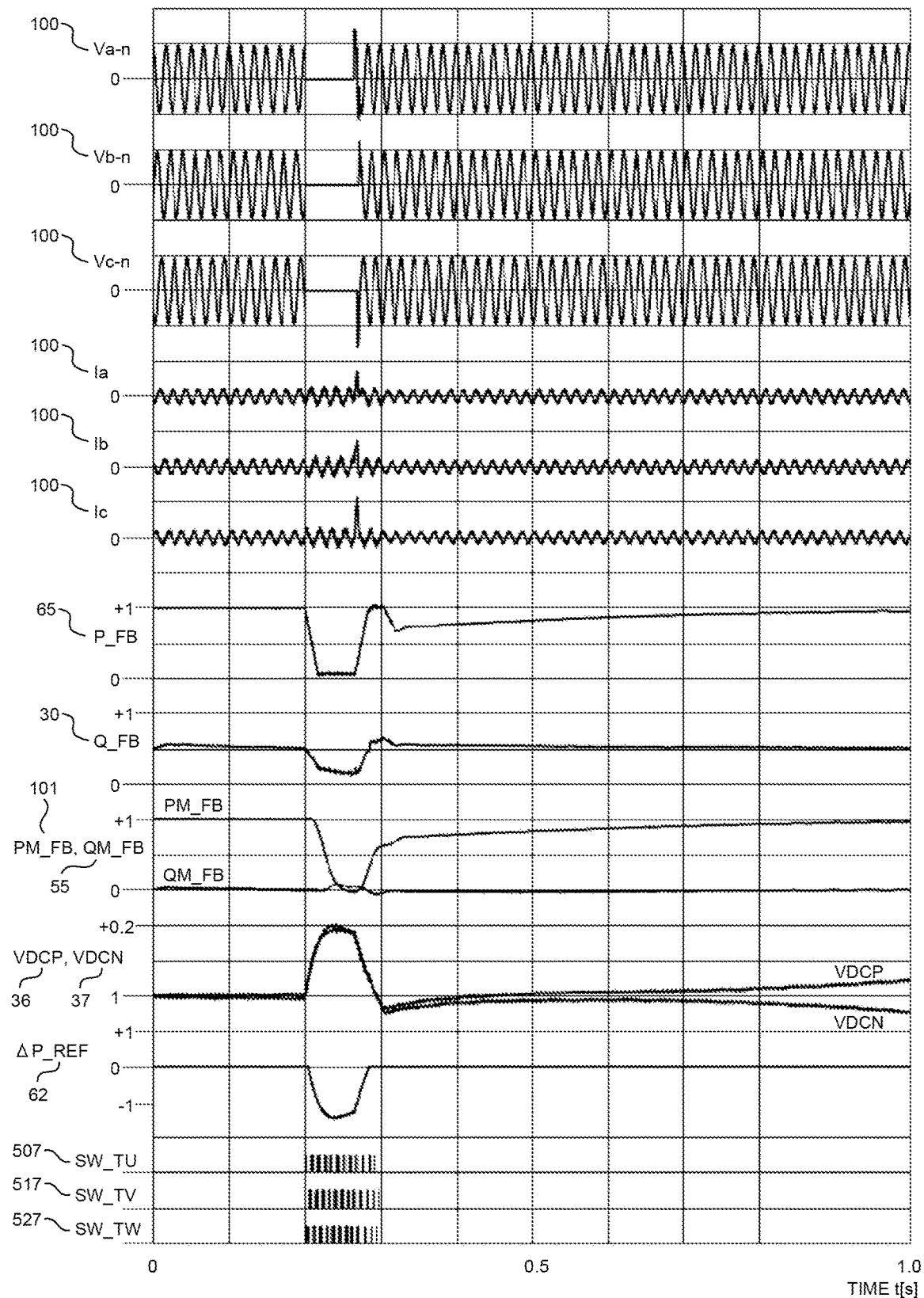
FIG. 6 is an operation waveform diagram when a close-end 3-phase ground fault occurs in the configuration according to claim 1 of the present invention.

FIG. 6 is an operation waveform diagram when a close-end 3-phase ground fault occurs when the FPC system of the embodiment according to Claim 1 of the present invention shown in FIGS. 1 to 5 is connected to a double-circuit power line or when loop transmission is performed.

Hereinafter, the operation waveform diagrams of the embodiments of the present invention are unified to the dipolar modulation in FIG. 4 as the PWM modulation.

Hereinafter, the measurement positions of the operation waveforms shown in FIG. 6 are described with the numbers and reference signs shown in FIG. 1. In FIG. 6, six waveforms from the top are the voltages (phase voltages) and the currents of a system-side terminal 100 of the unit transformer 18 in FIG. 1.

The seventh to twelfth waveforms from the top are the active power signal (P_FB) 65 and the reactive power signal (Q_FB) 30 of the unit transformer 18 on the first 3-level converter 1 side, an active power signal (PM_FB) 101 and the reactive power signal (QM_FB) 55 of the electrical rotating machine 21, the positive capacitor voltage signal (VDCP) 36, and the negative capacitor voltage signal (VDCN) 37. The thirteenth active power command correction (AP_REF) 62 from the top is the output of the auxiliary DC voltage regulator 61.

The fourteenth waveform from the top is the signal (SW_TU) 507 in FIG. 5. The signal (SW_TU) 507 in FIG. 5 selects the U-phase second mode command (M_TU2) 506 and becomes level 1 when outputting the U-phase mode command (M_Mu) 79. The fifteenth waveform from the top in FIG. 6 is a signal (SW_TV) 517 in FIG. 5, and the sixteenth waveform is a signal (SW_TW) 527 in FIG. 5.

In the above waveforms, a 3-phase ground fault occurs at time 0.2 [s] in FIG. 6. Since a ground fault occurs at the close end of the unit transformer 18, the phase voltage 100 becomes 0 for all the three phases.

During the close-end 3-phase ground fault period, the active power cannot be output to the transmission side, and the active power signal (P_FB) 65 becomes zero. Since the active power signal (PM_FB) 101 of the electrical rotating machine 21 follows the active power command (P_REF) 63, the active power from the electrical rotating machine 21 to the second 3-level converter 8 is stored in the positive capacitor (CBP) 15 and the negative capacitor (CBN) 16, and the positive capacitor voltage signal (VDCP) 36 and the negative capacitor voltage signal (VDCN) 37 rise sharply to 1.2 times their ratings.

Here, the capacitance of the positive capacitor (CBP) 15 and the negative capacitor (CBN) 16 is downsized to the limit to keep the direct-axis current controller 209 and the transvers-axis current controller 212 stable.

In FIG. 6, the system-side circuit breaker operates in four cycles after the 3-phase ground fault occurs to remove the fault phase, and the remaining one-line transmission is performed.

In the embodiment of the present invention, when the capacitor voltage signal (VC_DIF) 59, which is the deviation between the DC voltage signal (VC_FB) 38 and the DC voltage command (VC_REF) 39, exceeds the threshold of the dead band gain 60, the active power command correction (AP_REF) 62 rises to 1 PU in the electric motor direction by the auxiliary DC voltage regulator 61 to suppress the rise of the positive capacitor voltage signal (VDCP) 36 and the negative capacitor voltage signal (VDCN) 37 to return to the set value, and the active power command correction (AP_REF) 62 returns to zero. Thus, the active power signal (P_FB) 65 can also be brought close to the level before the close-end 3-phase ground fault.

The signal (SW_TU) 507, the signal (SW_TV) 517, and the signal (SW_TW) 527 intermittently become level 1 independently for three phases after the ground fault occurs, but the period in which the second mode command is selectively output by the mode command switcher 82 ends within two cycles after the fault phase is removed.

In a conventional FPC system, it has been necessary to wait nearly one second for the active power signal (P_FB) 65 to return. Since the decrease in the active power until the return is the acceleration power of the wind turbine or the hydraulic turbine, a significant increase in the rotational speed of the electrical rotating machine 21 could not be avoided. In order to avoid this increase in the rotational speed, the positive discharge resistance (RP) 3401 and the negative discharge resistance (RN) 3402 in FIG. 34 have been treated mostly as Joule heat.

In addition, the positive capacitor voltage signal (VDCP) 36 and the negative capacitor voltage signal (VDCN) 37 rise up to 1.2 times, but which is limited only during the ground fault period. Therefore, by appropriately selecting a capacitor, the influence on the reliability and lifetime of the capacitor can be avoided.

As described above, the embodiment of the present invention has an effect of implementing the FPC system capable of continuing operation even in the event of a close-end 3-phase ground fault without using a discharge resistance.

Figure 2:
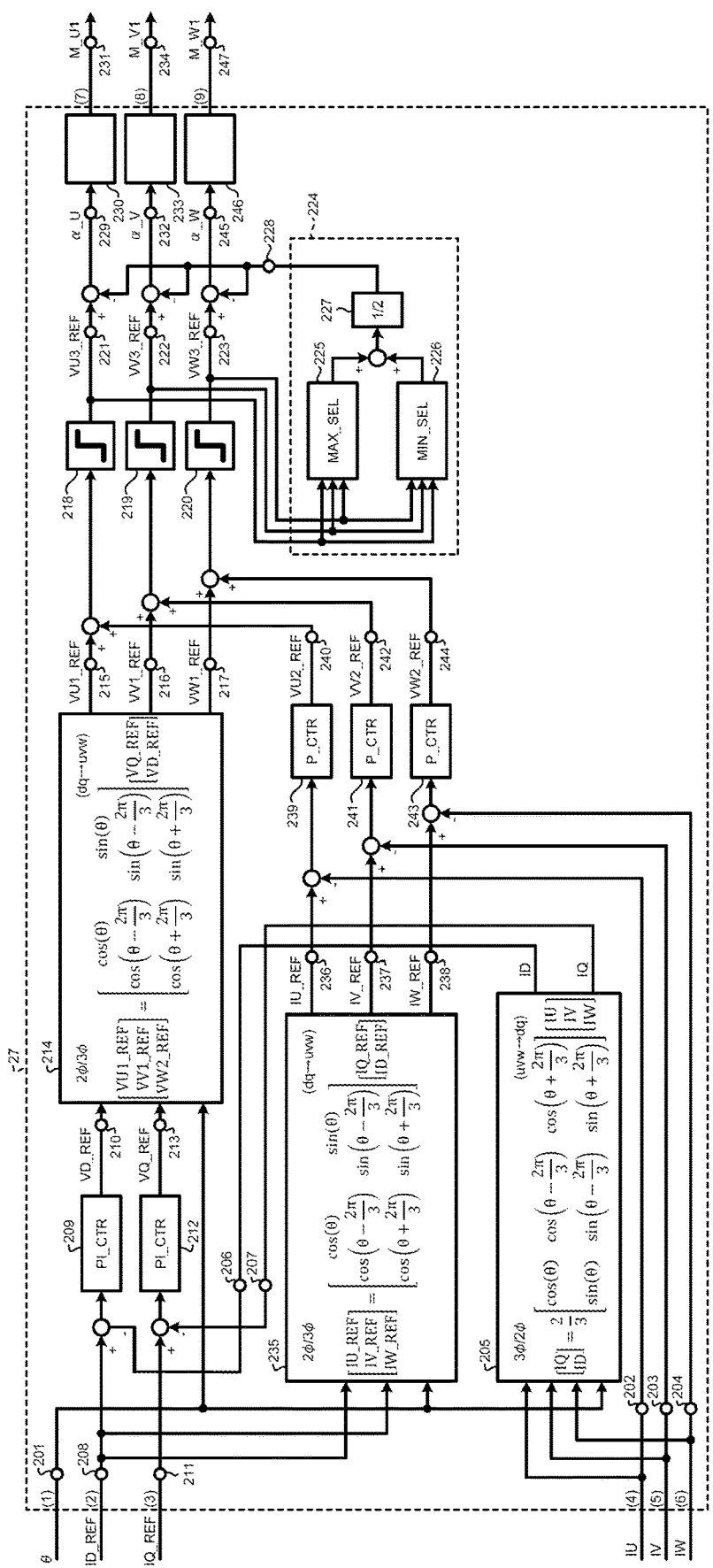
FIG. 2 is a diagram showing a current regulator according to claim 1 of the present invention.
Figure 7:
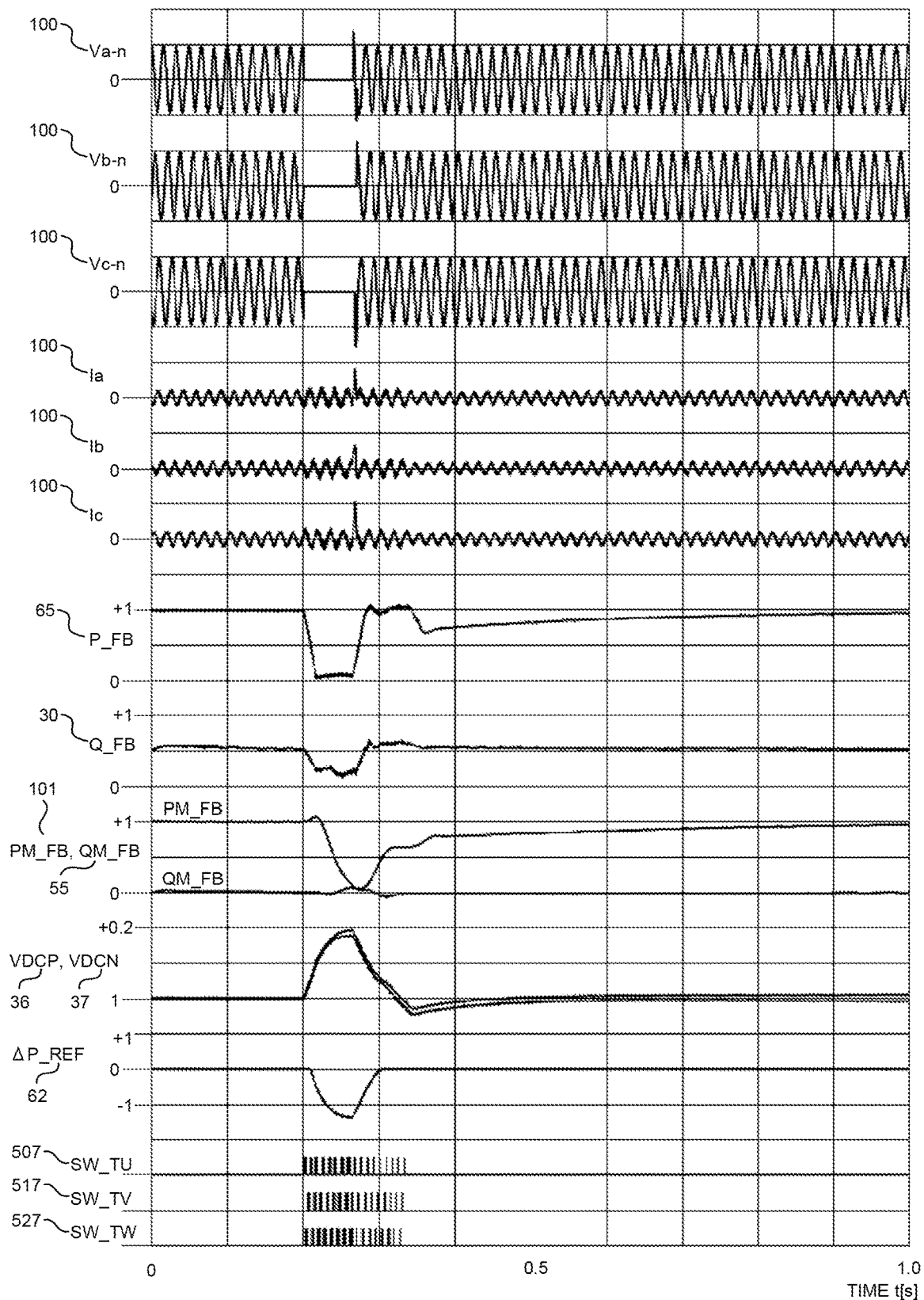
FIG. 7 is an operation waveform diagram when 3-phase individual AC current control is excluded in the configuration according to claim 1 of the present invention.

FIG. 7 is a diagram showing operation waveforms when the AC current regulators 239, 241, and 243 in FIG. 2 are excluded under the same conditions as in FIG. 6 in order to evaluate the effect of the AC current regulators. The measurement positions are the same as those in FIG. 6. When the AC current regulators are removed in the same configuration as in FIG. 6, the direct-axis current controller 209 and the transvers-axis current controller 212 become unstable. Then, the DC voltage signal (VC_FB) 38 exceeds twice the value before the ground fault, and the DC voltage command (VC_REF) 39 securing the economic efficiency cannot protect the positive capacitor (CBP) 15 and the negative capacitor (CBN) 16, and the operation cannot be continued.

In the following, FIG. 7 shows operation waveforms when the capacitor capacitance is doubled as compared with the case in FIG. 6. Due to this influence, the voltage increase rate of the positive capacitor voltage signal (VDCP) 36 and the negative capacitor voltage signal (VDCN) 37 immediately after the 3-phase ground fault at time 0.2 [s] is reduced to ½ as compared with the case in FIG. 6.

When the AC current regulators are removed, it is necessary to increase the capacitor capacitance of the positive capacitor (CBP) 15 and the negative capacitor (CBN) 16 to about 2 times in order to keep the direct-axis current controller 209 and the transvers-axis current controller 212 stable in the event of a symmetrical fault such as a 3-phase ground fault and to increase the capacitor capacitance to about 4 times in the event of an asymmetrical fault. This indicates a capacitor capacitance reduction effect of the AC current regulators.

Figure 8:
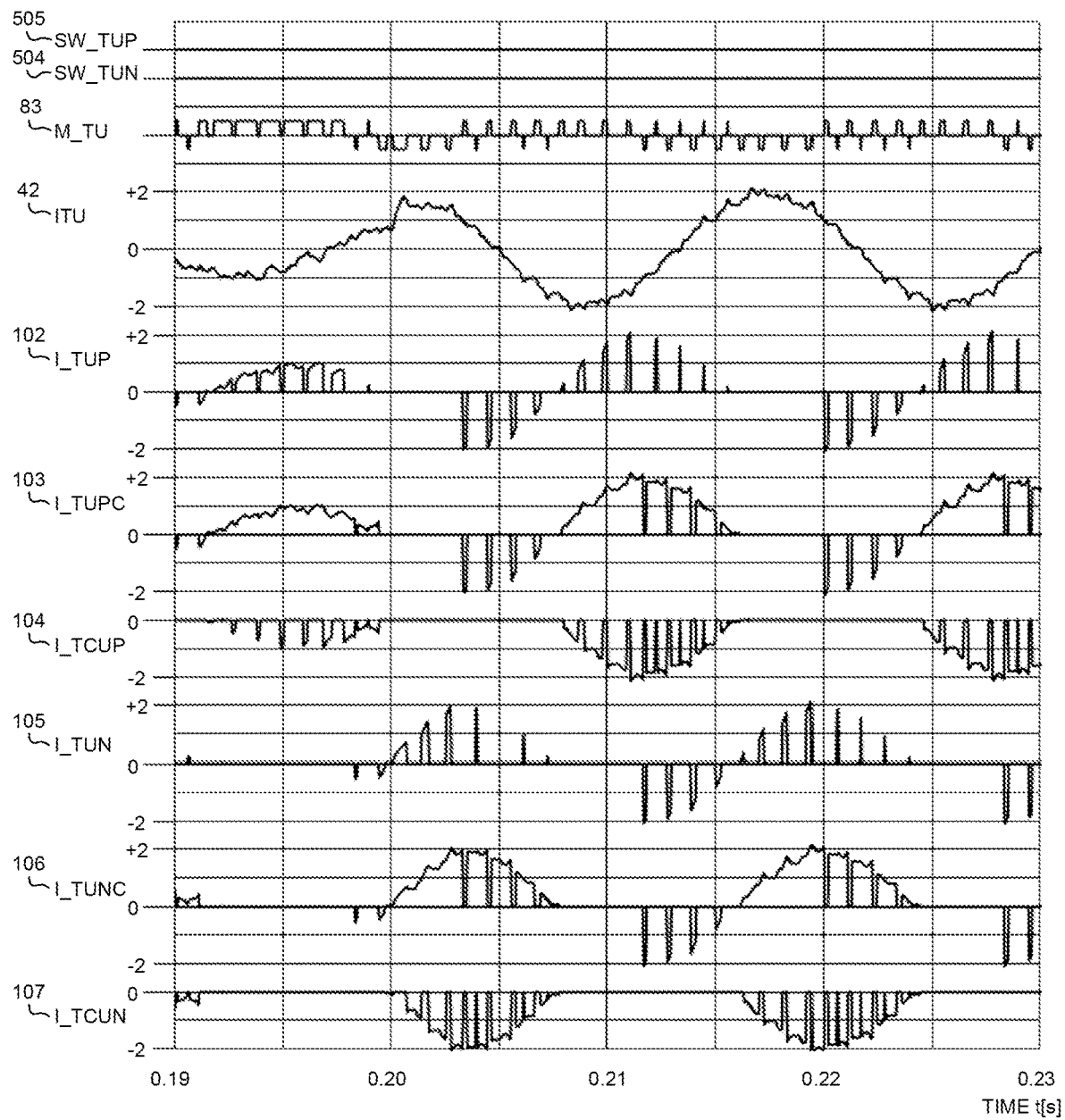
FIG. 8 is an operation waveform diagram when a mode switcher is excluded in the configuration according to claim 1 of the present invention.
Figure 9:
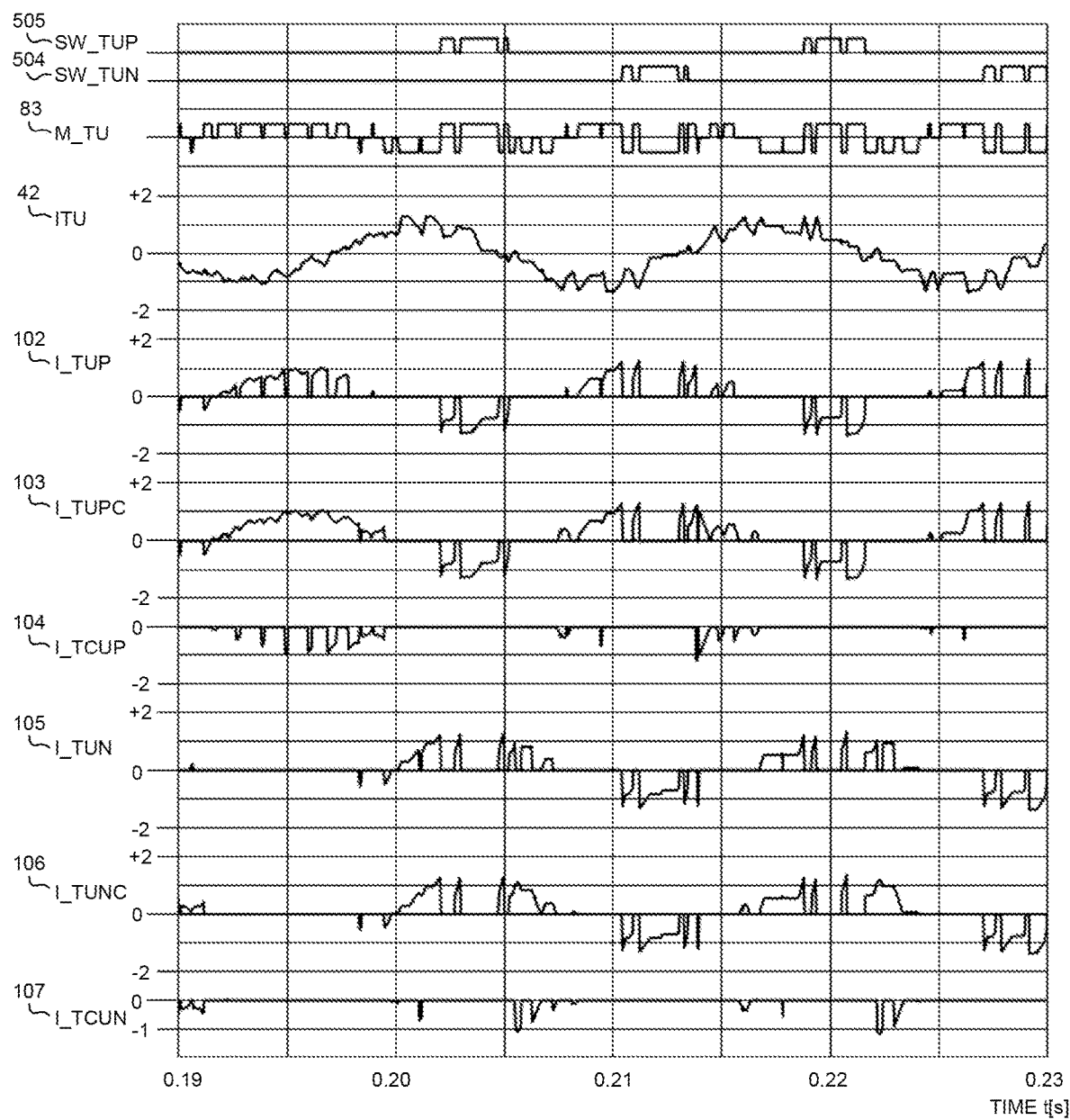
FIG. 9 is an operation waveform diagram when the mode switcher is activated in the configuration according to claim 1 of the present invention.

FIGS. 8 and 9 are operation waveform diagrams for evaluating an overcurrent suppression effect. FIG. 8 shows a case in which the mode command switcher 82 is excluded, and FIG. 9 shows a case in which the operation is performed.

In the following, the measurement positions of the operation waveforms shown in FIG. 8 are described with the numbers and reference signs shown in FIGS. 5 and 1.

In the two waveforms from the top, the U-phase mode command (M_TU) 83 of the first 3-level converter 1 is switched to level+1 when the signal (SW_TUP) 505 in FIG. 5 is level 1. When the signal (SW_TUN) 504 is level 1, the U-phase mode command (M_TU) 83 is switched to level −1. In the case in FIG. 8, since the mode command switcher 82 is excluded, the level is 0.

Next, the third waveform from the top is the U-phase mode command (M_TU) 83 of the first 3-level converter 1 in FIG. 1.

The reference sign 42 is the U-phase current (ITU), and the positive side indicates the current in the outflow direction from the U-phase terminal of the first 3-level converter 1.

A reference sign 102 is a U-phase P element current (I_TUP) of the first 3-level converter 1; the positive side indicates the current value of the electronic switch, and the negative side indicates the current value of the FWD.

A reference sign 103 is a U-phase PC element current (I_TUPC) of the first 3-level converter 1; the positive side indicates the current value of the electronic switch, and the negative side indicates the current value of the FWD.

Reference sign 104 is a U-phase P-side clamp diode current (I_TCUP) of the first 3-level converter 1, and a negative side indicates a current value of the diode.

A reference sign 105 is a U-phase N element current (I_TUN) of the first 3-level converter 1; the positive side indicates the current value of the electronic switch, and the negative side indicates the current value of the FWD.

A reference sign 106 is a U-phase NC element current (I_TUNC) of the first 3-level converter 1; the positive side indicates the current value of the electronic switch, and the negative side indicates the current value of the FWD.

A reference sign 107 is a U-phase N-side clamp diode current (I_TCUN) of the first 3-level converter 1, and a negative side indicates the current value of the diode.

In FIG. 8, the impedance of the unit transformer 18 and a harmonic filter 22 is adjusted so that the current in the event of a fault is twice the current value in the steady state before the ground fault occurs at time 0.2 [s], in accordance with the design of a conventional standard 3-level converter.

FIG. 9 shows when the mode command switcher 82 is operating. In the following, the measurement positions of the operation waveforms shown in FIG. 9 are the same as those in FIG. 8, and the descriptions thereof are omitted to avoid duplication.

After a 3-phase ground fault occurs at time 0.2 [s], the signal (SW_TUP) 505 changes to level 1 twice by time 0.205 seconds. In the embodiment in FIG. 9, the threshold (I1) of the comparators with hysteresis 502 and 503 is set to 1.25 times the maximum current value during steady operation. Therefore, when the signal 505 rises to level 1, the U-phase current (ITU) is switched from the electronic switches of the N element and the NC element to the FWDs of the P element and the PC element, and the maximum current of the U-phase current (ITU) is reduced to 1.25 times from 2 times in FIG. 8. In addition, the signal (SW_TUN) 504 changes to level 1 three times in a period from time 0.210 [s] to time 0.205 [s].

When the signal 504 rises to level 1, the U-phase current (ITU) is switched from the electronic switches of the P element and the PC element to the FWDs of the N element and the NC element, and the maximum current of the U-phase current (ITU) is reduced to 1.25 times from 2 times in FIG. 8.

In the embodiment in FIG. 9, the threshold (I2) of the comparators with hysteresis 502 and 503 is set to 0.4 to 0.6 times the threshold (I1). Therefore, the duration of the signal 504 and the signal 505 is long, and the number of times of rising can be reduced. As a result, there is an effect of reducing the number of switching operations during a system fault and reducing the switching loss of the electronic switches and the FWDs. In addition, since the mode command switcher 82 reduces the overcurrent level by 35% from 2 times to 1.25 times the steady state, there is an effect of reducing the conduction loss of the electronic switches and the FWDs.

Another embodiment of the mode command switcher 82 is described with reference to FIG. 10.

The current signal (ITU) 42 from the instrument current transformer 28 is input to a comparator 1002, level 1 is output as a signal (SW_TUN) 1004 when the current signal (ITU) 42 exceeds the positive threshold I1 to the positive side, and level 0 is output when the current signal (ITU) 42 falls below the positive threshold I1. At the same time, the current signal (ITU) 42 from the instrument current transformer 28 is input to a comparator 1003, level 1 is output as a signal (SW_TUP) 1005 when the current signal (ITU) 42 exceeds the threshold −I1 to the negative side, and level 0 is output when the current signal (ITU) 42 falls below the threshold −I1.

A timer circuit 1006 receives the signal (SW_TUP) 1005 and the signal (SW_TUN) 1004 and outputs a U-phase second mode command (M_TU2) 1007 and a signal (SW_TU) 1008.

A selector switch 1009 selectively outputs the U-phase first mode command (M_TU1) 45 when the signal (SW_TU) 1008 is level 0, and the U-phase second mode command (M_TU2) 1007 when the signal (SW_TU) 1008 is level 1 as the U-phase mode command (M_TU) 83.

Figure 10:
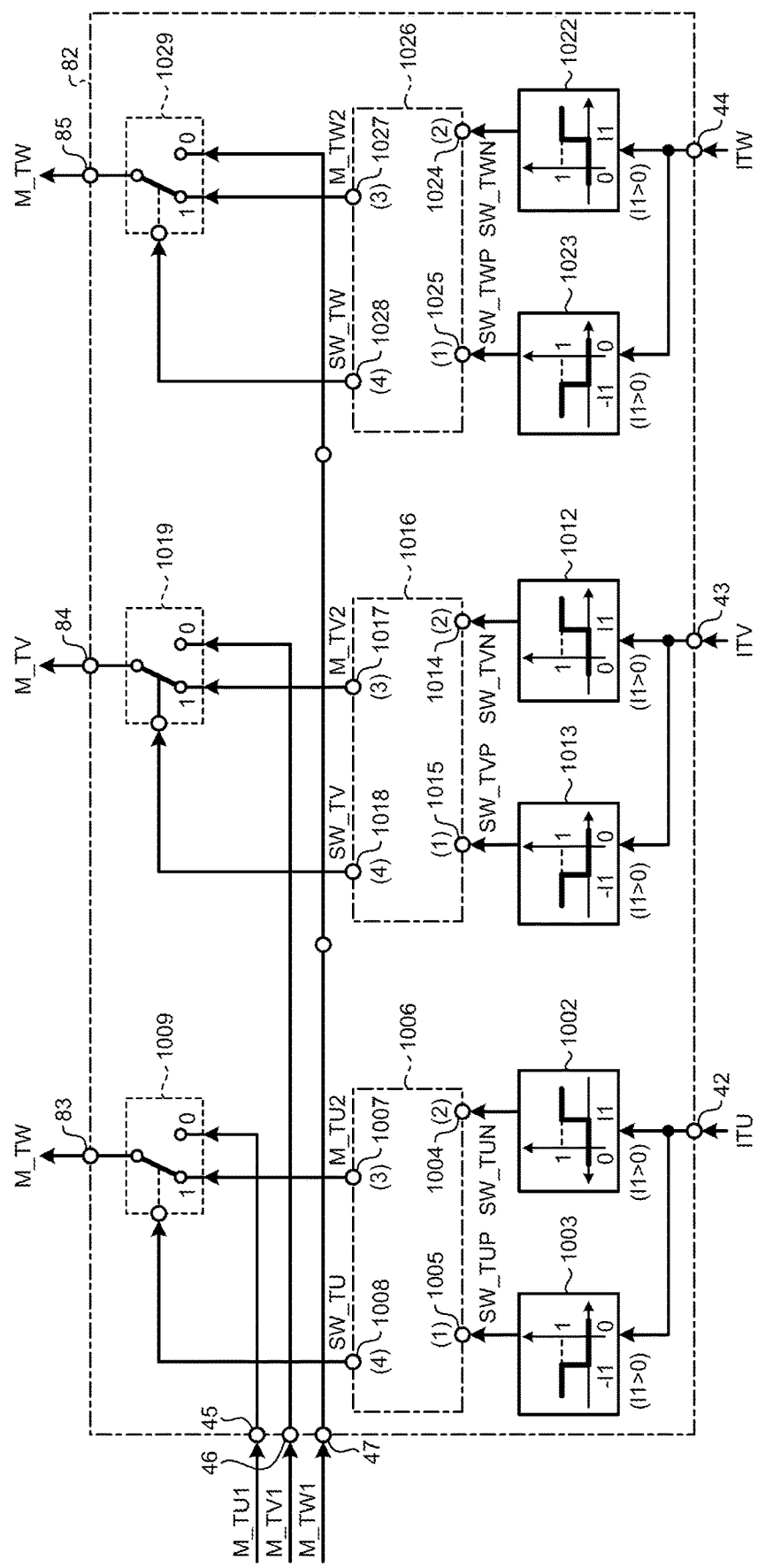
FIG. 10 is a diagram showing another mode switcher according to claim 1 of the present invention.

As shown in FIG. 10, the mode command switcher 82 has a 3-phase independent configuration, the V phase and the W phase are the same as the U phase, and the descriptions thereof are omitted to avoid duplication.

An embodiment of the timer circuit 1006 is described with reference to FIG. 11.

The signal (SW_TUP) 1005 is input to the set side of a flip-flop circuit with reset priority 1102, and an output signal (X) 1103 is input to an on-delay circuit 1104. An output signal (Y) 1105 of the on-delay circuit 1104 is input to the reset side of the flip-flop circuit 1102. Similarly, the signal (SW_TUN) 1004 is input to the set side of a flip-flop circuit with reset priority 1106, and an output signal 1107 is input to an on-delay circuit 1108. An output signal 1109 of the on-delay circuit 1108 is input to the reset side of the flip-flop circuit 1106.

A signal outputter 1110 outputs level 1 as the second mode command (M_TU2) 1007 when the signal 1103 is level 1, and outputs level −1 as the second mode command (M_TU2) 1007 when the signal 1107 is level 1. The signal (SW_TU) 1008 is an OR output of the signal 1103 and the signal 1107.

In the above, the on-delay circuits 1104 and 1108 have the same configuration.

An example of the on-delay circuit 1104 is described with reference to FIG. 12.

When the input signal (X) 1103 changes from level 0 to level 1 and then maintains level 1 for more than a delay set time Td, the output signal (Y) 1105 changes from level 0 to level 1. When the input signal (X) 1103 changes from level 1 to level 0, the output signal (Y) 1105 changes from level 1 to level 0.

Figure 11:
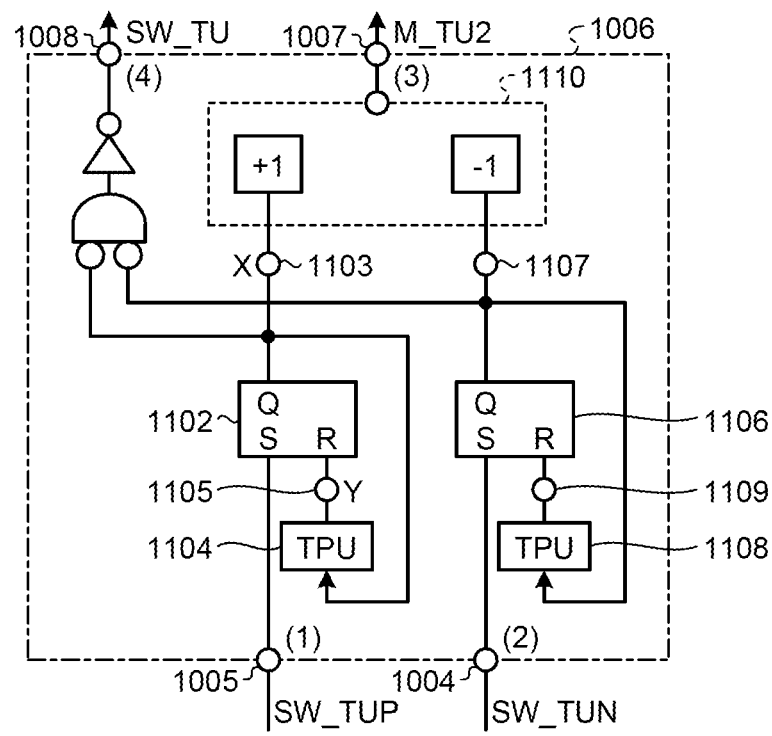
FIG. 11 is a diagram showing a timer circuit of the other mode switcher according to claim 1 of the present invention.
Figure 12:
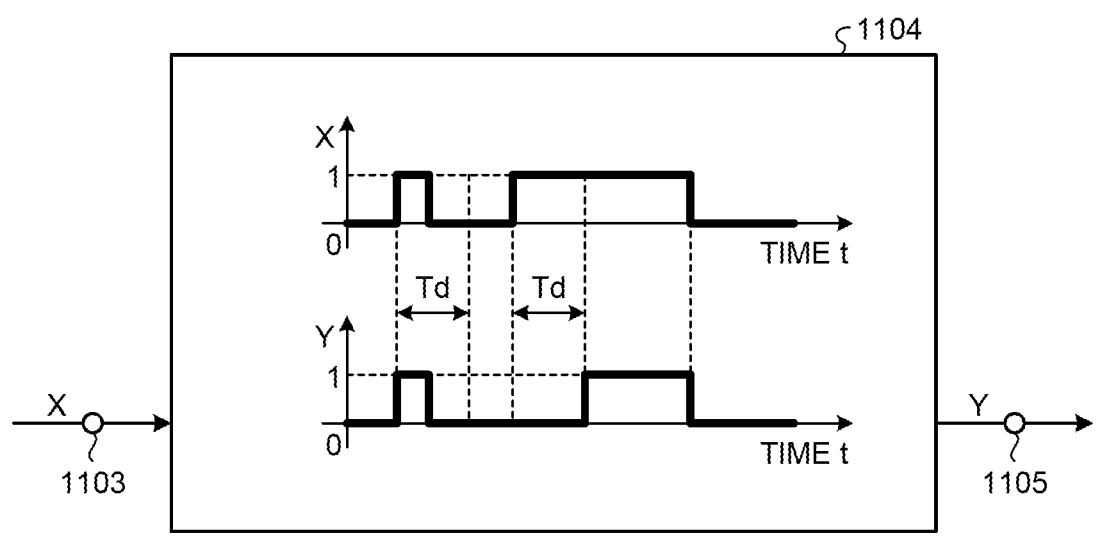
FIG. 12 is a diagram showing operation of an on-delay circuit used in the present invention.

According to the embodiment in FIGS. 10 to 12, of the mode command switcher 82, the range of the signal 1004 (SW_TUN), the signal 1005 (SW_TUP), the signal 1014 (SW_TVN), the signal 1015 (SW_TVP), the signal 1024 (SW_TWN), the signal 1025 (SW_TWP), the U-phase mode command (M_TU) 83, the V-phase mode command (M_TV) 84, and the W-phase mode command (M_TW) 85 can be achieved only by the 2-level signal logical circuit and timer circuit, and there is an effect that the range can be achieved without being limited by the calculation cycle of a microprocessor. Therefore, it is possible to implement the first 3-level converter 1 suitable for small-capacity applications in which a high PWM frequency is often selected to downsize the system.

A system configuration according to a second embodiment according to Claim 1 of the present invention is described with reference to FIG. 13. The descriptions of the same numbers as those described in FIG. 1 are the same and are omitted to avoid duplication.

An active power regulator 1366 matches and receives an active power signal (PM_FB) 1301 from the power detector 54 provided on the electrical rotating machine 21 side and the correction active power command 64, and outputs a signal 1367. A mode selector switch 1368 selectively outputs the output signal 1367 of the active power regulator 1366 and the output signal 75 of the speed regulator 74, and inputs the signal to the current regulator 51 as a transversaxis current command (IMQ_REF) 1369.

Figure 13:
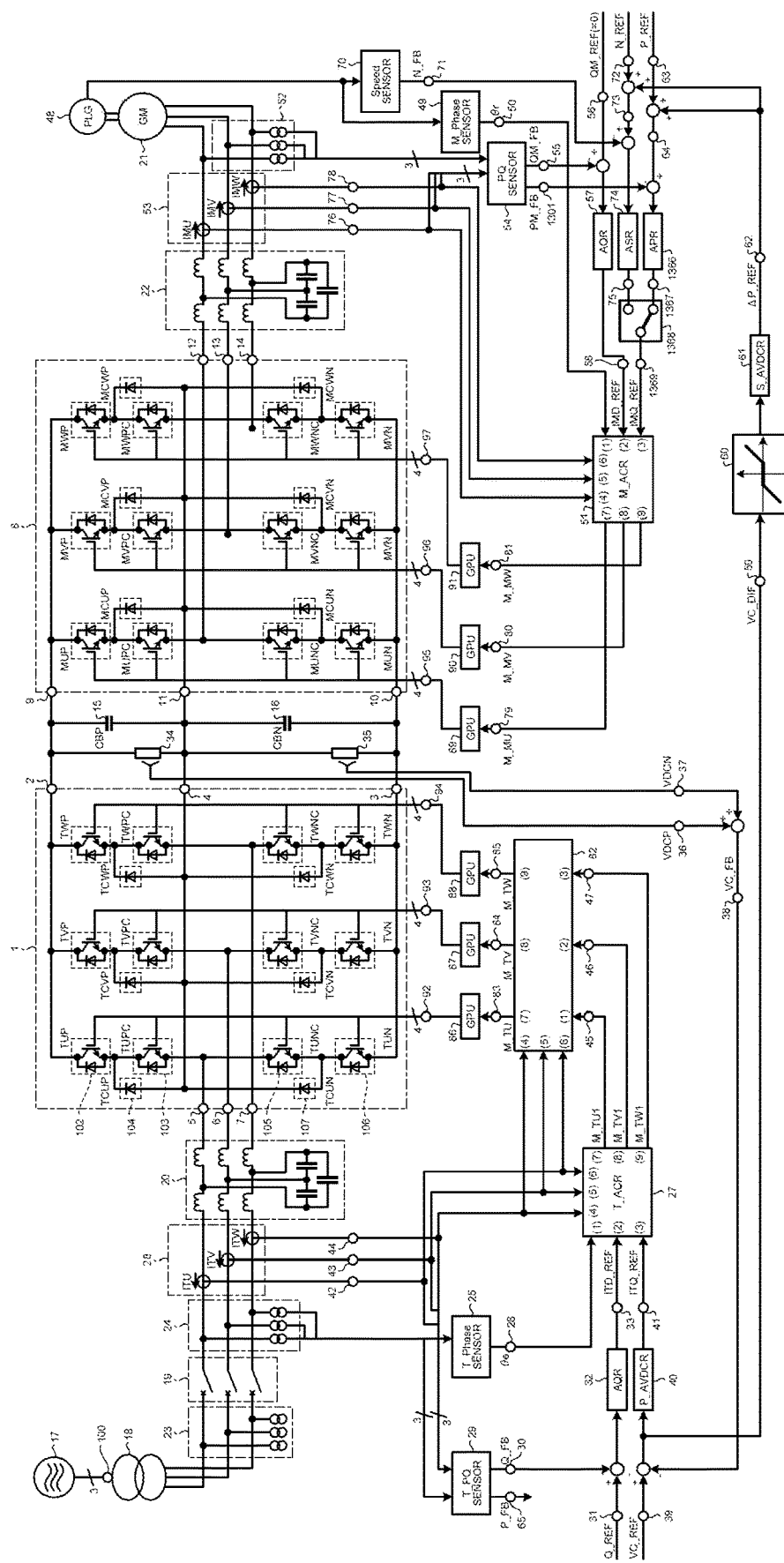
FIG. 13 is a diagram showing a configuration of a second example according to claim 1 of the present invention.

According to the embodiment in FIG. 13, since the external active power command (P_REF) 64 and the active power signal (PM_FB) 1301 are matched and input to the active power regulator 1366, there is an effect of quickly recovering after fault phase removal and minimizing the increase in rotation speed of the electrical rotating machine 21.

A system configuration according to a third embodiment according to Claim 1 of the present invention is described with reference to FIG. 14. The descriptions of the same numbers as those described in FIG. 1 are the same and are omitted to avoid duplication.

An active power regulator 1466 receives the active power signal (P_FB) 65 from the power detector 29 and the external active power command 63 (P_REF) that have been matched, and outputs a signal 1467. A speed regulator 1474 receives the rotational speed signal (N_FB) 71 from the speed detector 70 and the external speed command (N_REF) 72 that have been matched, and outputs a signal 1475.

A mode selector switch 1468 selectively outputs the output signal 1467 of the active power regulator 1466 and the output signal 1475 of the speed regulator 1474 as a signal 1469.

The match signal (VC_DIF) 59 of the DC voltage signal (VC_FB) 38 and the DC voltage command (VC_REF) 39 is input to a dead band gain 1460, and the input to an auxiliary DC voltage regulator 1461 is a value other than zero when the absolute value of deviation exceeds a threshold. The auxiliary DC voltage regulator 1461 outputs a transvers-axis current command correction (AIMQ_REF) 1462, energizes it to the signal 1469 from the mode selector switch 1468, and inputs it to the current regulator 51 as a transvers-axis current command (IMQ_REF) 1470. The transvers-axis current command correction (AIMQ_REF) 1462 energizes the transvers-axis current command (IMQ_REF) 1470 to the electrical rotating machine 21 in the power generation direction when the match signal (VC_DIF) 59 is positive and the DC voltage signal (VC_FB) 38 is lower than the DC voltage command (VC_REF) 39, and energizes the transvers-axis current command (IMQ_REF) 1470 in the electric direction when the match signal (VC_DIF) 59 is negative.

Figure 14:
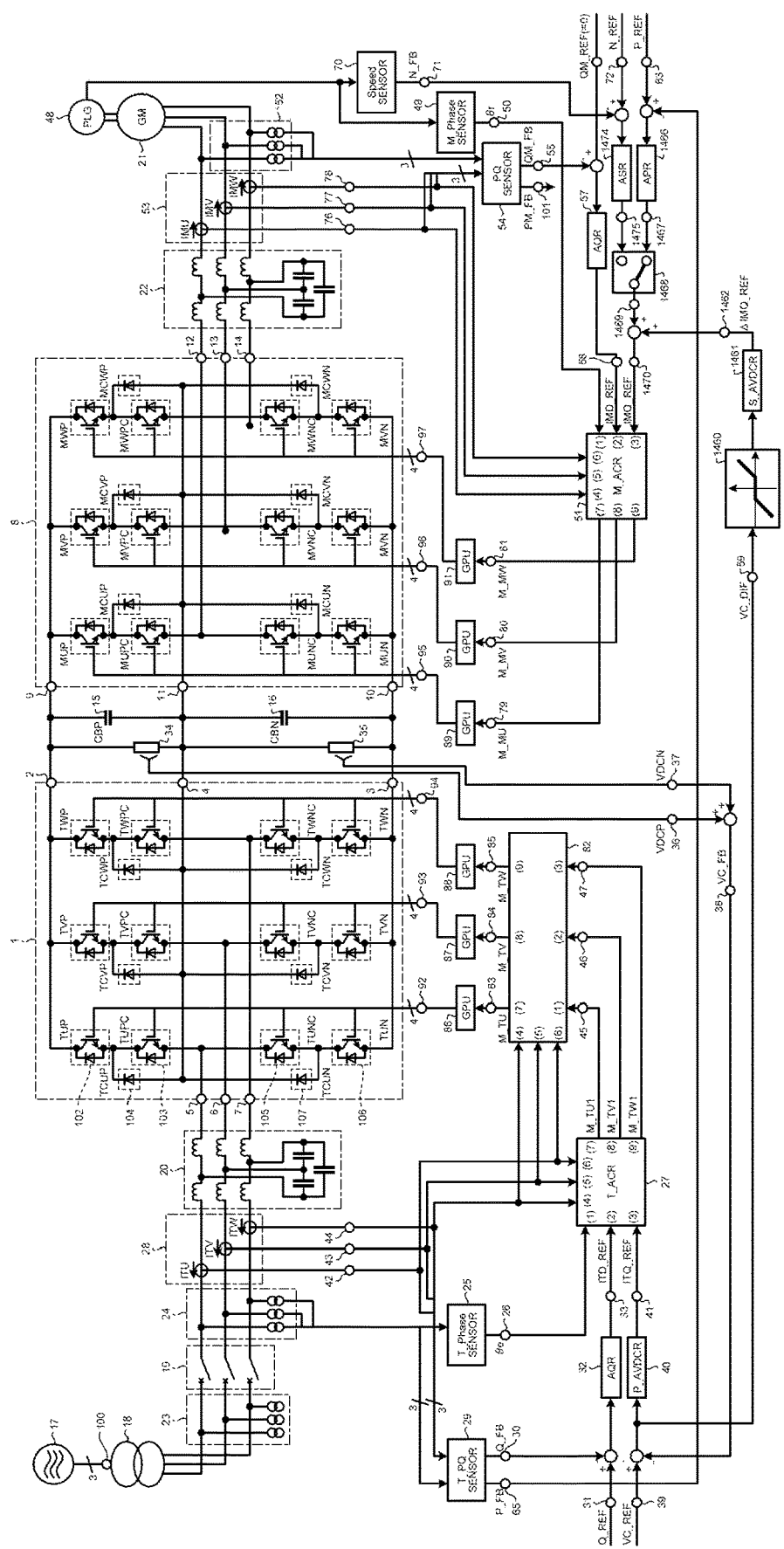
FIG. 14 is a diagram showing a configuration of a third example according to claim 1 of the present invention.

According to the embodiment in FIG. 14, since the transvers-axis current command (IMQ_REF) 1470 obtained by energizing the transvers-axis current command correction (AIMQ_REF) 1462 to the signal 1469 from the mode selector switch 1468 is directly input to the current regulator 51, there is an effect of suppressing and recovering the capacitor voltage signal (VC_DIF) 59 at a high speed particularly when the speed regulator 1474 is used.

An embodiment according to Claim 2 of the present invention is described with reference to FIGS. 15 and 16.

Figure 15:
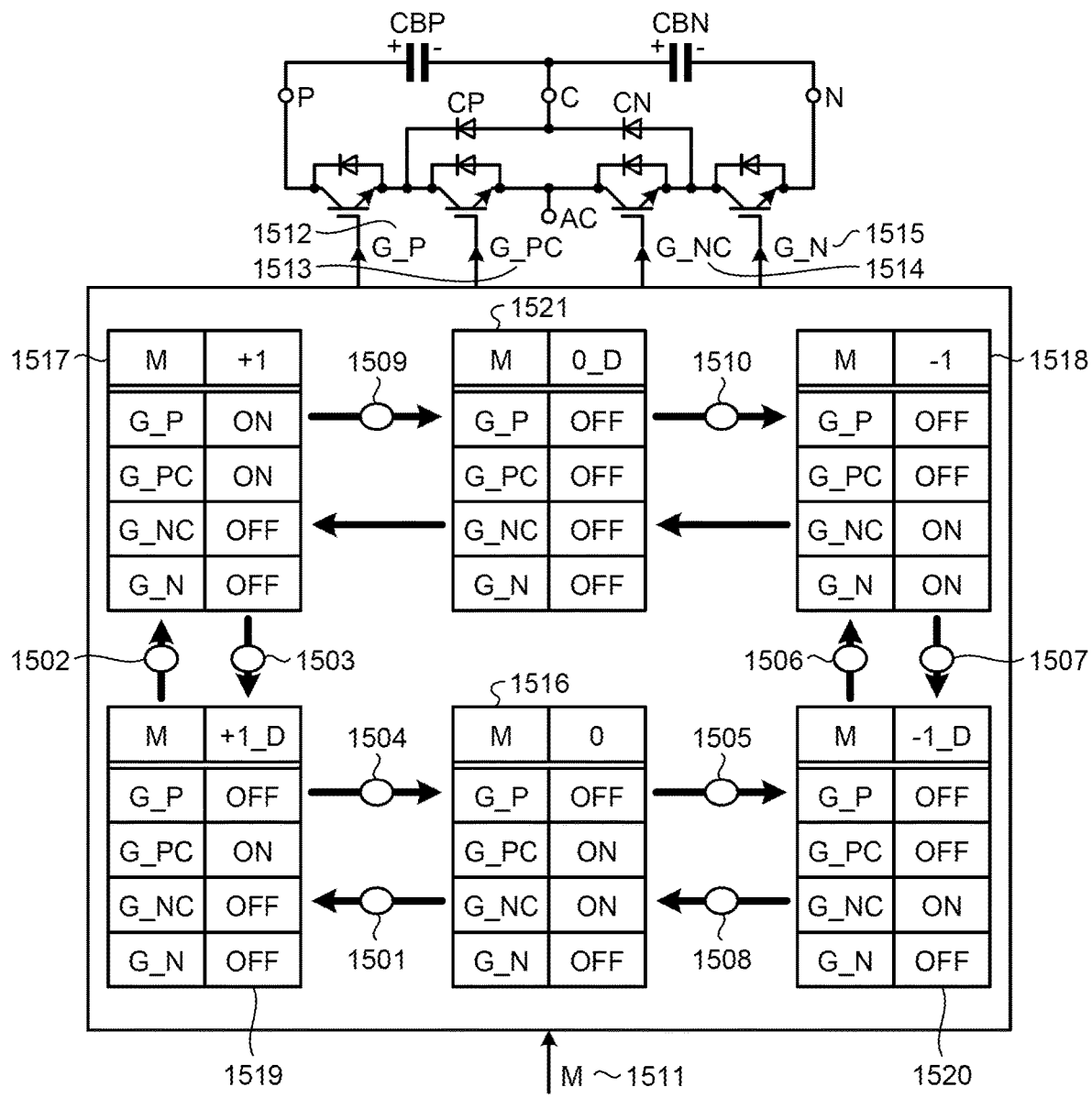
FIG. 15 is a diagram showing mode transition according to claim 2 of the present invention.

FIG. 15 shows the state transition of a mode command (M) 1511, which is one input to the gate pulse generators 86, 87, and 88, and four outputs of a gate pulse (G_P) 1512, an output gate pulse (G_PC) 1513, an output gate pulse (G_NC) 1514, and an output gate pulse (G_N) 1515.

A reference sign 1516 indicates a four-output gate pulse state in a mode command (M=0) state, a reference sign 1517 indicates a four-output gate pulse state in a mode command (M=+1) state, and a reference sign 1518 indicates a four-output gate pulse state in a mode command (M=−1) state.

In the present invention, in order to secure the dead time compensation period of the first 3-level converter 1, a dead time compensation circuit is provided in the gate pulse generators 86, 87, and 88 that are output stages of the mode command switcher 82 to prevent a short circuit.

In the following, an operation in a normal operation state is described.

The dead time compensation period of the first 3-level converter 1 is provided during the transition between the mode command (M=0) state 1516 and the mode command (M=+1) state 1517.

For the sake of explanation, the mode during the dead time period is referred to as a (M=+1_D) 1519 state. In addition, a dead time period of the first 3-level converter is provided during the transition between the mode command (M=0) state 1516 and the mode command (M=−1) state 1518. For the sake of explanation, the mode during the dead time period is referred to as a (M=−1_D) 1520 state. The transitions between the above states are denoted by 1501, 1502, 1503, 1504, 1505, 1506, 1507, and 1508.

Figure 16:
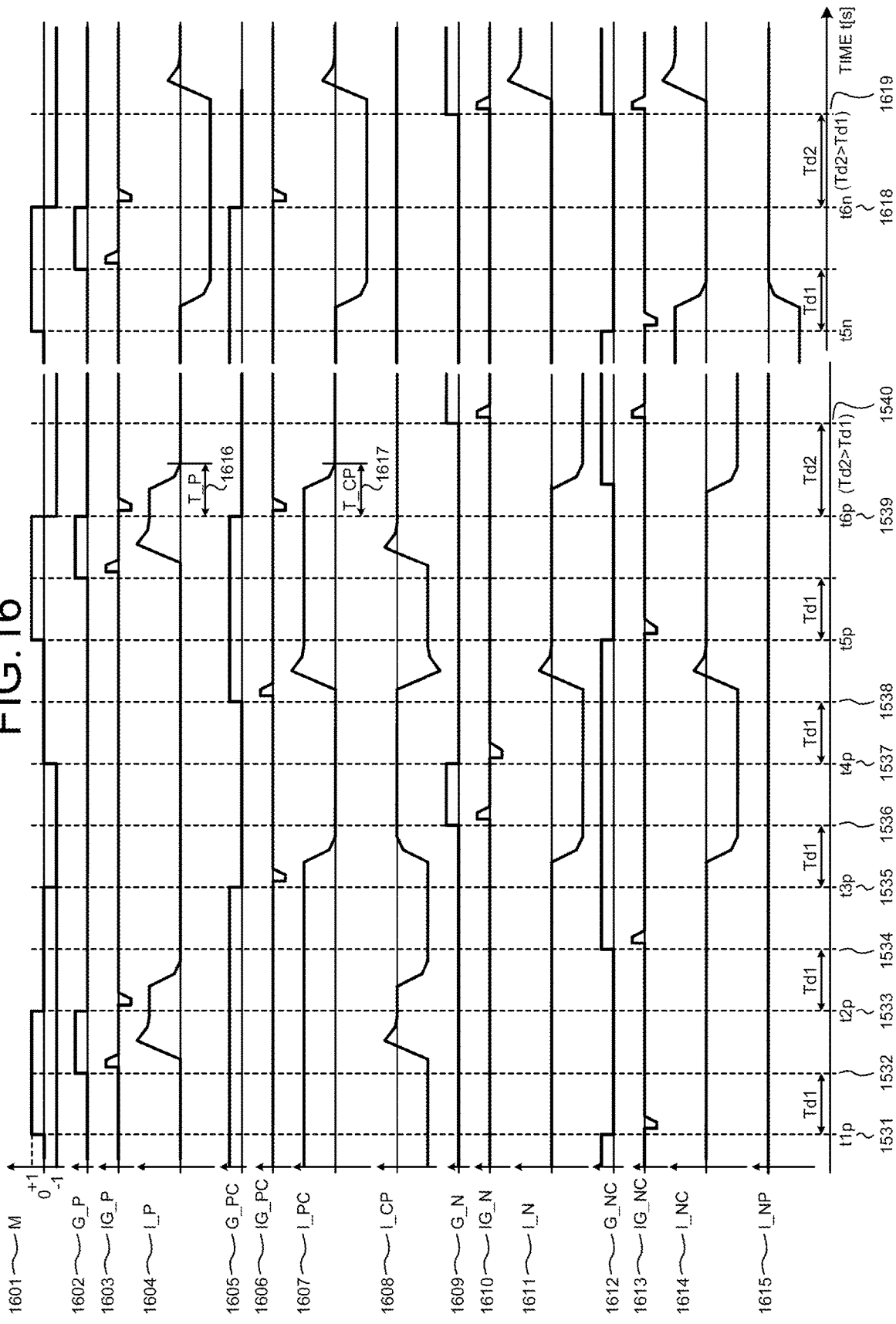
FIG. 16 is a diagram showing operation according to claim 2 of the present invention.

FIG. 16 is a waveform diagram showing waveforms of the respective components with the dead time period expanded.

From the top in FIG. 16, a mode command (M) 1601, a gate pulse (G_P) 1602 to the P element, a gate current (IG_P) 1603 of the P element, a current (I_P) 1604 of the P element, a gate pulse (G_PC) 1605 of the PC element, a gate current (IG_PC) 1606 of the PC element, a current (I_PC) 1607 of the PC element, a P-side clamp diode current (I_CP) 1608, a gate pulse (G_N) 1609 to the N element, a gate current (IG_N) 1610 of the N element, a PC current (I_N) 1611 of the N element, a gate pulse (G_PC) 1612 of the NC element, a gate current (IG_NC) 1613 of the NC element, a current (I_NC) 1614 of the NC element, and an N-side clamp diode current (I_CN) 1615 are shown.

Here, the four element currents 1604, 1607, 1611, and 1614 indicate the current between the collector and emitter of the electronic switch in the positive direction and the current between the anode and cathode of the FWD in the negative direction. The two clamp diode currents 1608 and 1615 indicate the currents in the negative direction. The four gate currents 1603, 1606, 1610, and 1613 indicate the currents in the positive direction during turn-on and in the negative direction during turn-off.

The gate transition 1501 in FIG. 15 occurs when the mode command (M) 1601 changes from level 0 to level 1 at time (tlp) 1531 in FIG. 16, and the transition 1502 occurs at time 1532 after a dead time set period Td1. Similarly, the gate transitions 1503 to 1508 also occur from time (t2p) 1533 to time 1538 in FIG. 16.

The above is the operation of the dead time compensation circuit provided in the gate pulse generators 86, 87, and 88 in the normal operation state.

Next, an operation when the current detection value exceeds the threshold I1 at the mode command switcher 82 according to Claim 1 of the present invention is described.

In the first 3-level converter 1 of the present invention, a dead time compensation period Td2 is provided during the transition between the mode command (M=+1) state 1517 and the mode command (M=−1) state 1518. For the sake of explanation, the mode during the dead time period is referred to as a (M=0_D) 1521 state. The dead time compensation period Td2 in the 1521 state is set to be longer than the dead time set period Td1 of 1519 and 1520.

In the following, the operation when the current detection value exceeds the threshold I1 at time (t6 p) 1539 is described with reference to FIG. 16.

The state immediately before time (t6 p) 1539 is the same as the state immediately before the previous time (t2 p) 1533, and the description thereof is omitted to avoid duplication.

A state transition 1509 in FIG. 15 occurs at time (t6 p) 1539. FIG. 16 shows a state in which the current (I_P) 1604 of the element P is positive and the electronic switch conducts a current. When the mode command (M) 1601 changes from (M=+1) to (M=−1) in this state, the gate pulse (G_P) 1602 to the P element and the gate pulse (G_PC) 1605 of the PC element change from ON to OFF, and both the electronic switches of the P element and the PC element start turn-off.

The turn-off time from the off-change of the gate pulse to the element-off state becomes longer as the current value at the start of turn-off becomes larger. Therefore, since the turn-off is at time (t6p) 1539 when the current detection value exceeds the threshold I1, both of a turn-off time (T_p) 1616 of the P element and a turn-off time (T_CP) 1617 of the PC element become longer than the turn-off time during the normal operation. Therefore, in terms of preventing a short circuit, it is desirable to set the dead time compensation period Td2 longer than usual. On the other hand, if the setting of the dead time compensation period Td2 is too long, there is a side effect such as loss of controllability.

At time 1540 after the dead time compensation period Td2 from time (t6 p) 1539, the gate pulse (G_N) 1609 to the N element and the gate pulse (G_PC) 1612 to the NC element change to ON, but in the arm, the FWD has already started conducting a current at time (t6 p) 1539, and no current/voltage change occurs in both the N element and the NC element. As a result, even if the dead time compensation period Td2 is set to be longer, no adverse effect occurs.

The adverse effect can occur when the P element current (I_P) is negative and the FWD conducts a current at the time when the mode command (M) 1601 changes from (M=+1) to (M=−1) as at time (t6 n) 1618 in FIG. 16.

In this case, since the PC current (I_N) 1611 of the N element and the current (I_NC) 1614 of the NC element start turn-on at time 1619 after the dead time compensation period Td2 from time (t6n) 1618 in FIG. 16, an influence of setting the dead time compensation period Td2 to be longer appears. However, since the mode command switcher 82 of the present invention detects the sign of the element current and performs the mode switching, the phenomena at time (t6 n) 1618 and time 1619 in FIG. 16 are suppressed.

From the above, by setting the dead time compensation period Td2 longer than a normal dead time compensation period Td1, it is possible to suppress adverse effects due to the turn-on delay while preventing a short circuit.

A system configuration of a first embodiment according to Claim 3 of the present invention is described with reference to FIG. 17. The descriptions of the same numbers as those described in FIG. 1 are the same and are omitted to avoid duplication.

The U-phase current (IMU) 76, the V-phase current (IMV) 77, and the W-phase current (IMW) 78 from the instrument current transformer 53 are input to a current regulator 1701. The current regulator 1701 outputs a U-phase first mode command (M_MU1) 1779, a V-phase first mode command (M_MV1) 1780, and a W-phase first mode command (M_MW1) 1781 to a mode command switcher 1702. Here, the configuration of the current regulator 1701 may be the same as that of the current regulator 51 in FIG. 1.

The direct-axis current command (IMD_REF) 58 from the reactive power regulator 57 is branched and output, and is input to the mode command switcher 1702 and a 2-phase/3-phase converter 1703. In addition, the transvers-axis current command (IMQ_REF) 69 from the mode selector switch 68 is branched and output, and is input to the mode command switcher 1702 and the 2-phase/3-phase converter 1703.

The 2-phase/3-phase converter 1703 receives the rotation phase signal (θr) 50, outputs a U-phase current command (IMU_REF) 1704, a V-phase current command (IMV_REF) 1705, and a W-phase current command (IMW_REF) 1706, and inputs them to the mode command switcher 1702. The voltage signal (VDCP) 36 of the positive capacitor (CBP) 15 and the voltage signal (VDCN) 37 of the negative capacitor (CBN) 16 are input to the mode command switcher 1702.

The mode command switcher 1702 receives the above signals, and outputs, to gate pulse generators 1789, 1790, and 1791, a U-phase mode command (M_MU) 1707, a V-phase mode command (M_MV) 1708, and a W-phase mode command (M_MW) 1709 to the second 3-level converter 8. The gate pulse generators 1789, 1790, and 1791 each output 4-output gate pulses 1795, 1796, and 1797 to the second 3-level converter 8. Here, the gate pulse generators 1789, 1790, and 1791 each include a dead time compensation circuit that delays the rise of the gate pulse for the purpose of preventing circuit shorts.

An embodiment of the mode command switcher 1702 is described with reference to FIG. 18.

The voltage signal (VDCP) 36 of the positive capacitor (CBP) 15 and the voltage signal (VDCN) 37 of the negative capacitor (CBN) 16 are matched to calculate a difference voltage (VC_DIF) 1801, and the difference voltage (VC_DIF) 1801 is input to a comparator with hysteresis 1804. The comparator with hysteresis 1804 switches a signal (SW_VCN) 1805 from level 0 to level 1 when the difference voltage (VC_DIF) 1801 exceeds a positive threshold V1 to the positive side, and switches the signal (SW_VCN) 1805 from level 1 to level 0 when the difference voltage (VC_DIF) 1801 falls below a positive threshold V2 having an absolute value smaller than V1. In addition, the difference voltage (VC_DIF) 1801 is input to a comparator with hysteresis 1802, and the comparator with hysteresis 1802 switches a signal (SW_VCP) 1803 from level 0 to level 1 when the difference voltage (VC_DIF) 1801 falls below a negative threshold −V1 to the negative side, and switches the signal (SW_VCP) 1803 from level 1 to level 0 when the difference voltage (VC_DIF) 1801 exceeds a threshold −V2.

A root-square sum calculator 1806 inputs a root-square sum output signal 1807 of the direct-axis current command (IMD_REF) 58 and the transvers-axis current command (IMQ_REF) 69 to the denominator side of a divider 1808. The U-phase current command (IMU_REF) 1704 is input to the numerator side of the divider 1808, and the divider 1808 outputs a U-phase current command signal 1809 in which the amplitude of the 3-phase current command is unitized.

A comparator 1811 outputs level 1 when the unitized U-phase current command signal 1809 exceeds a positive threshold C1 to the positive side, and outputs level 0 in other cases. A comparator 1810 outputs level 1 when the unitized U-phase current command signal 1809 falls below a negative threshold −C1 to the negative side, and outputs level 0 in other cases. Here, the value of the threshold C1 is set to a value between 0.86 and 1.0.

A signal (SW_MUP) 1812 is a logical conjunction of the output of the comparator 1810 and the signal (SW_VCP) 1803, and a signal (SW_MUN) 1813 is a logical conjunction of the output of the comparator 1811 and the signal (SW_VCN) 1805.

A timer circuit 1814 receives the signal (SW_MUP) 1812 and the signal (SW_MUN) 1813, and outputs a second mode command (M_MU2) 1815 and a signal (SW_MU) 1816.

A selector switch 1817 selects the first mode command (M_MU1) 1779 when the signal (SW_MU) 1816 is level 0 and selects the second mode command (M_MU2) 1815 when the signal (SW_MU) 1816 is level 1, and outputs the mode command (M_MU) 1707.

Figure 18:
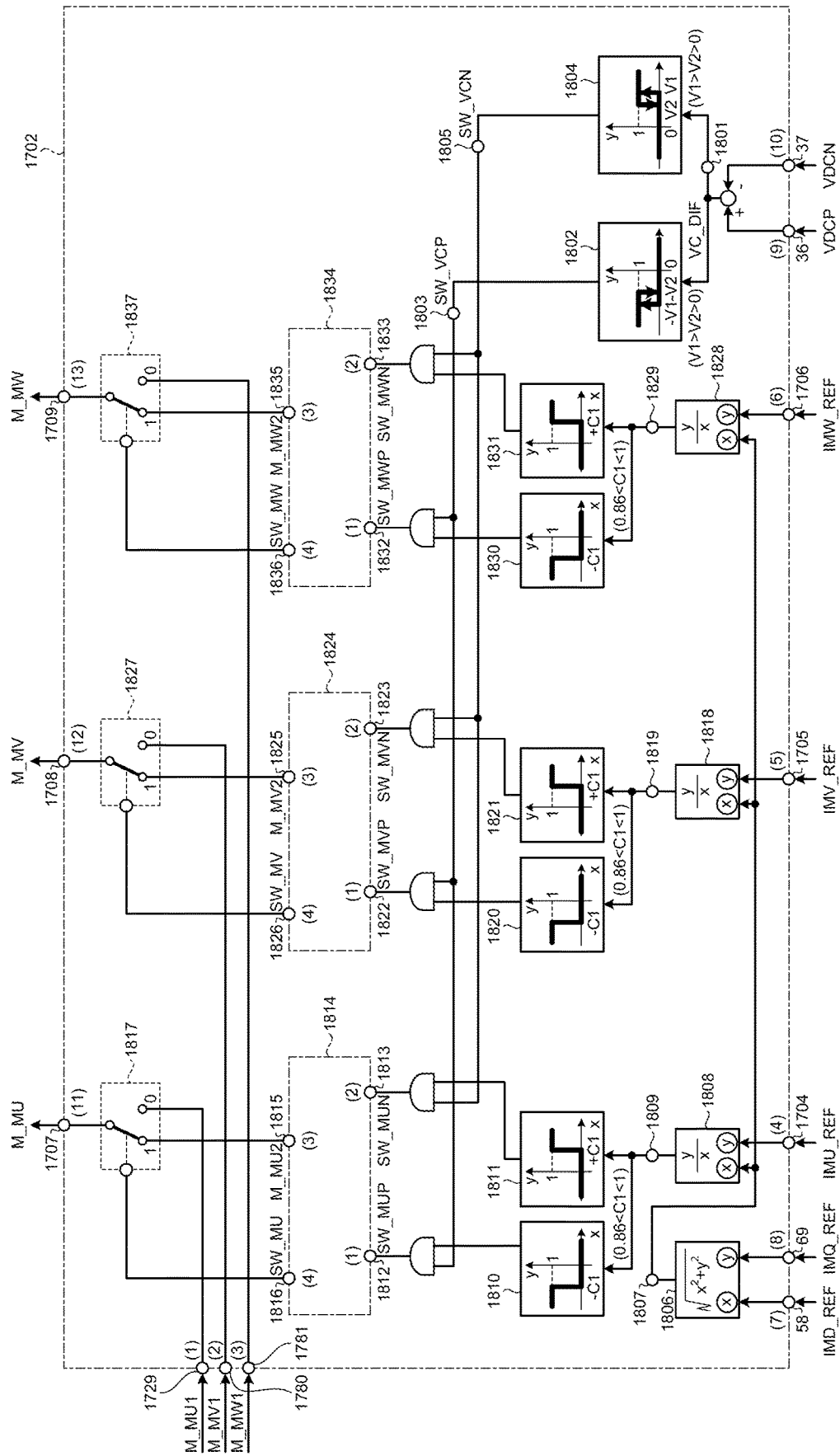
FIG. 18 is a diagram showing a mode switcher according to the embodiment according to claim 3 of the present invention.

As shown in FIG. 18, the configurations and operations for the V phase and the W phase are similar, and the descriptions thereof are omitted to avoid duplication.

An embodiment of the timer circuit 1814 is described with reference to FIG. 19.

When a signal 1901 is level 1, level 0 is output as the second mode command (M_2) 1815. When the input signal (SW_P) 1812 changes from level 0 to level 1 in a state where the signal 1901 is level 0, a signal 1902 also changes from level 0 to level 1, and level 1 is output as the second mode command (M_2) 1815.

The change from level 1 to level 0 of the input signal (SW_P) 1812 is detected using a previous-value holding circuit 1904, the signal 1902 changes from level 0 to level 1, and the second mode command (M_2) 1815 changes to level 0 since the signal 1901 is the output of a flip-flop circuit 1909 with reset priority. At the same time, the timer of an on-delay circuit 1910 is started, and the flip-flop circuit 1909 is reset to level 0 after the set time.

When the signal (SW_P) 1812 is level 1 at the time when the flip-flop circuit 1909 is reset, the second mode command (M_2) 1815 is set to level 1 again.

When the signal (SW_N) 1813 is level 1 at the time when the flip-flop circuit 1909 is reset, the second mode command (M_2) 1815 is set to level −1.

When the signal (SW_P) 1812 and the signal (SW_N) 1813 are both level 0 at the time when the flip-flop circuit 1909 is reset, the signal (SW) 1816 returns from level 1 to level 0.

Figure 17:
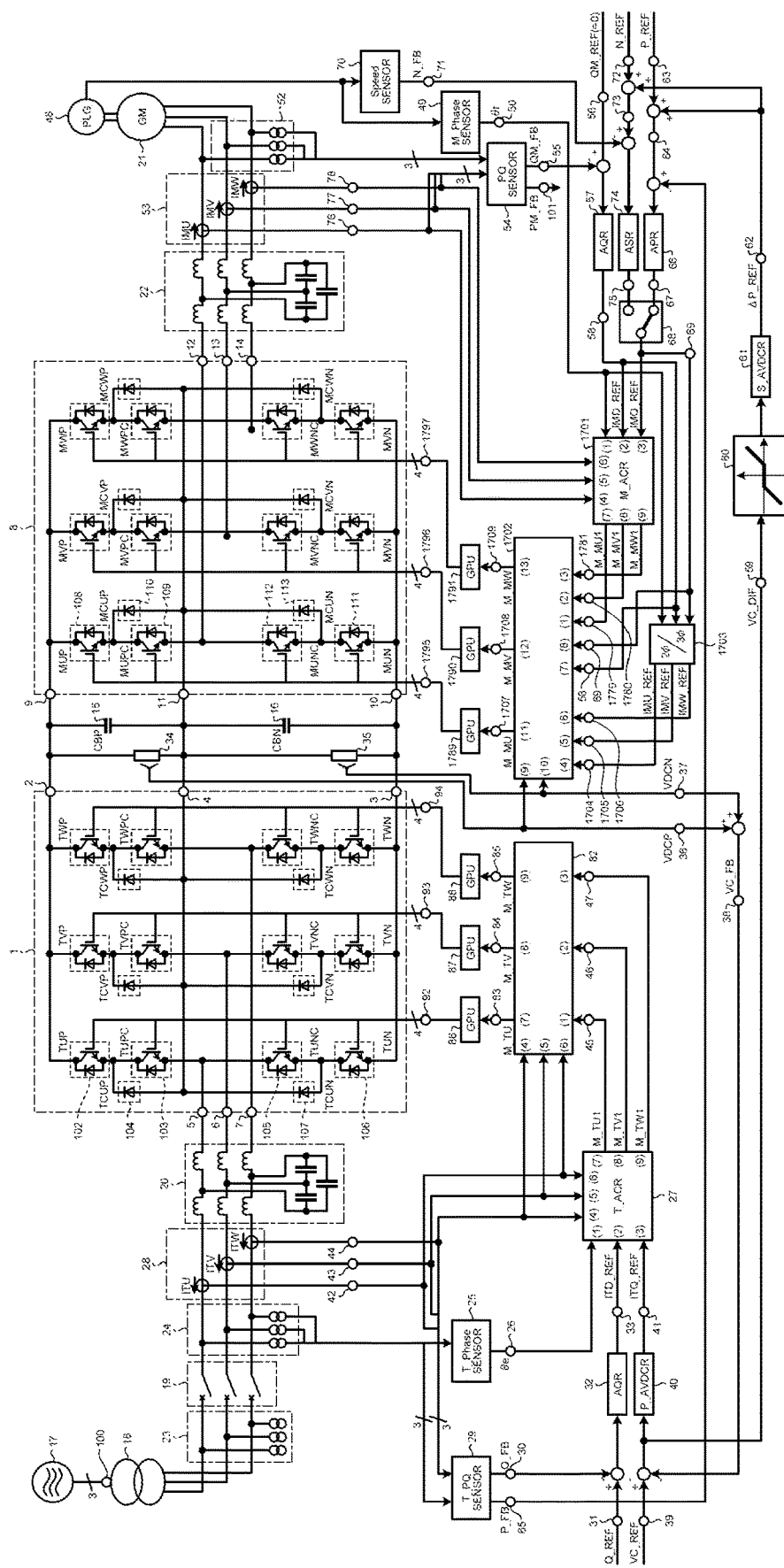
FIG. 17 is a diagram showing a configuration of an embodiment according to claim 3 of the present invention.
Figure 19:
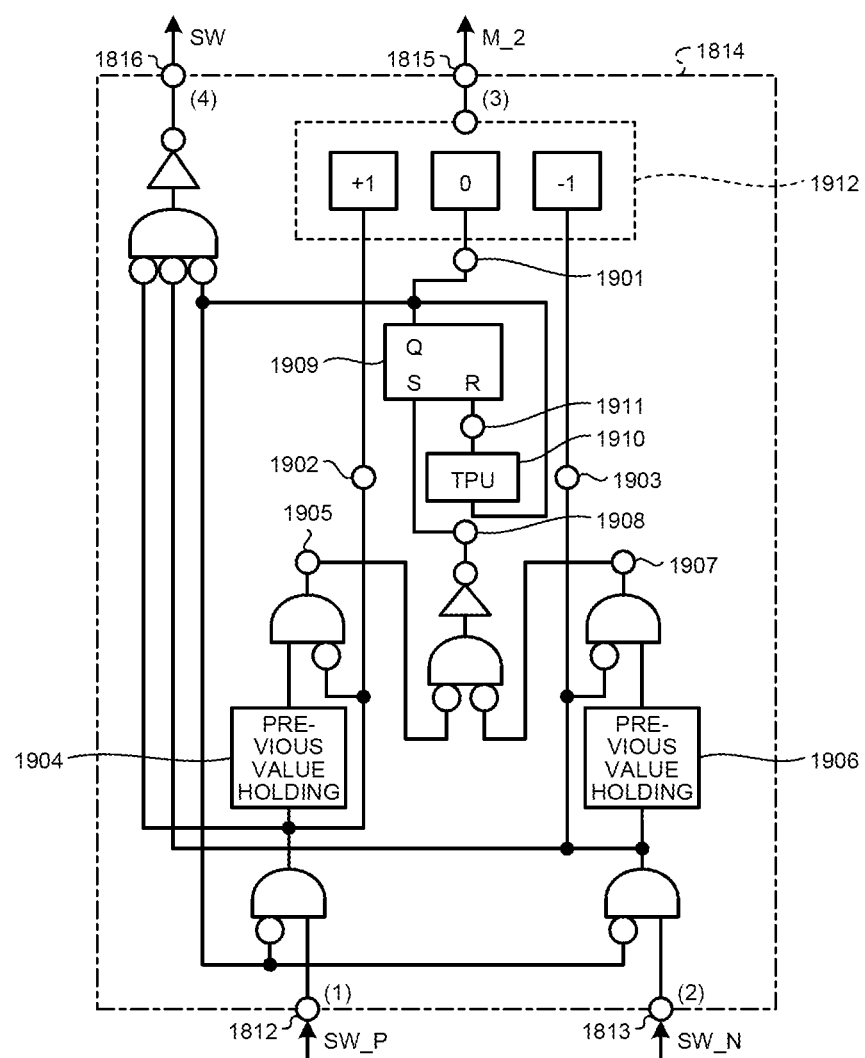
FIG. 19 is a diagram showing a timer circuit according to the embodiment according to claim 3 of the present invention.
Figure 20:
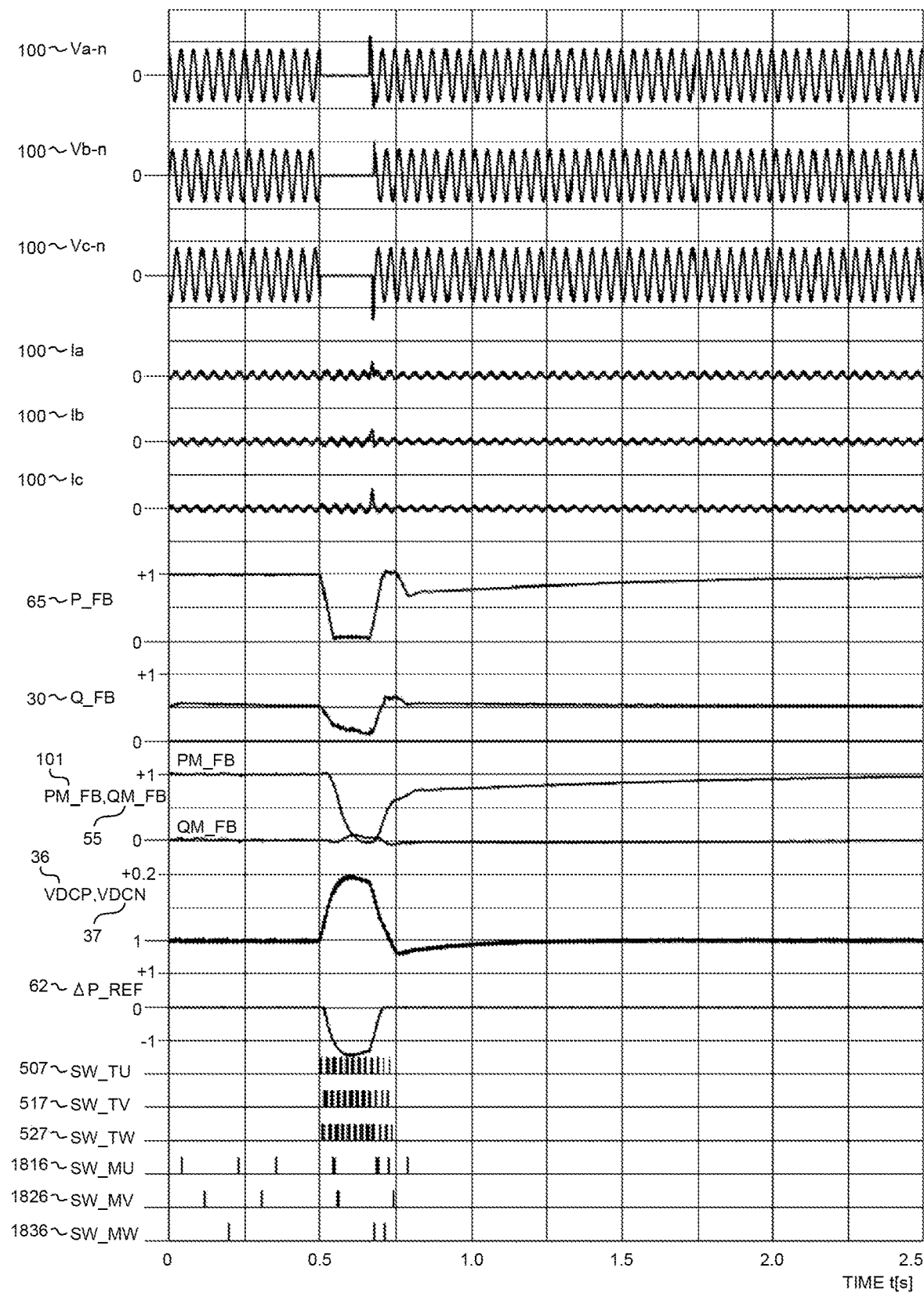
FIG. 20 is an operation waveform diagram when a close-end 3-phase ground fault occurs in the configuration according to claim 3 of the present invention.

FIG. 20 is an operation waveform diagram when a close-end 3-phase ground fault occurs when the FPC system of the embodiment according to Claim 3 of the present invention shown in FIGS. 17 to 19 is connected to a double-circuit power line or when loop transmission is performed. The configuration and control of the first 3-level converter 1, and the capacitance of the positive capacitor (CBP) 15 and the negative capacitor (CBN) 16 are the same as those in FIG. 6, and the difference is that the mode command switcher 1702 is additionally operated.

In the following, the measurement positions of the operation waveforms shown in FIG. 20 are described with the numbers and reference signs shown in FIG. 17. The descriptions of the same numbers as those described in FIG. 6 are the same. The descriptions thereof are omitted to avoid duplication.

The signal (SW_MU) 1816 becomes level 1 when the U-phase mode command (M_MU) 1707 in FIG. 17 selectively outputs the second mode command (M_MU2) 1815 for capacitor voltage imbalance suppression. A reference sign 1826 (SW_MV) indicates the V phase, and a reference sign 1836 (SW_MW) indicates the W phase.

Compared to FIG. 6 with the above operation waveforms, the voltage imbalance suppression operation by the mode command switcher 1702 is sporadically performed on the system side before the 3-phase ground fault occurs at time 0.2 [s]. Since the 3-phase ground fault at time 0.2 [s] is a symmetrical fault, the signals (SW_MU) 1816, 1826 (SW_MV), and 1836 (SW_MW) alternate at approximately the same frequency, but the operation is completed within three cycles after the fault phase is removed, and the imbalance between the positive capacitor voltage signal (VDCP) 36 and the negative capacitor voltage signal (VDCN) 37 seen in FIG. 6 converges.

In the embodiment in FIG. 20, the threshold (V1) of the comparators with hysteresis 1802 and 1804 is set to 1% of the capacitor DC voltage command (VC_REF) 39. This is equivalent to a setting for suppressing steady voltage pulsation of the positive capacitor (CBP) 15 and the negative capacitor (CBN) 16 to within plus or minus 2%.

According to the embodiment in FIG. 20, there is an effect of maintaining the positive and negative capacitor voltage balance during steady operation without affecting normal control performance.

Figure 21:
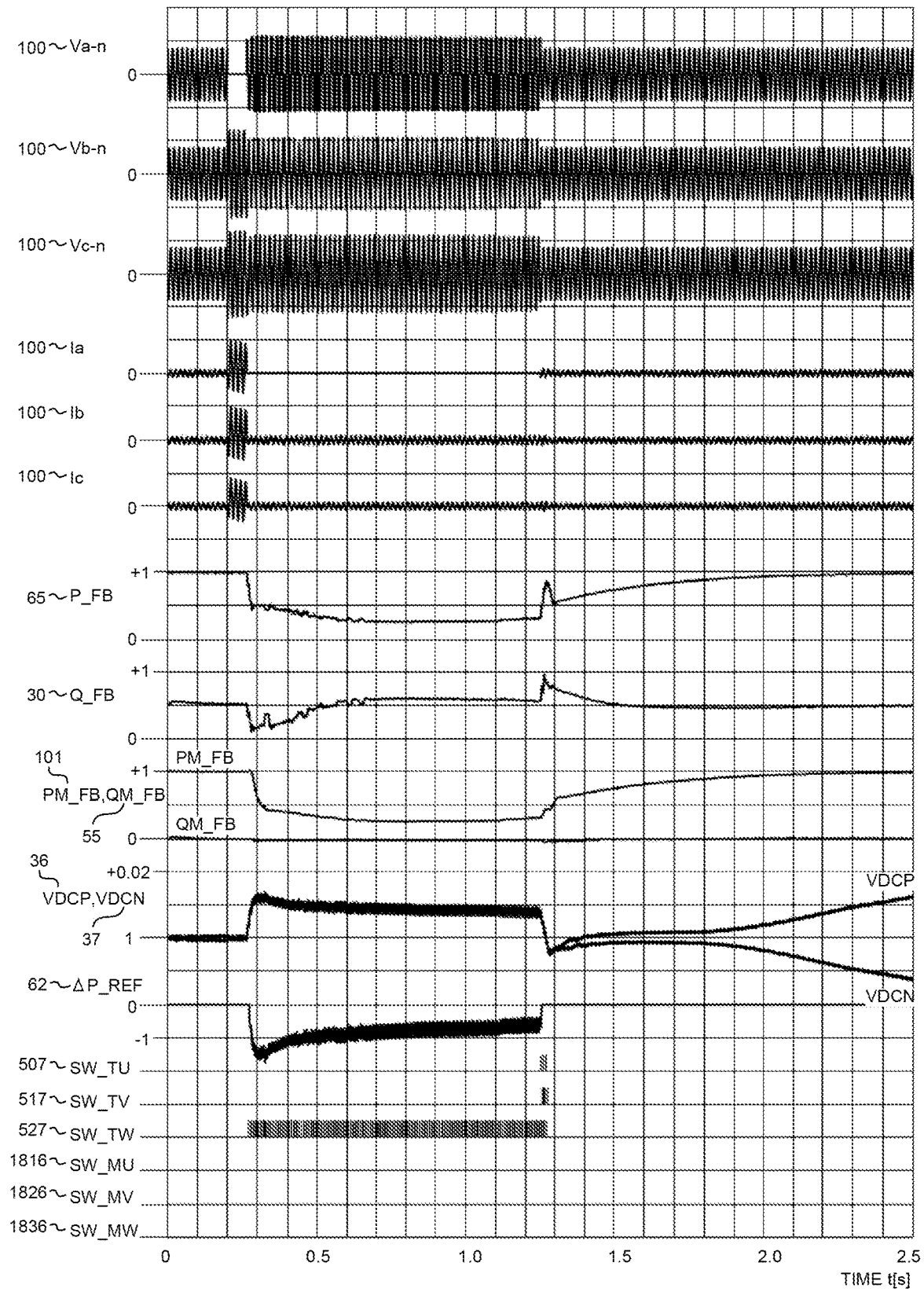
FIG. 21 is an operation waveform diagram when the mode switcher is excluded in a fault with a close-end 1-phase ground fault open phase in the configuration according to claim 3 of the present invention.
Figure 22:
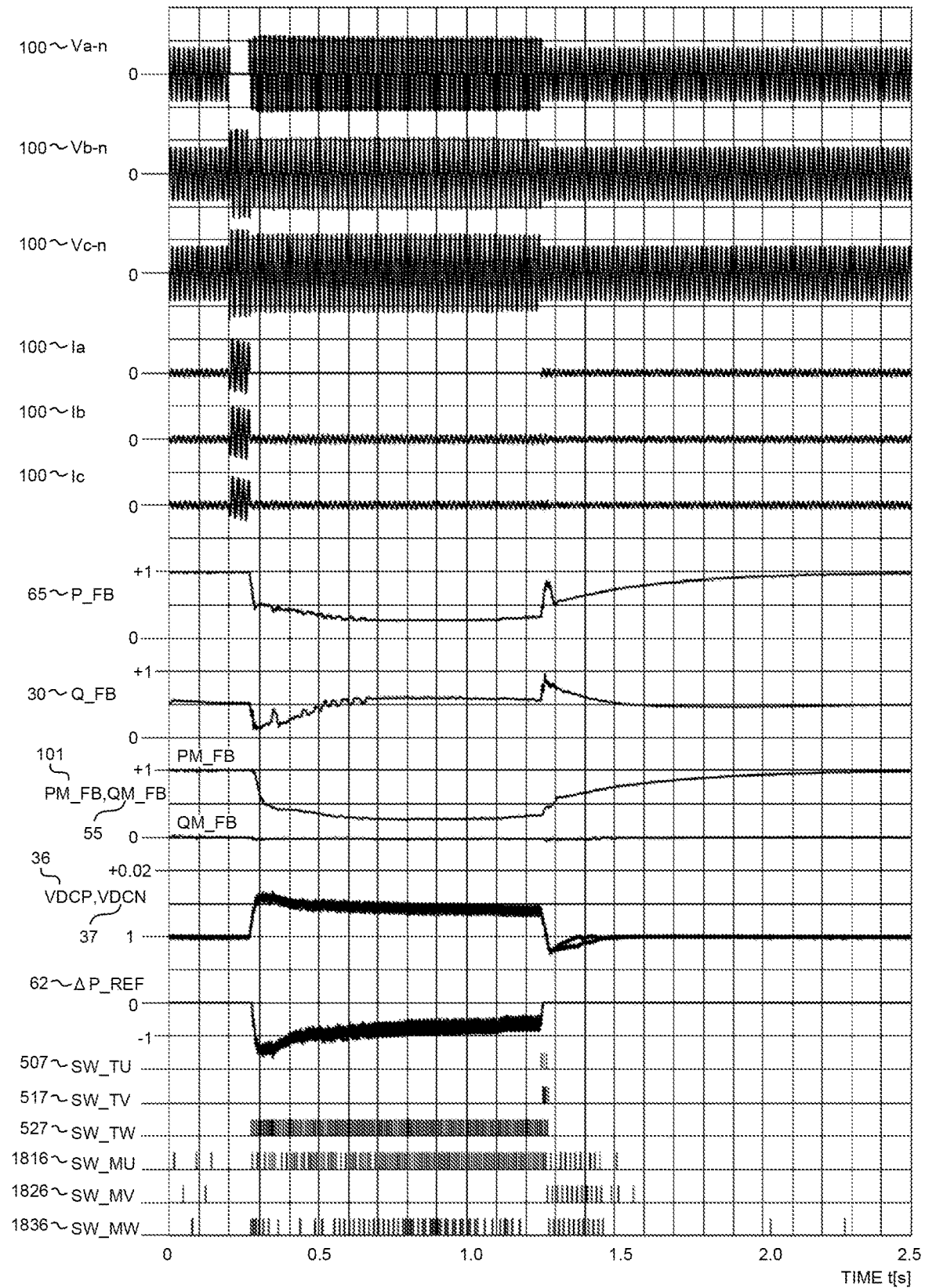
FIG. 22 is an operation waveform diagram when the mode switcher is activated in a fault with a close-end 1-phase ground fault open phase in the configuration according to claim 3 of the present invention.
Figure 33:
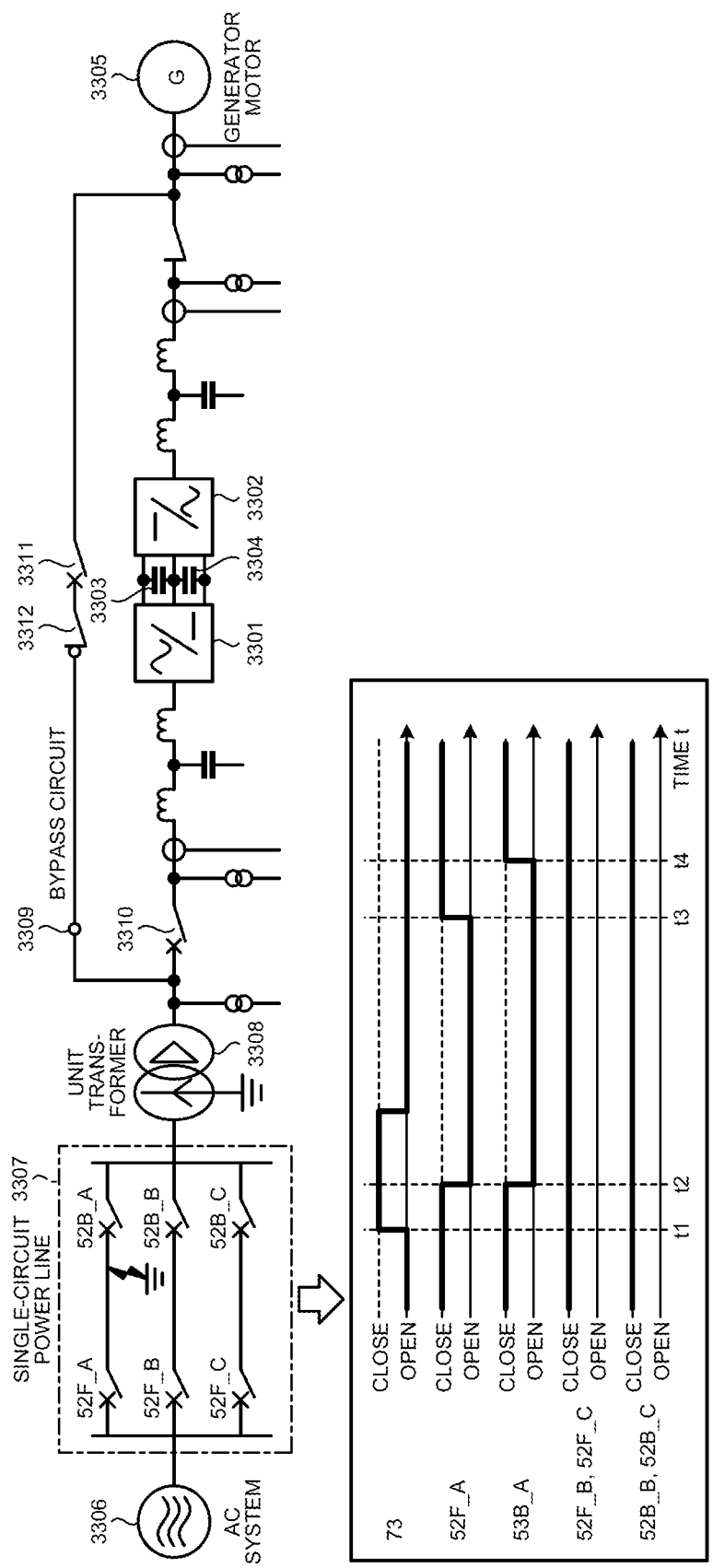
FIG. 33 is a diagram showing a configuration of an FPC system implemented by the present invention.

FIGS. 21 and 22 are operation waveform diagrams when a single line-to-ground fault on a single-circuit power line described in FIG. 33 to confirm the effect with and without the mode command switcher 1702. FIG. 21 shows a case in which the mode command switcher 1702 is excluded, and FIG. 22 shows a case in which the mode command switcher 1702 is operated.

In the following, an A-phase single line-to-ground fault occurs at time t1=0.2 [s]. At time t2 after four cycles, the A-phase leading-end circuit breaker (52F_A) and the trailing-end circuit breaker (52B_A) are opened.

Between time t1 and time t2, the A-phase voltage of the system-side terminal 100 of the unit transformer 18 becomes zero because of a close-end fault. The leading-end circuit breaker (52F_A) is closed at time t3=1.1 [s], and subsequently the trailing-end circuit breaker (52B_A) is closed at time t4=1.25 [s]. As a result, the period from time t2 to time t4 is an open-phase period, and the A-phase current of the system-side terminal 100 of the unit transformer 18 becomes zero. Although the current of the first 3-level converter 1 is imbalanced during the open-phase period, there is an effect that the W-phase overcurrent is suppressed by a mode switcher 82 and that the operation is continued, as shown by the waveform of the signal (SW_TU) 527.

When the trailing-end circuit breaker (52B_A) is closed at time t4, the U-phase signal (SW_TU) 507 and the V-phase signal (SW_TV) 517 also operate, but converge within two cycles. However, imbalance between the positive capacitor voltage signal (VDCP) 36 and the negative capacitor voltage signal (VDCN) 37 diverges after time t4.

FIG. 22 is an operation waveform diagram when the mode command switcher 1702 is operated.

The imbalance between the positive capacitor voltage signal (VDCP) 36 and the negative capacitor voltage signal (VDCN) 37 seen after time t4 in FIG. 21 converges due to the effect of the mode command switcher 1702. Due to an asymmetrical fault, the number of times of operation of the U-phase signal (SW_MU) 1816 is the largest during the open-phase period, and the V-phase signal (SW_MV) 1826 is never operated. After the trailing-end circuit breaker (52B_A) is closed, the three phases operate together, but converge after 0.3 [s] from time t4.

The above is the difference, but the operation waveforms of the other parts are almost the same. This indicates that there is no side effect of the mode command switcher 1702.

According to the embodiment in FIG. 22, there is an effect that the mode command switcher 82 for overcurrent suppression provided on the first 3-level converter 1 side and the mode command switcher 1702 for voltage imbalance suppression provided on the second 3-level converter 8 side operate without mutual interference and that stable operation is continued even in the event of a system-side asymmetrical fault including an open-phase period that is the weakest point of conventional frequency converters.

Figure 23:
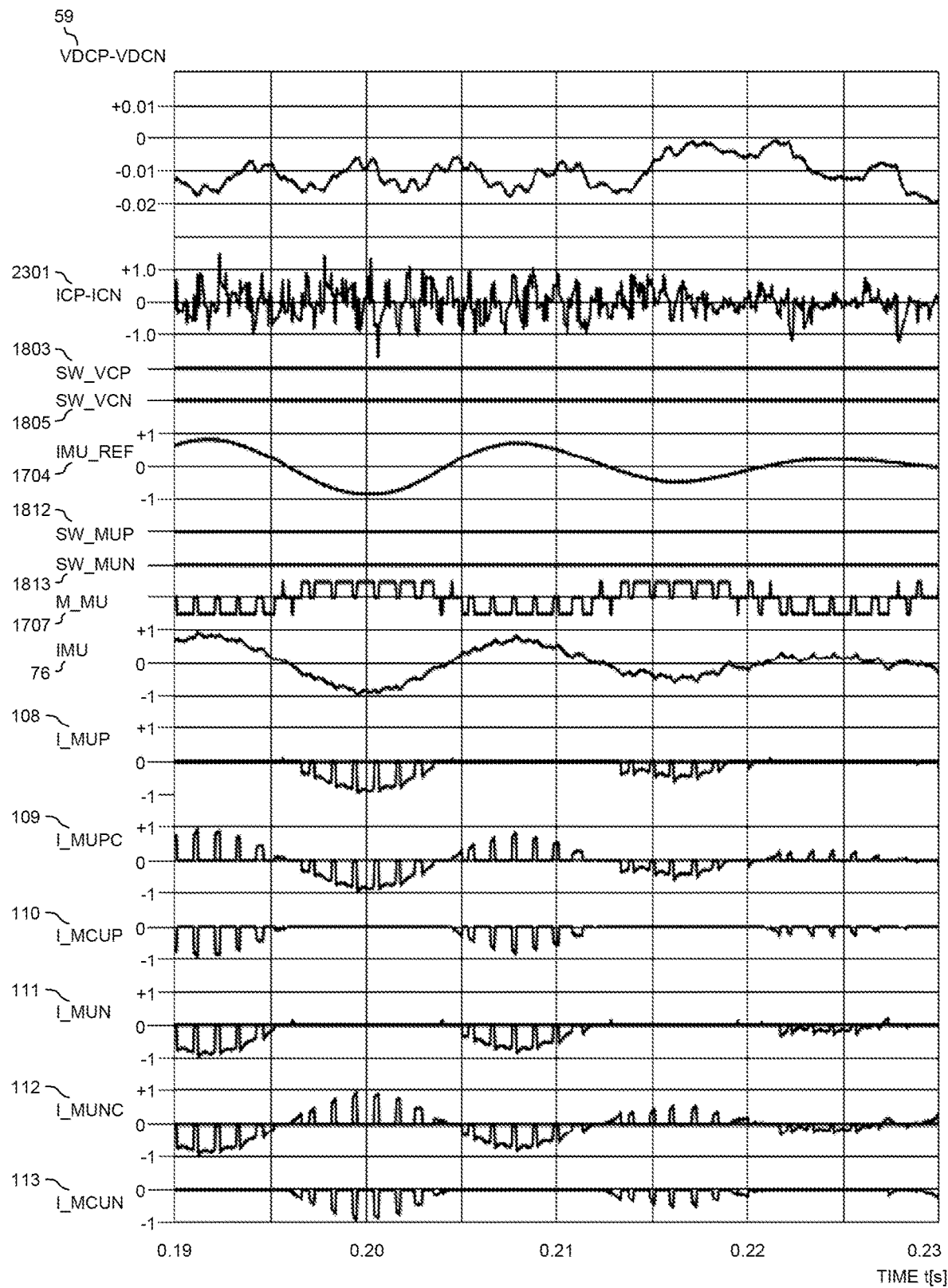
FIG. 23 is an operation waveform diagram when the mode switcher is excluded in the configuration according to claim 3 of the present invention.
Figure 24:
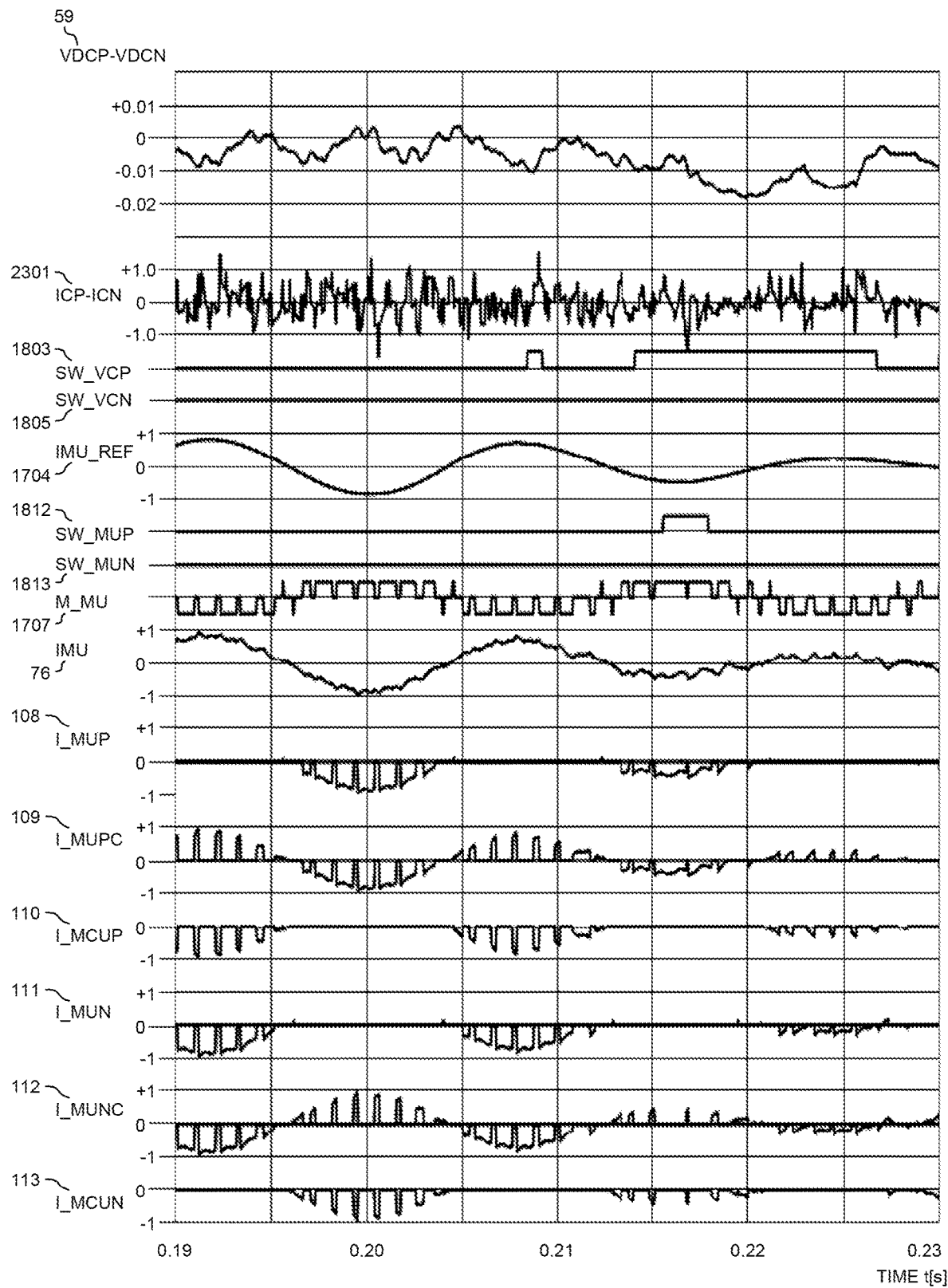
FIG. 24 is an operation waveform diagram when the mode switcher is activated in the configuration according to claim 3 of the present invention.

FIGS. 23 and 24 are comparative diagrams for showing the operation of a mode switcher 1702 for voltage imbalance suppression when a close-end 3-phase ground fault occurs. FIG. 23 shows a case in which the mode switcher 1702 is excluded, and FIG. 24 shows a case in which the mode switcher 1702 is operated. FIG. 23 shows the detailed operation of the U-phase of the second 3-level converter 8 corresponding to FIG. 6. FIG. 24 shows the detailed operation of the U-phase of the second 3-level converter 8 corresponding to FIG. 20.

In the following, the measurement positions of the operation waveforms shown in FIG. 23 are described with the numbers and reference signs shown in FIGS. 1 and 18.

From the top, a waveform 59 (VDCP-VDCN) is (VDC_DIF) 59 in FIG. 1 and indicates a value obtained by subtracting the negative capacitor voltage from the positive capacitor voltage.

The next waveform (ICP-ICN) 2301 indicates a value obtained by subtracting the charging current of the negative capacitor (CBN) 16 from the charging current of the positive capacitor (CBP) 15, and is a waveform proportional to the time derivative of the waveform 59.

The next waveform (SW_VCP) 1803 is the output of the comparator with hysteresis 1802 in FIG. 18, and becomes level 1 when the waveform 59 (VDCP-VDCN) exceeds the threshold (−V1) in the negative direction.

The next waveform (SW_VCN) 180 5 becomes level 1 when the waveform 59 (VDCP-VDCN) exceeds the threshold (V1) in the positive direction.

In the embodiment in FIG. 23, in order to substantially exclude the mode switcher 1702, the threshold V1 is set to a large value to maintain level 0.

The next waveform (IMU_REF) 1704 is the U-phase current command (IMU_REF) 1704 of the second 3-level converter 8 in FIG. 17, and is the U-phase current command of the electrical rotating machine 21.

The next waveform (SW_MUP) 1812 is the signal (SW_MUP) 1812 in FIG. 18, and when this signal is level 1, the U-phase mode command (M_MU) 1707 outputs level+1 by the mode switcher 1702.

The next waveform (SW_MUN) 1813 is the signal (SW_MUN) 1813 in FIG. 18, and when this signal is level 1, the U-phase mode command (M_MU) 1707 outputs level −1 by the mode switcher 1702.

The next waveform (M_MU) 1707 is the 3-level U-phase mode command (M_MU) 1707 output to the U-phase gate pulse generator 1789.

The next waveform (IMU) 76 is the U-phase current (IMU) 76 from the instrument current transformer 53 in FIG. 1, and the positive side indicates the current in the outflow direction from the U-phase terminal of second 3-level converter 8.

The current regulator 1701 performs control to follow the U-phase current command (IMU_REF) 1704.

The next waveform (I_MUP) 108 is the current (I_MUP) of the U-phase P element of the second 3-level converter 8; the positive side indicates the current value of the electronic switch, and the negative side indicates the current value of the FWD.

The next waveform (I_MUPC) 109 is the current (I_M-UPC) of the U-phase PC element of the second 3-level converter 8; the positive side indicates the current value of the electronic switch, and the negative side indicates the current value of the FWD.

The next waveform (I_MCUP) 110 is the U-phase P-side clamp diode current (I_MCUP) of the second 3-level converter 8, and the negative side indicates the current value of the diode.

The next waveform (I_MUN) 111 is the current (I_MUN) of the U-phase N element of the second 3-level converter 8; the positive side indicates the current value of the electronic switch, and the negative side indicates the current value of the FWD.

The next waveform (I_MUNC) 112 is the current (I_M-UNC) of the U-phase NC element of the second 3-level converter 8; the positive side indicates the current value of the electronic switch, and the negative side indicates the current value of the FWD.

The next waveform (I_MCUN) 113 is the U-phase N-side clamp diode current (I_MCUN) of the first 3-level converter 1, and the negative side indicates the current value of the diode.

In the operation waveforms in FIG. 23 described above, when the close-end triple line-to-ground fault occurs at time 0.2 [s], the amplitude of the U-phase mode command (M_MU) 1707 becomes a small value in order to suppress the positive and negative capacitor voltages, and the U-phase current (IMU) 76 also becomes a small value. However, almost no change is observed in the change pattern of the U-phase mode command (M_MU) 1707 before and after the close-end triple line-to-ground fault occurs, and as a result, no change other than the amplitude change is observed in the waveforms 108 to 113.

The measurement positions of the operation waveforms shown in FIG. 24 are the same as those in FIG. 23, and the descriptions thereof are omitted to avoid duplication.

In the embodiment in FIG. 24, in order to operate the mode switcher 1702, the threshold V1 is set to 1% similarly to FIGS. 20 and 22.

In FIG. 24, the waveform (SW_VCP) 1803 becomes level 1 once between time t=0.205 [s] to time t=0.21 [s] and from time t=0.214 [s] to time t=0.227 [s], and the negative capacitor voltage (VDCN) becomes larger than the positive capacitor voltage (VDCP) by a difference equal to or greater than the threshold V1.

During the period between time t=0.205 [s] and time t=0.21 [s] in which the waveform (SW_VCP) 1803 is level 1, since the U-phase current command (IMU_REF) 1704 is positive, the signal (SW_MUN) 1813 maintains level 0, and the mode switcher 1702 does not operate. On the other hand, of the period from time t=0.214 [s] to t=0.227 [s] in which the waveform (SW_VCP) 1803 is level 1, level 1 continues during the period from t=0.215 [s] to t=0.218 [s] in which the U-phase current command (IMU_REF) is in the negative direction and the absolute value is larger than those of the V-phase and W-phase current commands, and the U-phase mode command (M_MU) 1707 becomes level −1 by the mode switcher 1702.

Comparing the waveforms 108 to 113 in FIG. 24 with the corresponding waveforms 108 to 113 in FIG. 23, the difference is limited to the period from time t=0.214 [s] to time t=0.227 [s] in which the waveform (SW_VCP) 1803 is level 1.

In the case in FIG. 24, the conduction period of the FWDs of the P element (I_MUP) 108 and the PC element (I_M-UPC) 109 is extended compared to that in FIG. 23, and the conduction period of the NC element (I_MUNC) 112 and the U-phase N-side clamp diode current (I_MCUN) 113 is reduced by the extended period.

The above difference has a slight influence on the U-phase current control, which indicates that there are no side effects of the voltage imbalance suppression operation by the mode switcher 1702.

As described above, according to the embodiment in FIG. 24, since the mode switcher 1702 uses the relatively smooth current command (IMU_REF) 1704 instead of the current (IMU) 76 of the second 3-level converter 8 including the pulsation component, the operation frequency of the mode switcher 1702 is minimized. Therefore, there is an effect of maintaining independence from other control operations. In addition, by suppressing the operation frequency of the mode switcher 1702, there is an effect of minimizing the number of switching operations of the electronic switch and the FWD, thereby suppressing the increase in generated losses.

Figure 25:
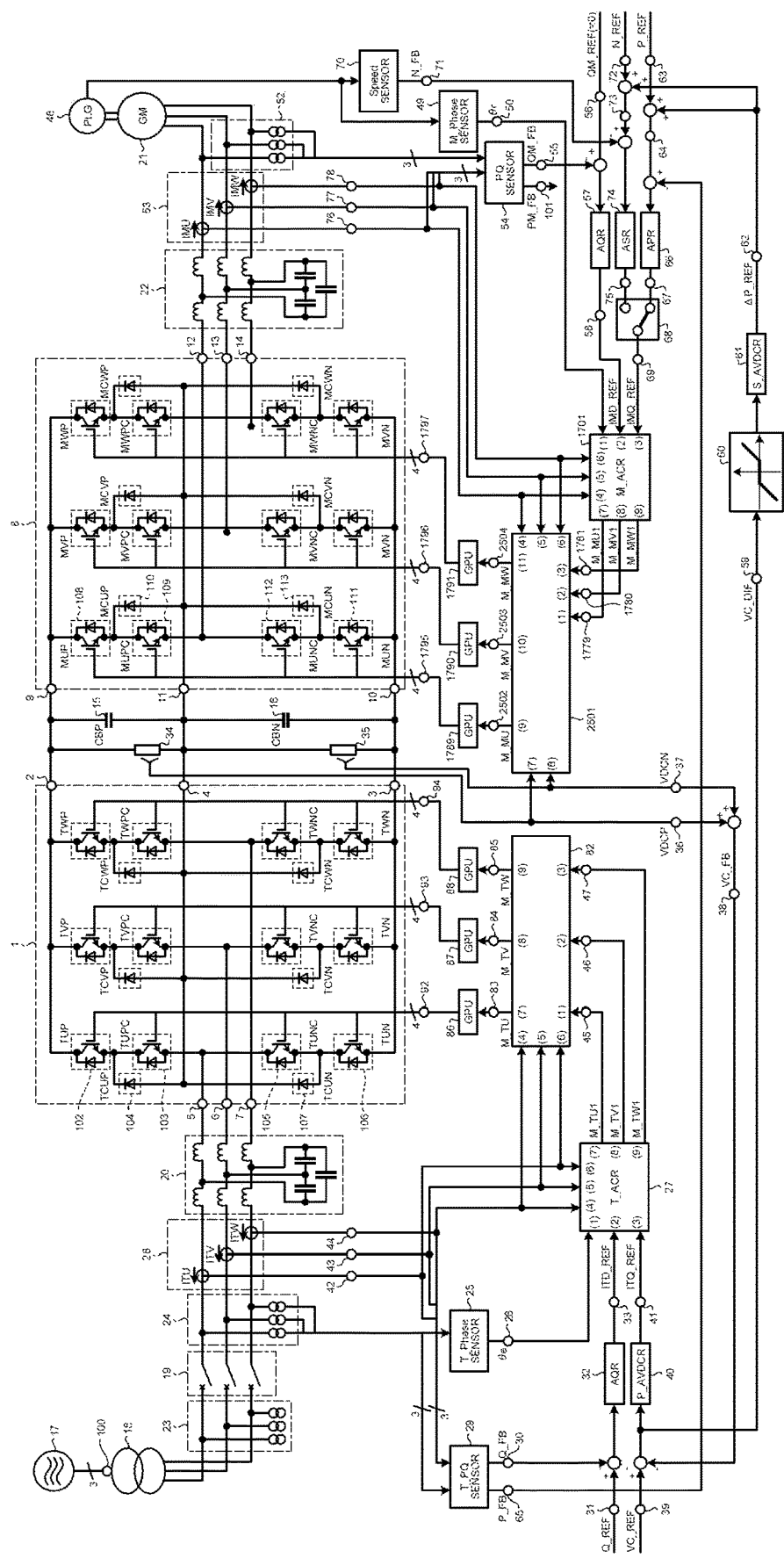
FIG. 25 is a diagram showing a configuration of an embodiment according to claim 4 of the present invention.

A system configuration of an embodiment according to Claim 4 of the present invention is described with reference to FIG. 25. The descriptions of the same numbers as those described in FIG. 17 are the same and are omitted to avoid duplication.

A mode command switcher 2501 receives the U-phase current (IMU) 76, the V-phase current (IMV) 77, and the W-phase current (IMW) 78 from the instrument current transformer 53.

In addition, the U-phase first mode command (M_MU1) 1779, the V-phase first mode command (M_MV1) 1780, and the W-phase first mode command (M_MW1) 1781 from the current regulator 1701 are input. In addition, the voltage signal (VDCP) 36 of the positive capacitor (CBP) 15 and the voltage signal (VDCN) 37 of the negative capacitor (CBN) 16 are input.

The mode command switcher 2501 receives the above eight signals, and outputs, to the gate pulse generators 1789, 1790, and 1791, a U-phase mode command (M_MU) 2502, a V-phase mode command (M_MV) 2503, and a W-phase mode command (M_MW) 2504 to the second 3-level converter 8.

Figure 26:
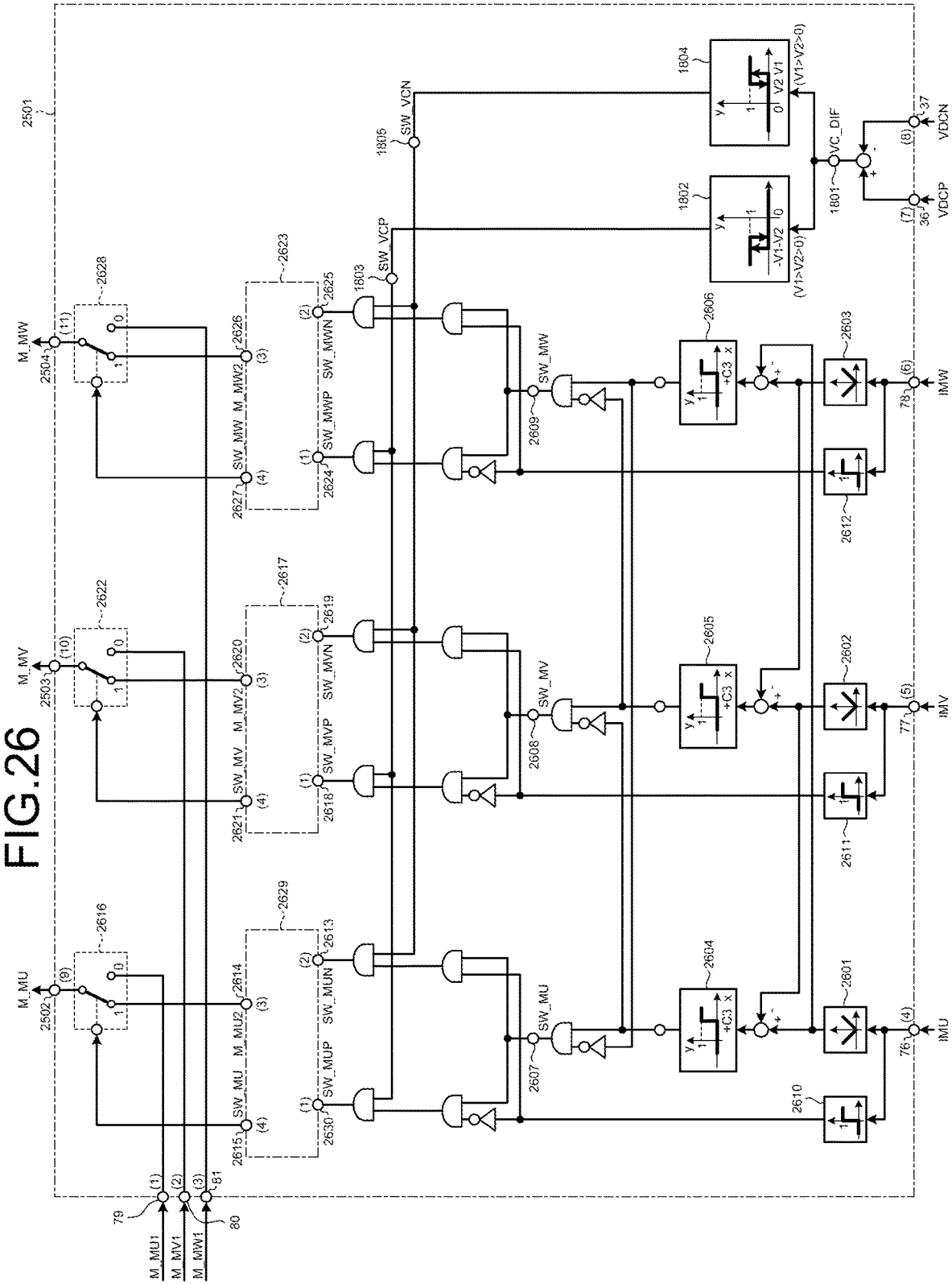
FIG. 26 is a diagram showing a mode switching circuit of the embodiment according to claim 4 of the present invention.

An embodiment of the mode command switcher 2501 is described with reference to FIG. 26. The descriptions of the same numbers as those described in FIG. 18 are the same and are omitted to avoid duplication.

Absolute-value calculation circuits 2601, 2602, and 2603 output absolute values of the U-phase current (IMU) 76, the V-phase current (IMV) 77, and the W-phase current (IMW) 78, respectively. The current absolute values of the three phases are matched and input to comparators 2604, 2605, and 2606. The comparators 2604, 2605, and 2606 output level 1 when the input match result is greater than a threshold C3, and output level 0 in other cases.

A signal (SW_MU) 2607 becomes level 1 when the absolute value of the U-phase current (IMU) 76 is maximum, and becomes level 0 in other cases. Similarly, a signal (SW_MV) 2608 becomes level 1 when the absolute value of the V-phase current (IMV) 77 is maximum, and a signal (SW_MW) 2609 becomes level 1 when the absolute value of the W-phase current (IMW) 78 is maximum.

Sign detectors 2610, 2611, and 2612 output level 1 when the signs of the U-phase current (IMU) 76, the V-phase current (IMV) 77, and the W-phase current (IMW) 78 are positive, respectively. Timer circuits 2629, 2617, and 2623 each have a 3-phase independent configuration.

In the following, the U-phase timer circuit 2629 is described as an example.

A signal (SW_MUP) 2630 becomes level 1 when the signal (SW_VCP) 1803 is level 1 on condition that the absolute value of the U-phase current (IMU) 76 is maximum and negative.

A signal (SW_MUN) 2613 becomes level 1 when the signal (SW_VCN) 1805 is level 1 on condition that the absolute value of the U-phase current (IMU) 76 is maximum and positive.

The two signals of the signal (SW_MUP) 2630 and the signal (SW_MUN) 2613 are input to the U-phase timer circuit 2629, and a second mode command (M_MU2) 2614 and a signal (SW_MU) 2615 are output.

The V-phase timer circuit 2617 and the W-phase timer circuit 2623 are the same as the U-phase timer circuit 2629, and the descriptions thereof are omitted to avoid duplication.

Figure 27:
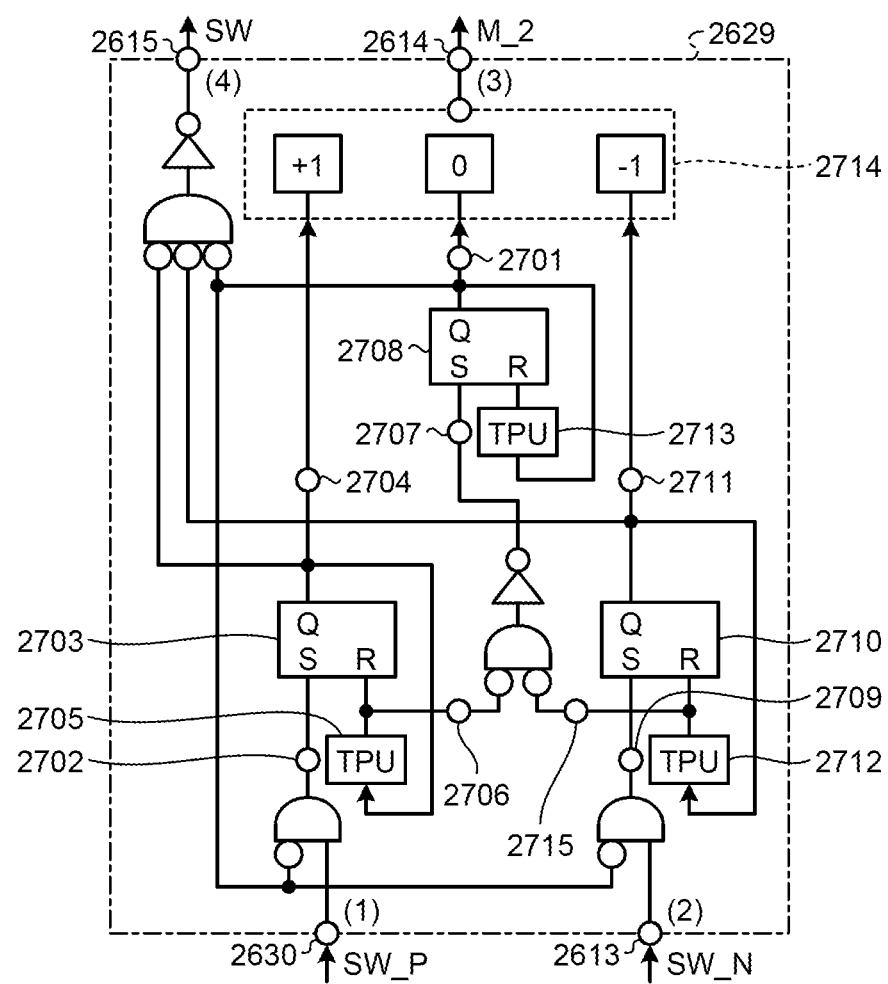
FIG. 27 is a diagram showing a timer circuit of the embodiment according to claim 4 of the present invention.

An embodiment of the timer circuit 2629 is described with reference to FIG. 27.

When a signal 2701 is level 1, level 0 is output as the second mode command (M_2) 2614. When the input signal (SW_P) 2630 changes from level 0 to level 1 in a state where the signal 2701 is level 0, a signal 2702 also changes from level 0 to level 1, a flip-flop circuit with reset priority 2703 is set, a signal 2704 becomes level 1, and level 1 is output as the second mode command (M_2) 2614.

When the signal 2704 changes to level 1, the timer of an on-delay circuit 2705 is started, a signal 2706 becomes level 1 after the set time Td1, and the output signal 2704 of the flip-flop circuit 2703 changes to level 0.

At the same time as the signal 2706 changes to level 1, a signal 2707 becomes level 1, a flip-flop circuit 2708 is set, the signal 2701 becomes level 1, and the second mode command (M_2) 2614 becomes level 0 by an output switching circuit 2714.

When the input signal (SW_N) 2613 changes from level 0 to level 1 in a state where the signal 2701 is level 0, a signal 2709 also changes from level 0 to level 1, a flip-flop circuit with reset priority 2710 is set, a signal 2711 becomes level 1, and level −1 is output as the second mode command (M_2) 2614 by the output switching circuit 2714.

When the signal 2711 changes to level+1, the timer of an on-delay circuit 2712 is started, a signal 2715 becomes level 1 after the set time Td1, and the output signal 2711 of the flip-flop circuit 2710 changes to level 0.

At the same time as the signal 2715 changes to level 1, the signal 2707 becomes level 1, the flip-flop circuit 2708 is set, the signal 2701 becomes level 1, and level 0 is output by the output switching circuit 2714 as the second mode command (M_2) 2614.

When the signal 2701 becomes level 1, the timer of an on-delay circuit 2713 is started, and the flip-flop circuit 2708 is reset to level 0 after a set time Td2.

When the signal (SW_P) 2630 is level 1 at the time when the flip-flop circuit 2708 is reset, the second mode command (M_2) 2614 is set to level 1 again by the output switching circuit 2714.

When the signal (SW_N) 2613 is level 1 at the time when the flip-flop circuit 2708 is reset, the second mode command (M_2) 2614 is set to level −1 by the output switching circuit 2714.

The signal (SW) 2615 is an OR output of the signals 2701, 2704, and 2711, and becomes level 1 when the second mode command (M_2) 2614 is enabled.

When the flip-flop circuit 2708, the signal (SW_P) 2630, and the signal (SW_N) 2613 are all level 0, the signal (SW) 2615 returns from level 1 to level 0.

As described above, according to the embodiment shown in FIGS. 25 to 27, of the mode command switcher 2501, the range of the signal 2607 (SW_MU), the signal 2608 (SW_MV), the signal 2609 (SW_MW), the U-phase mode command (M_MU) 2502, the V-phase mode command (M_MV) 2503, and the W-phase mode command (M_MW) 2504 can be achieved only by the 2-level signal logical circuit and timer circuit, and there is an effect that the range can be achieved without being limited by the calculation cycle of the microprocessor. Therefore, it is possible to implement the second 3-level converter 8 suitable for small-capacity applications where a high PWM frequency is often selected to downsize the system.

Figure 28:
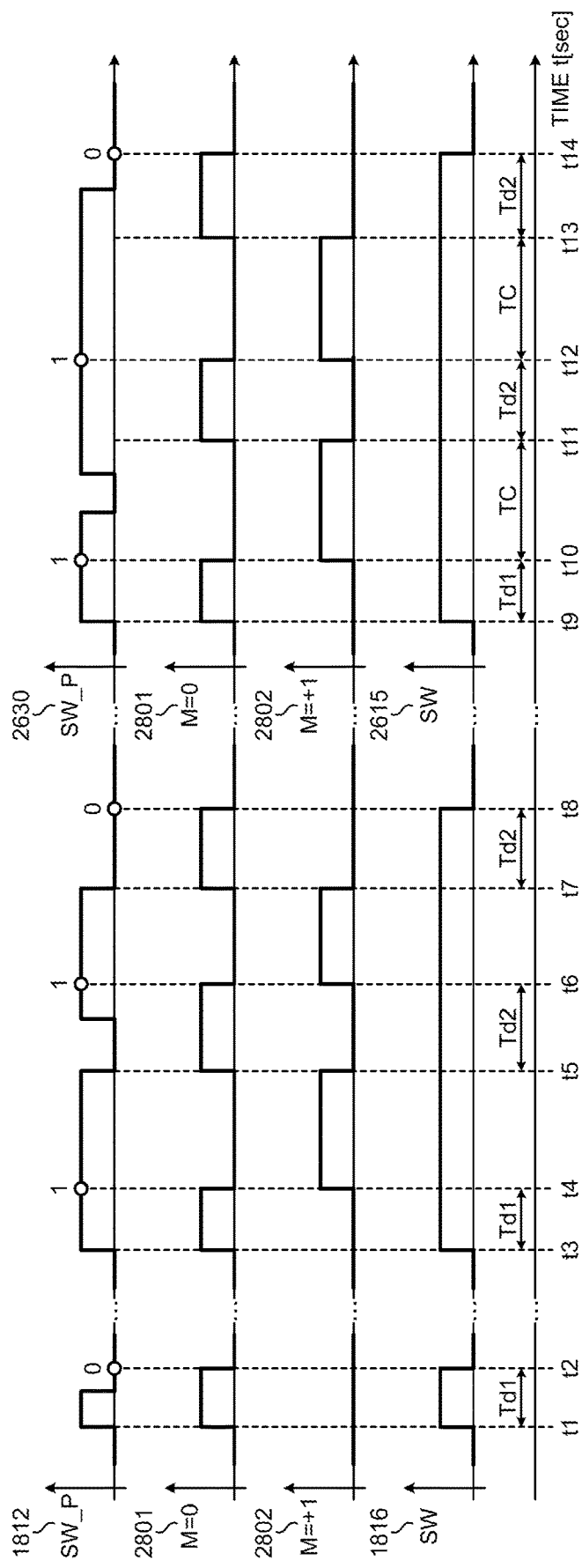
FIG. 28 is a diagram showing operation according to claims 5 and 6 of the present invention.

Operations according to Claims 5 and 6 of the present invention are described with reference to a time chart in FIG. 28. In FIG. 28, a period from time t1 to time t8 indicates the operation according to Claim 5, and a period from time t9 to time t14 indicates the operation according to Claim 6.

In the following, an operation in a case where Claim 5 of the present invention is applied to the timer circuit 1814 from time t1 to time t8 in FIG. 28 is described.

A signal (M=0) 2801 is for outputting the mode command=0, and a signal (M=+1) 2802 is for outputting the mode command=+1.

When the input signal (SW_P) 1812 changes from level 0 to level 1 at time t1, the signal (M=0) 2801 changes from level 0 to level 1, and the signal (SW) 1816 changes from level 0 to level 1. The signal (M=0) 2801 maintains level 1 until the delay set time Td1 elapses after the input signal (SW_P) 1812 changes to level 1.

When the input signal (SW_P) 1812 is level 0 at time t2 after the delay set time Td1 has elapsed, the signal (M=0) 2801 changes from level 1 to level 0, and the signal (SW) 1816 changes from level 1 to level 0.

When the input signal (SW_P) 1812 changes from level 0 to level 1 at time t3, the signal (M=0) 2801 changes from level 0 to level 1, and the signal (SW) 1816 changes from level 0 to level 1.

When the input signal (SW_P) 1812 is level 1 at time t4 after the delay set time Td1 has elapsed, the output signal (M=0) 2801 changes from level 1 to level 0, and the signal (M=+1) 2802 changes from level 0 to level 1.

As a result, the period of the mode command=0 can be secured for the set time Td1 before switching to the mode command=1.

When the input signal (SW_P) 1812 changes from level 1 to level 0 at time t5, the signal (M=0) 2801 changes from level 0 to level 1, and the signal (M=+1) 2802 changes from level 1 to level 0. The signal (M=0) 2801 maintains level 0 until the delay set time Td2 elapses after the input signal (SW_P) 1812 changes to level 1.

When the input signal (SW_P) 1812 is level 1 at time t6 after the delay set time Td2 has elapsed from time t5, the signal (M=0) 2801 changes from level 1 to level 0, and the output signal (M=+1) 2802 changes from level 0 to level 1.

As a result, even when the input signal (SW_P) 1812 is intermittent, the period of the mode command=0 can be secured for the set time Td2.

When the input signal (SW_P) 1812 changes from level 1 to level 0 at time t7, the signal (M=0) 2801 changes from level 0 to level 1, and the signal (M=+1) 2802 changes from level 1 to level 0.

When the input signal (SW_P) 1812 is level 0 at time t8 after the delay set time Td2 has elapsed, the signal (M=0) 2801 changes from level 1 to level 0, and the signal (SW) 1816 changes from level 1 to level 0.

As a result, the period of the mode command=0 can be secured for the set time Td2 before the signal (SW) 1816 becomes level 0.

The signal (SW) 1816 changes from level 0 to level 1 when the signal (M=0) 2801 or the signal (M=+1) 2802 changes from level 0 to level 1. The signal (SW) 1816 changes from level 1 to level 0 when both the signal (M=0) 2801 and the signal (M=+1) 2802 become level 0.

Figure 29:
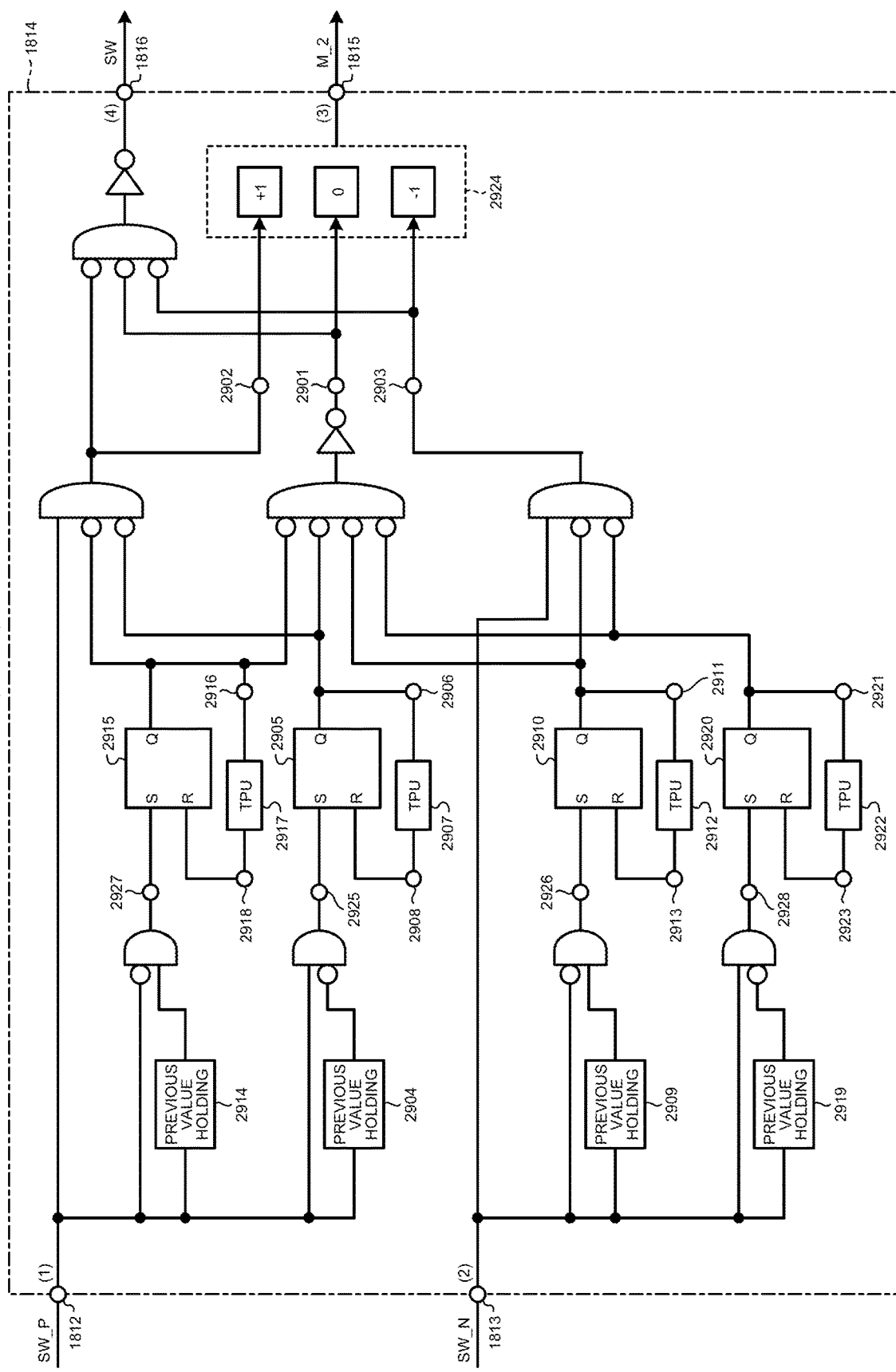
FIG. 29 is a diagram showing a timer circuit according to claim 5 of the present invention.

FIG. 29 shows an embodiment in a case where Claim of the present invention is applied to the timer circuit 1814.

A reference sign 2924 is an output switching circuit. The output switching circuit 2924 sets the second mode command (M_2) 1815 to level 0 and outputs it when a signal 2901 is level 1, sets the second mode command (M_2) 1815 to level+1 and outputs it when a signal 2902 is level 1, and sets the second mode command (M_2) 1815 to level −1 and outputs it when a signal 2903 is level 1.

When the signal (SW_P) 1812 rises from level 0 to level 1, a signal 2925 becomes level 1 by a previous-value holding circuit 2904. Since an output signal 2906 of a flip-flop circuit with reset priority 2905 becomes level 1 and the signal 2901 also becomes level 1, the output switching circuit 2924 outputs level 0 as the mode command (M_2) 1815.

Since a signal 2908 becomes level 1 after the delay set time Td1 of an on-delay circuit 2907 elapses, the output signal 2906 of the flip-flop circuit 2905 becomes level 0. At the same time, the signal 2901 also becomes level 0. On the other hand, the signal 2902 becomes level 1, and the mode command (M_2) 1815 is switched from level 0 to level+1.

When the signal (SW_MUP) 1812 falls from level 1 to level 0, a signal 2927 becomes level 1 by a previous-value holding circuit 2914. Since an output signal 2916 of a flip-flop circuit with reset priority 2915 becomes level 1 and the signal 2901 becomes level 1, the mode command (M_2) 1815 becomes level 0. Since a signal 2918 becomes level 1 after the delay set time Td2 of an on-delay circuit 2917 elapses, the output signal 2916 of the flip-flop circuit 2915 becomes level 0. At this time, the signal 2901 also becomes level 0.

On the other hand, when the signal (SW_P) 1812 at that time is level 1, the signal 2902 also becomes level 1, and the mode command (M_2) 1815 switches from level 0 to level+1.

On the other hand, when the signal (SW_P) 1812 is level 0, the signal (SW) 1816 becomes level 0. The signal (SW) 1816 is an OR output of the signals 2901, 2902, and 2903.

The circuit that outputs level 0 and level −1 as the second mode command (M_2) 1815 by the input signal (SW_N) 1813 has the same circuit configuration as the circuit that outputs level 0 and level+1 as the second mode command (M_2) 1815 by the input signal (SW_P) 1812, and the description thereof is omitted to avoid duplication.

According to the embodiment in FIG. 29, since the current command having the smooth operation waveform is used, there is an effect of suppressing the mode in which the voltage waveform of the second 3-level converter 8 becomes that of the 2-level converter and protecting the coil insulation of the electrical rotating machine 21 by always providing the level 0 period before and after the switching to the second mode command (M_2) 1815 while minimizing the switching frequency to the second mode command (M_2) 1815 and reducing the number of switching operations of the electronic switch and the FWD to suppress the losses.

Next, an operation in a case where Claim 6 of the present invention is applied to the timer circuit 2629 from time t9 to time t14 in FIG. 28 is described.

When the input signal (SW_P) 2630 changes from level 0 to level 1 at time t9, the signal (M=0) 2801 and the signal (SW) 2615 change from level 0 to level 1.

The signal (M=0) 2801 maintains level 1 until time t10 after the delay set time Td1 has elapsed from the change to level 1, and changes from level 1 to level 0 at time t10. At time t10, when the input signal (SW_P) 2630 is level 1, the signal (M=+1) 2802 changes from level 0 to level 1.

As a result, the period of the mode command=0 can be secured for the set time Td1 before switching to the mode command=1.

The signal (M=+1) 2802 maintains level 1 time t11 after a delay set time TC from the change to level 1, and changes from level 1 to level 0 at time t11. At time t11, the signal (M=0) 2801 unconditionally changes from level 0 to level 1.

As a result, the period of the mode command=1 can be returned to the mode command=0 after the delay set time TC even without detecting that the signal (SW) 2615 changes from level 1 to level 0.

The signal (M=0) 2801 maintains level 1 until time t12 after the delay set time Td2 has elapsed from the change to level 1, and changes from level 1 to level 0 at time t12. At time t12, when the input signal (SW_P) 2630 is level 1, the signal (M=+1) 2802 changes from level 0 to level 1.

As a result, even when the signal (SW) 2615 continues or is intermittent, the period of the mode command=0 can be secured for the delay set time Td2.

The signal (M=+1) 2802 maintains level 1 until time t13 after the delay set time TC has elapsed from the change to level 1, and changes from level 1 to level 0 at time t13. At time t13, the signal (M=0) 2801 changes from level 0 to level 1. The signal (M=0) 2801 maintains level 1 until time t14 after the delay set time Td2 has elapsed from the change to level 1, and changes from level 1 to level 0 at time t14. At time t14, when the input signal (SW_P) 2630 is level 0, the signal (SW) 2615 changes from level 1 to level 0.

In the following, a circuit diagram when Claim 6 of the present invention is applied to the timer circuit 2629 is described with reference to FIG. 30.

A reference sign 3060 is an output switching circuit. The output switching circuit 3060 sets the second mode command (M_2) 2614 to level 0 and outputs it when a signal 3001 is level 1, sets the second mode command (M_2) 2614 to level+1 and outputs it when a signal 3020 is level 1, and sets the second mode command (M_2) 2614 to level −1 and outputs it when a signal 3040 is level 1.

When the input signal (SW_P) 2630 rises from level 0, a signal 3003 becomes level 1 by a previous-value holding circuit 3002. Since an output signal 3005 of a flip-flop circuit with reset priority 3004 becomes level 1 and the signal 3001 becomes level 1, the output switching circuit 3060 outputs level 0 as the second mode command (M_2) 2614.

When the signal 3005 changes to level 1, the timer of an on-delay circuit 3006 is started, a signal 3007 becomes level 1 after the set time Td1, the output signal 3005 of the flip-flop circuit 3004 becomes level 0, and the signal 3001 also becomes level 0.

When the signal 3005 falls from level 1, a signal 3022 becomes level 1 by a previous-value holding circuit 3021. A logical conjunction signal 3023 of the signal 3022 and the input signal (SW_P) 2630 sets a flip-flop circuit with reset priority 3024. At this time, when the input signal (SW_P) 2630 is level 1, the signal 3020 becomes level 1, and the output switching circuit 3060 outputs level+1 as the second mode command (M_2) 2614.

As a result, the period of the mode command=0 can be secured for the set time Td1 before switching to the mode command=1.

When the signal 3020 changes to level 1, the timer of an on-delay circuit 3025 is started, a signal 3026 becomes level 1 after a set time Tc, and the output signal 3020 of the flip-flop circuit becomes level 0.

When the signal 3020 falls from level 1, a signal 3028 becomes level 1 by a previous-value holding circuit 3027. Since an output signal 3030 of a flip-flop circuit with reset priority 3029 becomes level 1 and the signal 3001 becomes level 1, the output switching circuit 3060 outputs level 0 as the second mode command (M_2) 2614.

As a result, the period of the mode command=1 can be continued for the set time TC and switch to level 0 without detecting that the input signal (SW_P) 2630 changes from level 1 to level 0.

When the signal 3030 changes to level 1, the timer of an on-delay circuit 3031 is started, a signal 3032 becomes level 1 after the set time Td2, the output signal 3030 of the flip-flop circuit 3029 becomes level 0, and the signal 3001 also becomes level 0.

When the signal 3030 falls from level 1, a signal 3034 becomes level 1 by a previous-value holding circuit 3033.

The logical conjunction signal 3023 of the signal 3034 and the input signal (SW_P) 2630 sets the flip-flop circuit with reset priority 3024. When the input signal (SW_P) 2630 is level 1, the signal 3020 becomes level 1, and the output switching circuit 3060 outputs level+1 again as the second mode command (M_2) 2614. Similarly to the above description, when the signal 3020 changes to level 1, the output signal 3020 of the flip-flop circuit changes to level 0 after the set time Tc of the on-delay circuit 3025.

At the same time as the signal 3020 falls from level 1, the signal 3001 becomes level 1, and the second mode command (M_2) 2614 becomes level 0.

When the signal 3030 changes to level 1, the output signal 3030 of the flip-flop circuit 3029 becomes level 0 after the set time Td2 of the on-delay circuit 3031, and the signal 3001 also becomes level 0.

When the signal 3030 falls from level 1, a signal 3034 becomes level 1 by a previous-value holding circuit 3033. When the input signal (SW_P) 2630 is level 0, the signal 3020 maintains level 0, and the output signal (SW) 2615 becomes level 0.

The signal (SW) 2615 is an OR output of the signals 3001, 3020, and 3040, and outputs level 1 when the second mode command (M_2) 2614 is enabled.

As a result, the period of the mode command=0 can be secured for the set time Td2 before the signal (SW) 2615 becomes level 0.

The circuit that outputs level 0 and level −1 as the second mode command (M_2) 2614 by the input signal (SW_N) 2613 has the same circuit configuration as the circuit that outputs level 0 and level+1 as the second mode command (M_2) 2614 by the input signal (SW_P) 2630, and the description thereof is omitted to avoid duplication.

Figure 30:
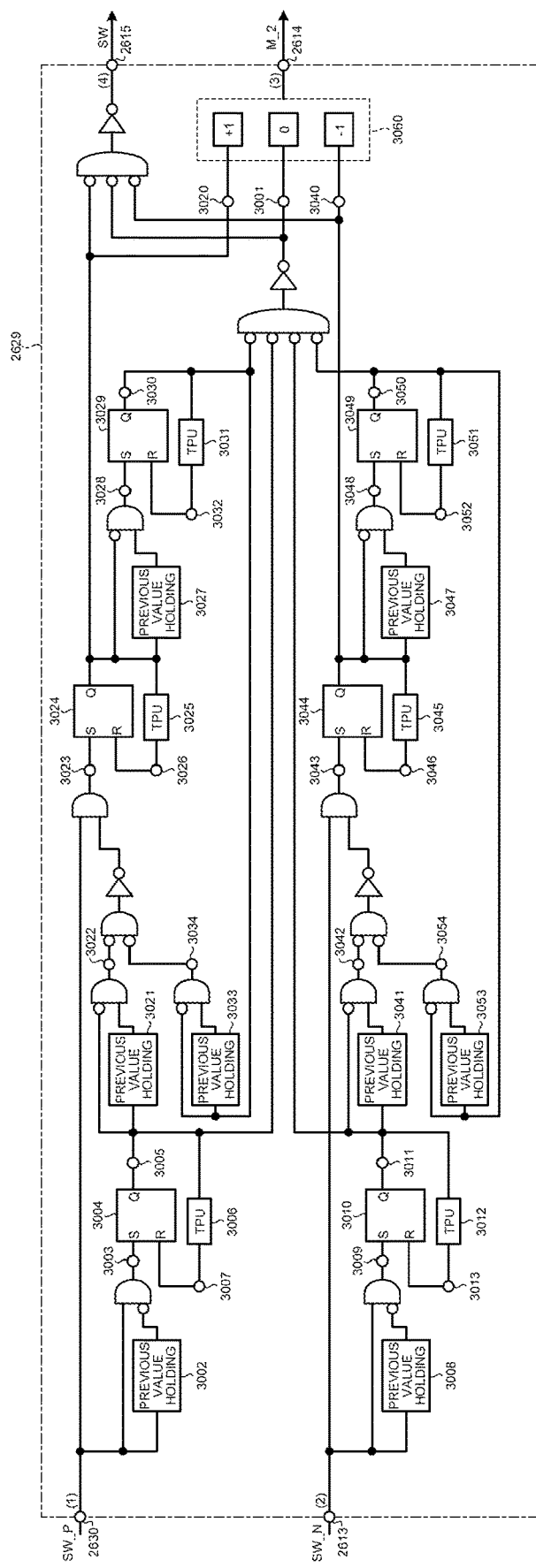
FIG. 30 is a diagram showing a timer circuit according to claim 6 of the present invention.
Figure 31:
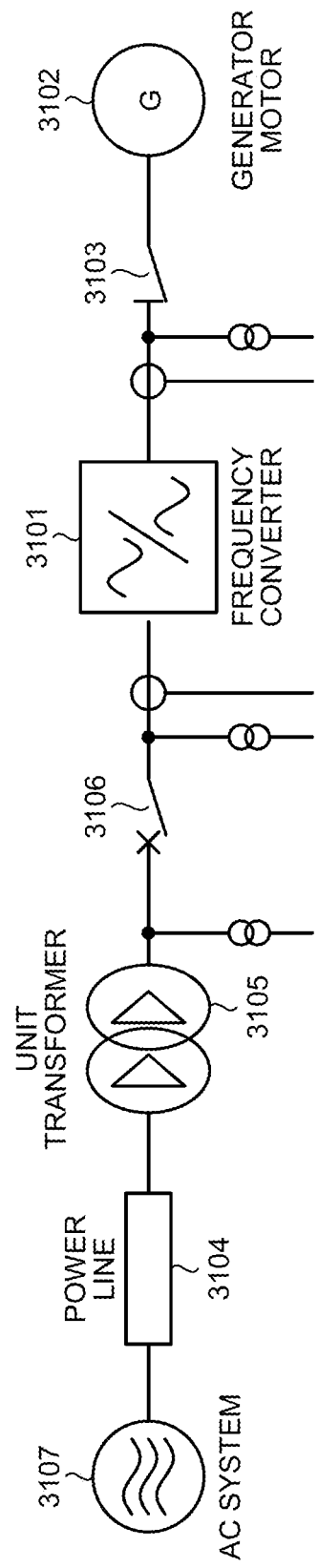
FIG. 31 is a diagram showing a configuration of a conventional FPC system.
Figure 32:
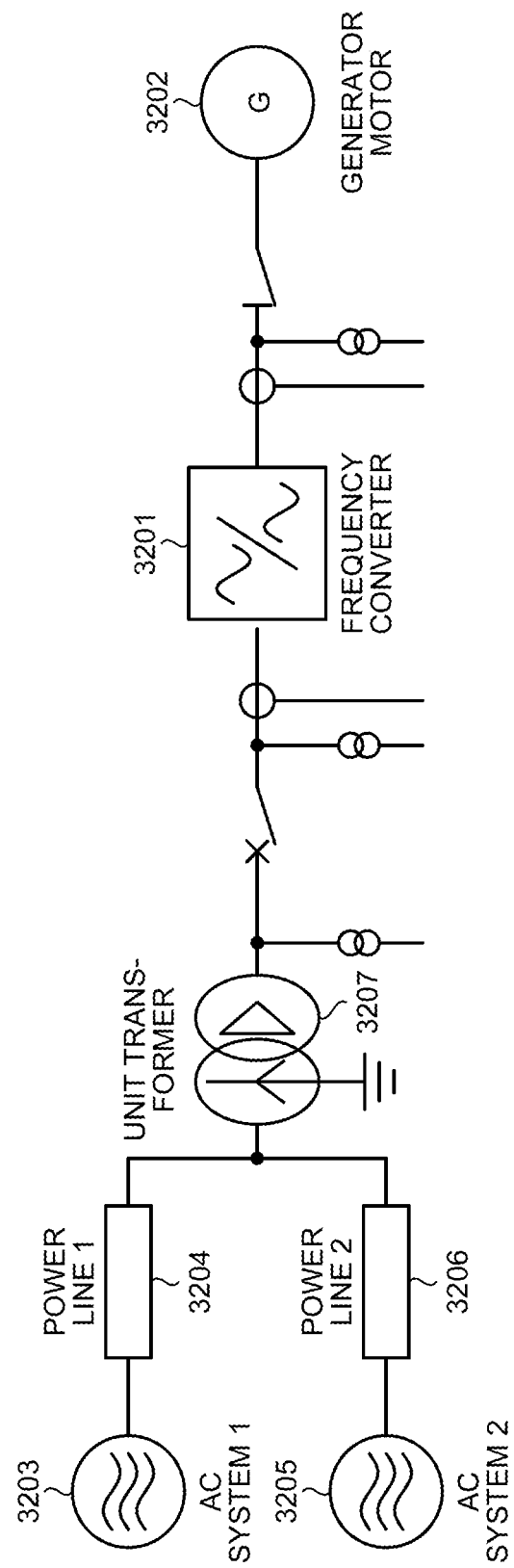
FIG. 32 is a diagram showing another configuration of the conventional FPC system.

According to the embodiment in FIG. 30, the range of the signal 2607 (SW_MU), the signal 2608 (SW_MV), the signal 2609 (SW_MW), the U-phase mode command (M_MU) 2502, the V-phase mode command (M_MV) 2503, and the W-phase mode command (M_MW) 2504 can be achieved only by the 2-level signal logical circuit and timer circuit, and there is an effect that the range can be achieved without being limited by the calculation cycle of the microprocessor. Therefore, it is possible to implement the second 3-level converter 8 suitable for small-capacity applications in which a high PWM frequency is often selected to downsize a system without being limited by the calculation cycle of the microprocessor, and there is an effect of suppressing the mode in which the voltage waveform of the second 3-level converter 8 becomes that of the 2-level converter and protecting the coil insulation of the electrical rotating machine 21 by always providing the level 0 period before and after the switching to the second mode command (M_2) 2614.

REFERENCE SIGNS LIST

1, 3301 First 3-level converter
2, 9 Positive terminal (P terminal)
3, 10 Negative terminal (N terminal)
4, 11 Intermediate terminal (C terminal)
5, 12 U-phase terminal
6, 13 V-phase terminal
7, 14 W-phase terminal
8, 3302 Second 3-level converter
15, 3303 Positive capacitor (CBP)
16, 3304 Negative capacitor (CBN)
17, 3107, 3306 AC system
18, 3105, 3207, 3308 Unit transformer 19, 3106 Circuit breaker with synchronous input device
20, 22 Harmonic filter
21 Electrical rotating machine
23, 24, 52 Instrument transformer
25 Transformer-side phase detector
27, 51, 1701, 3427, 3451 Current regulator
28, 53 Instrument current transformer
29, 54 Power detector
32, 57 Reactive power regulator
34, 35 DC voltage transformer
40 DC voltage regulator
48 Pulse generator
49 Rotation phase detector
60, 1460 Dead band gain
61, 1461 Auxiliary DC voltage regulator
66, 1366, 1466, 3466 Active power regulator
68, 1368, 1468 Mode selector switch
70 Speed detector
74, 1474 Speed regulator
86, 87, 88, 89, 90, 91, 1789, 1790, 1791, 3486, 3487, 3488, 3489, 3490, 3491 Gate pulse generator
100 System-side terminal
108 P element (I_MUP)
109 PC element (I_MUPC)
112 NC element (I_MUNC)
205 3-phase/2-phase calculator
209 Direct-axis current controller
212 Transvers-axis current controller
214, 235 2-phase/3-phase calculator
218, 219, 220, 3518, 3519, 3520 Output limiter
224 Overmodulation suppression circuit
225, 3716 Maximum-value selection circuit
226 Minimum-value selection circuit
227 Gain
230, 233, 246, 3530, 3533, 3536 3-level PWM modulator
239, 241, 243 AC current regulator
401 Output regulator
402 Modulated-wave correction command (R U)
501, 1110 Signal outputter
502, 503, 1802, 1804, 3718 Comparator with hysteresis
508, 1009, 1817 Selector switch
1002, 1003, 1810, 1811, 2604, 2605, 2606 Comparator
1006, 1814, 2617, 2623, 2629 Timer circuit
1102, 1106, 1909, 2703, 2708, 2710, 2905, 2915, 3004, 3024, 3029 Flip-flop circuit
1104, 1108, 1910, 2705, 2712, 2713, 2907, 2917, 3006, 3025, 3031 On-delay circuit
1611 N element (I_N)
1614 NC element (I_NC)
82, 1702, 2501, 3482 Mode command switcher
1703 2-phase/3-phase converter
1806 Root-square sum calculator
1808 Divider
1904, 2904, 2914, 3002, 3021, 3027, 3033 Previous-value holding circuit
2601, 2602, 2603, 3704, 3705, 3706 Absolute-value calculation circuit
2610, 2611, 2612, 3707, 3708, 3709, 3713, 3714, 3715 Sign detector
2714, 2924, 3060 Output switching circuit
3101, 3201 Frequency converter
3102, 3202, 3305 Generator motor
3103 Disconnector switch
3104 Power line
3203 First AC system (AC system 1)
3204 First power line (power line 1)
3205 Second AC system (AC system 2)
3206 Second power line (power line 2)
3307 Single-circuit power line
3309 Bypass circuit
3310, 3311 Circuit breaker
3312 Load breaker
3401 Positive discharge resistance (RP)
3402 Negative discharge resistance (RN)
3403 Positive chopper (CHP)
3404 Negative chopper (CHN)
3723 U-phase mode selector switch
3724 V-phase mode selector switch
3725 W-phase mode selector switch

The invention claimed is:

1. An adjustable speed generator motor system with full power converter, the system comprising:

two 3-level converters each having a positive terminal (P terminal), a negative terminal (N terminal), and an intermediate potential terminal (C terminal) provided on a direct current (DC) side, and a 3-phase alternate-current (AC) terminal provided on an AC side, the two 3-level converters configured to switch and output 3-level potentials of a positive terminal potential (+1 mode), a negative terminal potential (−1 mode), and an intermediate potential terminal (0 mode) to the 3-phase AC terminal, the two 3-level converters being a first 3-level converter with the 3-phase AC terminal connected to an AC system via an inductive element and a second 3-level converter with the 3-phase AC terminal connected to an AC rotating machine via an inductive element, positive terminals (P terminals), negative terminals (N terminals), and intermediate potential terminals (C terminals) of the two 3-level converters being connected back-to-back;

a positive capacitor (CBP) connected between the positive terminal (P terminal) and the intermediate potential terminal (C terminal);

a negative capacitor (CBN) connected between the intermediate potential terminal (C terminal) and the negative terminal (N terminal);

a first current detector configured to detect a 3-phase AC current (ITU, ITV, ITW) of the first 3-level converter;

a first current vector calculator configured to receive the 3-phase AC current and a voltage phase of the AC system and to detect a transvers-axis component (ITQ_FB) and a direct-axis component (ITD_FB) of the 3-phase AC current;

a first DC current regulator including at least proportional elements and integral elements and configured to match a transvers-axis current command (ITQ_REF) to the first 3-level converter with the transvers-axis component (ITQ_FB) of the 3-phase AC current, to match a direct-axis current command (ITD_REF) to the first 3-level converter with the direct-axis component (ITD_FB) of the 3-phase AC current, and to output a voltage command for the transvers-axis component and the direct-axis component;

a first AC voltage command calculator configured to receive the voltage command for the transvers-axis component and the direct-axis component from the first DC current regulator and to output a first 3-phase AC voltage command (α_TU, α_TV, α_TW);

a first PWM modulator configured to receive the first 3-phase AC voltage command and to output a first 3-level potential command (M_TU1, M_TV1, M_TW1);

a first pulse generator configured to receive the first 3-level potential command and to output a firing pulse to a P element, a PC element, an NC element, and an N element, the P element, the PC element, the NC element, and the N element being four electronic switches connected in four series in a direction from the positive terminal (P-terminal) to the negative terminal (N-terminal) and constituting the first 3-level converter;

a second current detector configured to detect a 3-phase AC current (IMU, IMV, IMW) of the second 3-level converter;

a second current vector calculator configured to receive the 3-phase AC current and a voltage phase of the AC rotating machine and to detect a transvers-axis component (IMQ_FB) and a direct-axis component (IMID_FB) of the 3-phase AC current;

a second DC current regulator including at least proportional elements and integral elements and configured to match a transvers-axis current command (IMQ_REF) to the second 3-level converter with a transvers-axis component (IMQ_FB) of the 3-phase AC current, to match a direct-axis current command (IMD_REF) to the second 3-level converter with a direct-axis component (IMID_FB) of the 3-phase AC current, and to output a voltage command for the transvers-axis component and the direct-axis component;

a second AC voltage command calculator configured to receive the voltage command for the transvers-axis component and the direct-axis component from the second DC current regulator and the rotation phase of the AC rotating machine and to output a second 3-phase AC voltage command ($\alpha$_MU, $\alpha$_MV, $\alpha$_MW);

a second PWM modulator configured to receive the second 3-phase AC voltage command and to output a second 3-level potential command (M_MU1, M_MV1, M_MW1);

a second pulse generator configured to receive the second 3-level potential command and to output a firing pulse to four electronic switches constituting the second 3-level converter;

a first mode command switcher provided independently for 3-phase AC currents of the first 3-level converter, the first mode command switcher configured to receive the 3-phase AC current (ITU, ITV, ITW), to output a third 3-level potential command (M_TU2, M_TV2, M_TW2) to the first 3-level converter, to set the third 3-level potential command (M_TU2, M_TV2, M_TW2) to the negative terminal potential (−1 mode) when the 3-phase AC current (ITU, ITV, ITW) exceeds a threshold (I1) in an outflow direction from the first 3-level converter, to output the third 3-level potential command (M_TU2, M_TV2, M_TW2) as the positive terminal potential (+1 mode) when the 3-phase AC current (ITU, ITV, ITW) exceeds the threshold (I1) in an inflow direction to the first 3-level converter, and to switch from the first 3-level potential command (M_TU1, M_TV1, M_TW1) to the third 3-level potential command (M_TU2, M_TV2, M_TW2) independently for three phases when an absolute value of the 3-phase AC current (ITU, ITV, ITW) exceeds the threshold (I1) to output a fourth 3-level potential command (M_TU, M_TV, M_TW) to the first PWM modulator;

a first AC current command calculator configured to receive the transvers-axis current command (ITQ_REF) and the direct-axis current command (ITD_REF) to the first 3-level converter and the voltage phase of the AC system and to output a first 3-phase AC current command (ITU_REF, ITV_REF, ITW_REF); and a first AC current regulator provided for each 3-phase AC current of the first 3-level converter and configured to match the 3-phase AC current (ITU, ITV, ITW) with the first 3-phase AC current command (ITU_REF, ITV_REF, ITW_REF) to output a second AC voltage command, the first AC current regulator having proportional elements four times or more than the proportional elements of the first DC current regulator, and to energize the second AC voltage command independently for each phase to the first 3-phase AC voltage command ($\alpha$_TU, $\alpha$_TV, $\alpha$_TW) to output the second AC voltage command to the first PWM modulator.

2. The adjustable speed generator motor system with full power converter according to claim 1, further comprising:

a first dead time compensation circuit configured to detect a level change of the fourth 3-level potential command (M_TU, M_TV, M_TW) input to the first pulse generator, to output a first dead time level (+1_D) with the firing pulse to the PC element ON and the firing pulse to the P element, the NC element, and the N element OFF during a first set time limit (TD1) period when the level change is between the intermediate potential terminal (0 mode) and the positive terminal potential (+1 mode), to output a second dead time level (−1_D) with the firing pulse to the NC element ON and the firing to the P element, the PC element, and the N element OFF during the first set time limit (TD1) period when the level change is between the intermediate potential terminal (0 mode) and the negative terminal potential (−1 mode), and to output a third dead time level (0_D) with the firing pulse to the P element, the PC element, the NC element, and the N element OFF during a second set time limit (TD2) period when the level change is between the positive terminal potential (+1 mode) and the negative terminal potential (−1 mode), wherein the second set time limit (TD2) is greater than or equal to the first set time limit (TD1).

3. The adjustable speed generator motor system with full power converter according to claim 1, further comprising:

a positive capacitor voltage (VDCP) detector of the positive capacitor (CBP);

a negative capacitor voltage (VDCN) detector of the negative capacitor (CBN);

a capacitor differential voltage detector configured to subtract a negative capacitor voltage (VDCN) from a positive capacitor voltage (VDCP) and to output a result;

a second AC current command calculator configured to receive the transvers-axis current command (IMQ_REF) and the direct-axis current command (IMD_REF) to the second 3-level converter and the rotation phase of the AC rotating machine and to output a second 3-phase AC current command (IMU_REF, IMV_REF, IMW_REF); and a second mode command switcher, wherein the second mode command switcher comprises:

a comparator configured to receive a signal from the capacitor differential voltage detector and to output a negative voltage balance signal (SW_VCN) at level 1 when a sign of the signal is positive and an absolute value exceeds a threshold (V1);

a comparator configured to output a positive voltage balance signal (SW_VCP) at level 1 when a sign of the signal from the capacitor differential voltage detector is negative and the absolute value exceeds the threshold (V1);
a root-square sum calculator of the transvers-axis current command (IMQ_REF) and the direct-axis current command (IMD_REF) to the second 3-level converter;
a comparator configured to receive, independently for three phases, a 3-phase AC current command (CU REF, CV_REF, CW_REF) unitized by dividing the second 3-phase AC current command (IMU_REF, IMV_REF, IMW_REF) by an output of the root-square sum calculator and to output, independently for three phases, a negative voltage correction command (SW_MUN, SW_MVN, SW_MWN) at level 1 when a sign of the unitized 3-phase AC current command is positive and an absolute value exceeds a threshold (C1) and when the negative voltage balance signal (SW_VCN) is level 1;
a comparator configured to output a positive voltage correction command (SW_MUP, SW_MVP, SW_MWP) at level 1 independently for three phases when the sign of the unitized 3-phase AC current command is negative and the absolute value exceeds the threshold (C1) and when the positive voltage balance signal (SW_VCP) is level 1;
an OR circuit configured to output an OR signal (SW_MU, SW_MV, and SW_MW) of the positive voltage correction command and the negative voltage correction command independently for three phases; and
an output switcher configured to output a fifth 3-level potential command (M_MU2, M_MV2, M_MW2) at level −1 independently for three phases when the positive voltage correction command is level 1 and to output the fifth 3-level potential command (M_MU2, M_MV2, M_MW2) at level 1 independently for three phases when the negative voltage correction command is level 1, and
the second mode command switcher switches from the second 3-level potential command (M_MU1, M_MV1, M_MW1) to the fifth 3-level potential command (M_TU2, M_TV2, M_TW2) independently for three phases when the OR signal (SW_MU, SW_MV, SW_MW) is level 1, and outputs a sixth 3-level potential command (M_MU, M_MV, M_MW) to the second PWM modulator.

4. The adjustable speed generator motor system with full power converter according to claim 1, further comprising:
a positive capacitor voltage (VDCP) detector of the positive capacitor (CBP);
a negative capacitor voltage (VDCN) detector of the negative capacitor (CBN);
a capacitor differential voltage detector configured to subtract a negative capacitor voltage (VDCN) from a positive capacitor voltage (VDCP) and to output a result; and
a second mode command switcher, wherein
the second mode command switcher comprises:
a comparator configured to receive a signal from the capacitor differential voltage detector and to output a negative voltage balance signal (SW_VCN) at level 1 when a sign is positive and an absolute value exceeds a threshold (V1);
a comparator configured to output a positive voltage balance signal (SW_VCP) at level 1 when the sign of the signal from the capacitor differential voltage detector is negative and the absolute value exceeds the threshold (V1);
an absolute-value detector configured to calculate an absolute value of the 3-phase AC current (IMU, IMV, IMV);
a sign detector configured to detect a sign of the 3-phase AC current (IMU, IMV, IMV);
three comparators configured to match absolute values of the respective phases output by the absolute-value detector and to compare the value with a threshold (C3), the three comparators including a comparator configured to output a U-phase negative correction command (SW_MUN) at level 1 when an absolute value of a U-phase AC current (IMU) is greater than a V-phase AC current (IMV) and a W-phase AC current (IMW) and when a sign of the U-phase AC current (IMU) is positive and flows from the second 3-level converter and to output a U-phase positive correction command (SW_MUP) at level 1 when the sign of the U-phase AC current (IMU) is negative and flows into the second 3-level converter, a comparator configured to output a V-phase negative correction command (SW_MUN) at level 1 when an absolute value of the V-phase AC current (IMV) is greater than the W-phase AC current (IMW) and the U-phase AC current (IMU) and when a sign of the V-phase AC current (IMV) is positive and flows from the second 3-level converter and to output a V-phase positive correction command (SW_MVP) at level 1 when the sign of the V-phase AC current (IMV) is negative and flows into the second 3-level converter, and a comparator configured to output a W-phase negative correction command (SW_MWN) at level 1 when an absolute value of the W-phase AC current (IMU) is greater than the U-phase AC current (IMU) and the V-phase AC current (IMV) and when a sign of the W-phase AC current (IMW) is positive and flows from the second 3-level converter and to output a W-phase positive correction command (SW_MWP) at level 1 when the sign of the W-phase AC current (IMW) is negative and flows into the second 3-level converter;
an OR circuit configured to output an OR signal (SW_MU, SW_MV, SW_MW) of a positive voltage correction command (SW_MUP, SW_MVP, SW_MWP) and a negative voltage correction command (SW_MUN, SW_MVN, SW_MWN) independently for three phases; and
an output switcher configured to output a fifth 3-level potential command (M_MU2, M_MV2, M_MW2) at level 1 independently for three phases when the positive voltage correction command is level 1 and to output the fifth 3-level potential command (M_MU2, M_MV2, M_MW2) at level −1 independently for three phases when the negative voltage correction command is level 1, and
the second mode command switcher switches from the second 3-level potential command (M_MU1, M_MV1, M_MW1) to the fifth 3-level potential command (M_TU2, M_TV2, M_TW2) independently for three phases when the OR signal (SW_MU, SW_MV, SW_MW) is level 1, and outputs a sixth 3-level potential command (M_MU, M_MV, M_MW) to the second PWM modulator.

5. The adjustable speed generator motor system with full power converter according to claim 3, wherein the second mode command switcher outputs the fifth 3-level potential command (M_TU2, M_TV2, M_TW2) at level 0 only for a set time limit period (Td3) when the OR signal (SW_MU, SW_MV, SW_MW) switches from level 0 to level 1 and outputs the second 3-level potential commands (M_MU1, M_MV1, and M_MW1) at level 0 only for a set time limit period (Td4) when the OR signal (SW_MU, SW_MV, SW_MW) switches from level 1 to level 0.

6. The adjustable speed generator motor system with full power converter according to claim 4, wherein the second mode command switcher outputs the fifth 3-level potential command (M_TU2, M_TV2, M_TW2) at level 0 only for a set time limit period (Td3) when the OR signal (SW_MU, SW_MV, SW_MW) switches from level 0 to level 1 and outputs the second 3-level potential commands (M_MU1, M_MV1, and M_MW1) at level 0 only for a set time limit period (Td4) when the OR signal (SW_MU, SW_MV, SW_MW) switches from level 1 to level 0.

7. The adjustable speed generator motor system with full power converter according to claim 2, further comprising:
   a positive capacitor voltage (VDCP) detector of the positive capacitor (CBP);
   a negative capacitor voltage (VDCN) detector of the negative capacitor (CBN);
   a capacitor differential voltage detector configured to subtract a negative capacitor voltage (VDCN) from a positive capacitor voltage (VDCP) and to output a result;
   a second AC current command calculator configured to receive the transvers-axis current command (IM-Q_REF) and the direct-axis current command (IM-D_REF) to the second 3-level converter and the rotation phase of the AC rotating machine and to output a second 3-phase AC current command (IMU_REF, IMV_REF, IMW_REF); and
   a second mode command switcher, wherein
   the second mode command switcher comprises:
   a comparator configured to receive a signal from the capacitor differential voltage detector and to output a negative voltage balance signal (SW_VCN) at level 1 when a sign of the signal is positive and an absolute value exceeds a threshold (V1);
   a comparator configured to output a positive voltage balance signal (SW_VCP) at level 1 when a sign of the signal from the capacitor differential voltage detector is negative and the absolute value exceeds the threshold (V1);
   a root-square sum calculator of the transvers-axis current command (IMQ_REF) and the direct-axis current command (IMD_REF) to the second 3-level converter;
   a comparator configured to receive, independently for three phases, a 3-phase AC current command (CU REF, CV_REF, CW_REF) unitized by dividing the second 3-phase AC current command (IMU_REF, IMV_REF, IMW_REF) by an output of the root-square sum calculator and to output, independently for three phases, a negative voltage correction command (SW_MUN, SW_MVN, SW_MWN) at level 1 when a sign of the unitized 3-phase AC current command is positive and an absolute value exceeds a threshold (C1) and when the negative voltage balance signal (SW_VCN) is level 1;
   a comparator configured to output a positive voltage correction command (SW_MUP, SW_MVP, SW_MWP) at level 1 independently for three phases when the sign of the unitized 3-phase AC current command is negative and the absolute value exceeds the threshold (C1) and when the positive voltage balance signal (SW_VCP) is level 1;
   an OR circuit configured to output an OR signal (SW_MU, SW_MV, and SW_MW) of the positive voltage correction command and the negative voltage correction command independently for three phases; and
   an output switcher configured to output a fifth 3-level potential command (M_MU2, M_MV2, M_MW2) at level −1 independently for three phases when the positive voltage correction command is level 1 and to output the fifth 3-level potential command (M_MU2, M_MV2, M_MW2) at level 1 independently for three phases when the negative voltage correction command is level 1, and
   the second mode command switcher switches from the second 3-level potential command (M_MU1, M_MV1, M_MW1) to the fifth 3-level potential command (M_TU2, M_TV2, M_TW2) independently for three phases when the OR signal (SW_MU, SW_MV, SW_MW) is level 1, and outputs a sixth 3-level potential command (M_MU, M_MV, M_MW) to the second PWM modulator.

8. The adjustable speed generator motor system with full power converter according to claim 2, further comprising:
   a positive capacitor voltage (VDCP) detector of the positive capacitor (CBP);
   a negative capacitor voltage (VDCN) detector of the negative capacitor (CBN);
   a capacitor differential voltage detector configured to subtract a negative capacitor voltage (VDCN) from a positive capacitor voltage (VDCP) and to output a result; and
   a second mode command switcher, wherein
   the second mode command switcher comprises:
   a comparator configured to receive a signal from the capacitor differential voltage detector and to output a negative voltage balance signal (SW_VCN) at level 1 when a sign is positive and an absolute value exceeds a threshold (V1);
   a comparator configured to output a positive voltage balance signal (SW_VCP) at level 1 when the sign of the signal from the capacitor differential voltage detector is negative and the absolute value exceeds the threshold (V1);
   an absolute-value detector configured to calculate an absolute value of the 3-phase AC current (IMU, IMV, IMV);
   a sign detector configured to detect a sign of the 3-phase AC current (IMU, IMV, IMV);
   three comparators configured to match absolute values of the respective phases output by the absolute-value detector and to compare the value with a threshold (C3), the three comparators including a comparator configured to output a U-phase negative correction command (SW_MUN) at level 1 when an absolute value of a U-phase AC current (IMU) is greater than a V-phase AC current (IMV) and a W-phase AC current (IMW) and when a sign of the U-phase AC current (IMU) is positive and flows from the second 3-level converter and to output a U-phase positive correction command (SW_MUP) at level 1 when the sign of the U-phase AC current (IMU) is negative and flows into the second 3-level converter, a comparator configured to output a V-phase negative correction command (SW_MUN) at level 1 when an absolute value of the V-phase AC current (IMV) is greater than the W-phase AC current (IMW) and the U-phase AC current (IMU) and when a sign of the V-phase AC current (IMV) is positive and flows from the second 3-level converter and to output a V-phase positive correction command (SW_MVP) at level 1 when the sign of the V-phase AC current (IMV) is negative and flows into the second 3-level converter, and a comparator configured to output a W-phase negative correction command (SW_MWN) at level 1 when an absolute value of the W-phase AC current (IMU) is greater than the U-phase AC current (IMU) and the V-phase AC current (IMV) and when a sign of the W-phase AC current (IMW) is positive and flows from the second 3-level converter and to output a W-phase positive correction command (SW_MWP) at level 1 when the sign of the W-phase AC current (IMW) is negative and flows into the second 3-level converter;

an OR circuit configured to output an OR signal (SW_MU, SW_MV, SW_MW) of a positive voltage correction command (SW_MUP, SW_MVP, SW_MWP) and a negative voltage correction command (SW_MUN, SW_MVN, SW_MWN) independently for three phases; and an output switcher configured to output a fifth 3-level potential command (M_MU2, M_MV2, M_MW2) at level 1 independently for three phases when the positive voltage correction command is level 1 and to output the fifth 3-level potential command (M_MU2, M_MV2, M_MW2) at level −1 independently for three phases when the negative voltage correction command is level 1, and the second mode command switcher switches from the second 3-level potential command (M_MU1, M_MV1, M_MW1) to the fifth 3-level potential command (M_TU2, M_TV2, M_TW2) independently for three phases when the OR signal (SW_MU, SW_MV, SW_MW) is level 1, and outputs a sixth 3-level potential command (M_MU, M_MV, M_MW) to the second PWM modulator.

9. The adjustable speed generator motor system with full power converter according to claim 7, wherein the second mode command switcher outputs the fifth 3-level potential command (M_TU2, M_TV2, M_TW2) at level 0 only for a set time limit period (Td3) when the OR signal (SW_MU, SW_MV, SW_MW) switches from level 0 to level 1 and outputs the second 3-level potential commands (M_MU1, M_MV1, and M_MW1) at level 0 only for a set time limit period (Td4) when the OR signal (SW_MU, SW_MV, SW_MW) switches from level 1 to level 0.

10. The adjustable speed generator motor system with full power converter according to claim 8, wherein the second mode command switcher outputs the fifth 3-level potential command (M_TU2, M_TV2, M_TW2) at level 0 only for a set time limit period (Td3) when the OR signal (SW_MU, SW_MV, SW_MW) switches from level 0 to level 1 and outputs the second 3-level potential commands (M_MU1, M_MV1, and M_MW1) at level 0 only for a set time limit period (Td4) when the OR signal (SW_MU, SW_MV, SW_MW) switches from level 1 to level 0.

* * * * *